United States Patent [19]
Isfeld et al.

[11] Patent Number: 5,592,622
[45] Date of Patent: Jan. 7, 1997

[54] NETWORK INTERMEDIATE SYSTEM WITH MESSAGE PASSING ARCHITECTURE

[75] Inventors: Mark S. Isfeld; Bruce W. Mitchell, both of San Jose; Michael J. Seaman, Mountain View; Tracy D. Mallory; Nagaraj Arunkumar, both of San Jose, all of Calif.

[73] Assignee: 3Com Corporation, Santa Clara, Calif.

[21] Appl. No.: 438,897

[22] Filed: May 10, 1995

[51] Int. Cl.$^6$ .......................... G06F 13/00; G06F 15/163
[52] U.S. Cl. ................. 395/200.02; 395/200.13; 395/200.15; 395/877; 395/309; 395/200.2
[58] Field of Search .................. 370/85.1, 85.6, 370/92; 340/825.06, 825.07, 825.52; 395/200.01, 200.05, 200.13, 200.15, 200.16, 200.17, 200.2, 250, 825, 826, 849, 850, 872, 877, 309, 800

[56] References Cited

U.S. PATENT DOCUMENTS

| | | | |
|---|---|---|---|
| 4,475,155 | 10/1984 | Oishi et al. | 395/842 |
| 4,783,730 | 11/1988 | Fischer | 395/825 |
| 4,860,244 | 8/1984 | Bruckert et al. | 395/250 |
| 4,912,723 | 3/1990 | Verbanets, Jr. | 375/7 |
| 4,962,497 | 10/1990 | Ferenc et al. | 370/60.1 |
| 5,088,090 | 2/1992 | Yacoby | 370/85.13 |
| 5,093,824 | 3/1992 | Coan et al. | 370/16 |
| 5,109,484 | 4/1992 | Hughes et al. | 395/200.1 |
| 5,121,383 | 6/1992 | Golestani | 370/60 |
| 5,131,081 | 7/1992 | MacKenna et al. | 395/842 |
| 5,134,691 | 7/1992 | Elms | 395/200.4 |
| 5,255,387 | 10/1993 | Arnold et al. | 395/600 |
| 5,335,325 | 8/1994 | Frank et al. | 395/490 |
| 5,379,296 | 1/1995 | Johnson et al. | 370/60 |
| 5,404,524 | 4/1995 | Celi, Jr. | 395/700 |
| 5,469,548 | 11/1995 | Callison et al. | 395/447 |
| 5,485,455 | 1/1996 | Dobbins et al. | 370/60 |
| 5,521,910 | 5/1996 | Matthews | 370/54 |

OTHER PUBLICATIONS

Lynn Choi and Andrew Chien, Integrating Networks and Memory Hierarchies in a Multicomputer Node Architecture in IEEE 1994 Parallel Processing Symposium, pp. 10–17 (1994).

*Primary Examiner*—Lance Leonard Barry
*Attorney, Agent, or Firm*—Wilson, Sonsini, Goodrich & Rosati

[57] ABSTRACT

A system uses a message passing paradigm for transferring large amounts of input/output data among a plurality of processors, such as a network intermediate system or router. A bus interconnects the plurality of processors with a plurality of bus interface devices. The bus interface device which originates a transfer includes a command list storing lists of commands which characterize transfers of data messages from local memory across the bus and a packing buffer which buffers the data subject of the command being executed between local memory and the bus. A bus interface device which receives a transfer includes a free buffer list storing pointers to free buffers in local memory into which the data may be loaded from the bus, and a receive list storing pointers to buffers in local memory loaded with data from the bus. The command list includes a first high priority command list and a second lower priority command list for managing latency of the higher priority commands in the software of the processor. The bus interface which receives the transfer includes control logic which manages data transfer into and out of an inbound buffer, including receiving burst transfers of message transfer cells from the bus, loading free buffers in local memory from the inbound buffer with message transtar cells, and updating the receive list. The receive list includes a first higher priority receive list and a second lower priority receive list for reliability management, and logic which monitors the free list so that lower priority messages may be dropped to prevent overflow of free buffer resources.

47 Claims, 39 Drawing Sheets

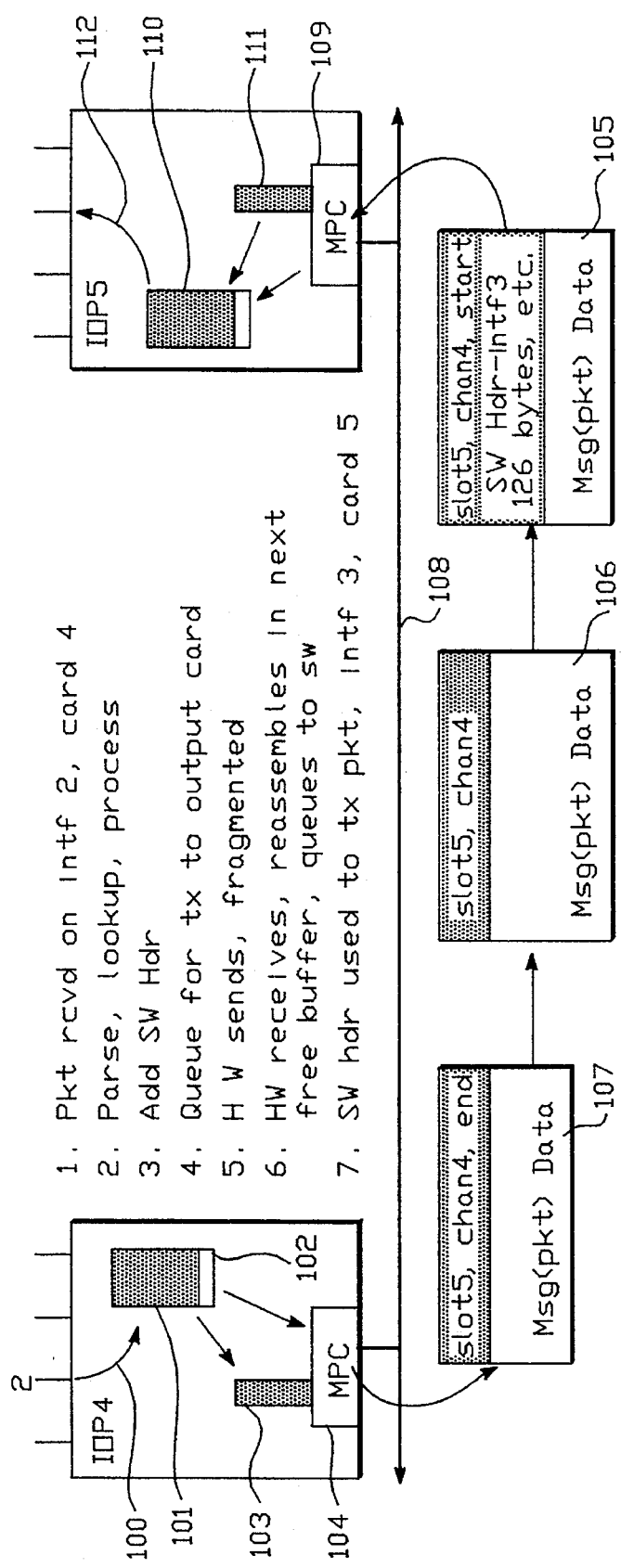
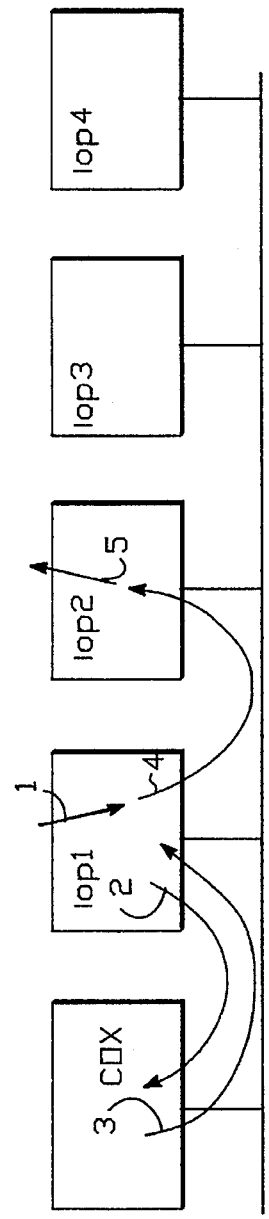
FIG. 6
FIG. 7

| transfer type | MSG XMIT | SMEM WRITE | SMA READ | SMEM READ | MEM MOVE | CELL XMIT | MSG RCV | CBIO & CBMEM WRITE | CB READ | PROMIS-CUOUS RCV |
|---|---|---|---|---|---|---|---|---|---|---|
| source addr a | SDRAM | SDRAM | SMEM | SMEM | SDRAM | SDRAM | other card | 29030 | explicit (mem/io) | other card |
| dest addr b | MSG | SMEM | MSG (channel) | SDRAM | SDRAM | explicit msg addr | MSG (channel) | explicit (mem/io) | 29030 | any CB addr, filtered |
| direction wrt IOM | outbound | outbound | inbound | inbound | loopback (not CB) | outbound (loop?) | inbound | outbound | inbound | inbound |
| origin of cycle | command list | command list | command list | command list | command list | command list | other card | command list | command list | any CB cycle |
| receive activity | n/a | n/a | rcv buff free list | move to SDRAM | move to SDRAM | varies | rcv buff free list | n/a | move to SDRAM | move to SDRAM |
| data buffering | packing cell buff | packing cell buff | packing cell buff | packing cell buff | packing cell buff | packing cell buff | inbound cell buff | embedded in cmd list | packing cell buffer | inbound cell buff |
| align & pack | yes | yes | yes | yes | yes | no | no | no | no | no |

Corebus Data Transfers

FIG. 9

SMEM WRITE Datapath

FIG. 18 SMEM READ Datapath

MEM Move Datapath

FIG. 24 Cell XMIT Data Path

CB Read Datapath

MPC Major Functional Blocks

Message Passing Datapath

MPC Data Storage Buffers and Command Lists

MPC Receive Buffer Memory Structures

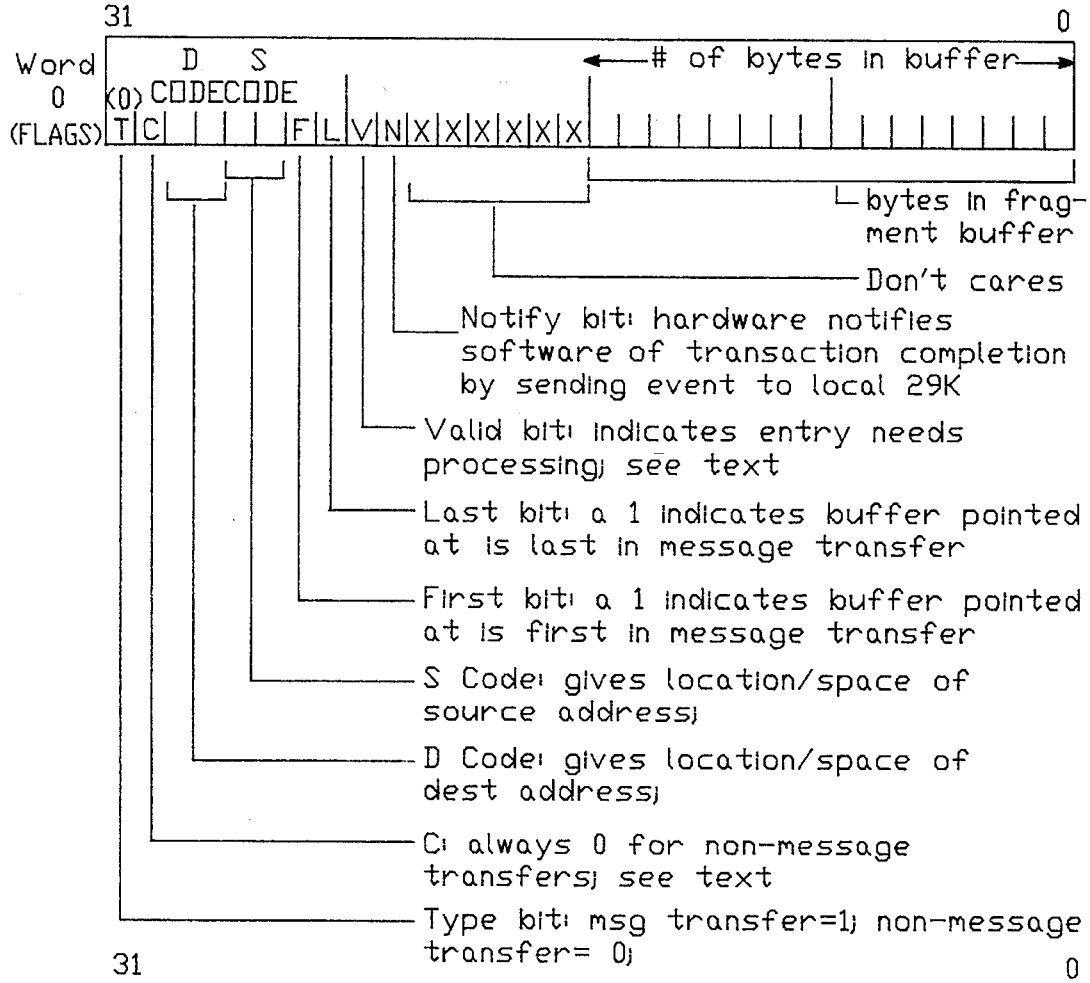
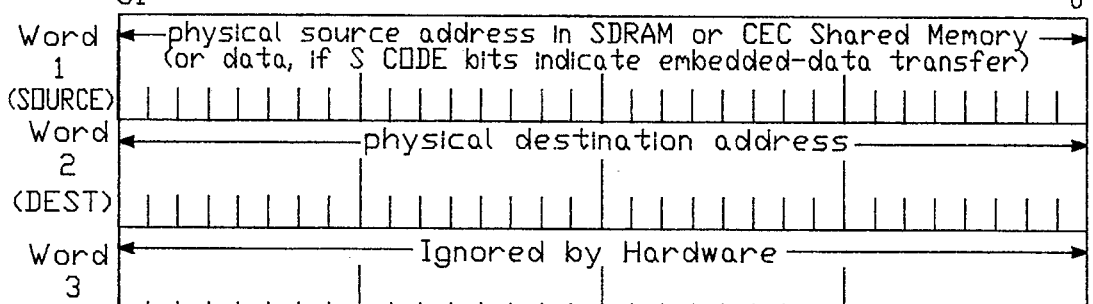
Command List Bit Definiton (Non-Message)
FIG.42
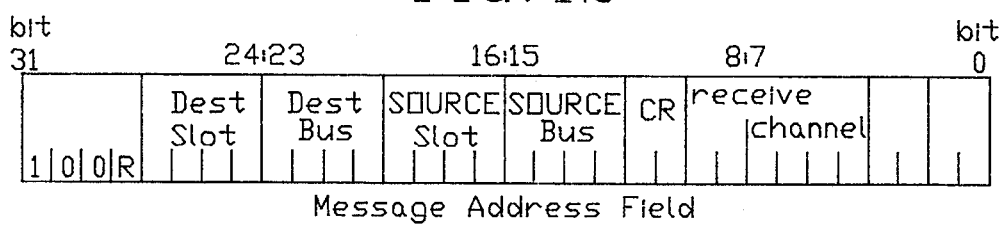
Message Address Field
FIG.43

NETWORK INTERMEDIATE SYSTEM WITH MESSAGE PASSING ARCHITECTURE

BACKGROUND OF THE INVENTION

1. Field of the Invention

The present invention relates to the processing systems which handle large amounts of input/output data, such as network intermediate systems. More particularly, the present invention relates to a message passing architecture for a high volume network router system.

2. Description of Related Art

A network router is a system which allows a plurality of local area networks to communicate with one another, even when such networks are operating under different protocols. The router will have an interface to each of the networks using its resources. Users of the respective networks address packets to the router in order to transmit packets to other networks coupled to the router. When a network router is connected to a large number of networks, the possibility that a very large volume of data will be flowing through the router at a given time is quite high.

In the system known as NetBuilder II, manufactured by 3Com Corporation in Santa Clara, Calif., the assignee of the present application, a plurality of input/output modules are connected to a high speed parallel bus. Each of the input/output modules is connected to one or more local area networks, and forwards packets received across the high speed bus to a shared memory resource. A central routing processor routes the packets from the shared memory resource to the appropriate destination across the same high speed bus.

Although this architecture provides very high throughput rates for today's local area networks, future local area network designs are transmitting much higher volumes of data, and in many environments it is desirable to connect more and more local area networks to a single router. Thus, the throughput capabilities of the router in the prior art designs may be a limiting factor in the design.

For instance, one standard local area network known as Ethernet, today operates at 10 Mbits per second. Future Ethernet designs are planned which will operate at 100 Mbits per second. Also, high speed protocols, such as FDDI and the asynchronous transfer mode (ATM), have very high data rates.

In systems managing a large volume of input/output data, such as a network router, there are a number of design issues of importance. Particularly when there are a number of interfaces using shared resources, resource contention must be addressed. Contention for the resources causes problems with message latency, reliability, fairness, and robustness of service guarantees.

Latency refers to the delay between the time that a service is requested and actual initiation of that service request. Throughput is closely linked to latency. In general, with bursty traffic, such as encountered in network intermediate systems, higher throughput causes a higher variance in latencies, or at least higher peak latencies. Guarantees of low latency for transfers are most easily provided if the desired throughput is relatively low.

Also, reliability is an important factor in such systems. The reliability of data transfers is always relative, but can be made as reliable as the hardware on which it is running if the source of the transfers can be flow controlled. However, the cost of providing guaranteed delivery can be quite high. Further, general robustness principals require that each layer that requires reliability provide its own guarantees.

Fairness in the context of high volume I/O processors includes the notion of supporting different qualities of service as well as reasonably allocating services between peers. The types of fairness include providing equal shares, or at least a guaranteed percentage of share to each user of the resource by a fair queuing scheme. Also, fairness includes guaranteed progress, which could be designed to meet all feasible receive rates, or to provide a prioritized service system. Also, a fairness system can operate in an environment which provides a probably fair result, but no guarantee of fairness is assured, such as might be encountered in a system which randomly discards transfers when stressful situations are encountered.

Finally, such a system must be robust. Excessive traffic loads may adversely affect other well-behaved traffic in the interconnected networks, including high priority transfers within the device. Thus, in a network intermediate system environment, protection must be considered against misbehaving protocols which cause excessive traffic, network transients; natural excess traffic loads, which must be handled gracefully; and misbehaving hardware which causes retransmissions or otherwise effectively reduces the bandwidth of the system.

Accordingly, it is desirable to provide a high volume input/output processing system which effectively deals with the issues of latency, throughput, reliability, fairness, and robustness.

SUMMARY OF THE INVENTION

The present invention provides a system that allows for transferring large amounts of input/output data among a plurality of processors, such as a network intermediate system or router. The apparatus includes a bus interconnecting the plurality of processors with a plurality of bus interface devices connected to the bus and to corresponding processors. The bus interface device which originates a transfer without obtaining permission from the destination device, includes a command list storing a list of commands which characterize transfers of data from local memory across the bus and a packing buffer which buffers the data subject of the command being executed between local memory and the bus. A bus interface device which receives a transfer includes a free buffer list storing pointers to free buffers in local memory into which the data may be loaded from the bus, a receive list storing pointers to buffers in local memory loaded with data from the bus, and an inbound data buffer which buffers data subject of a transfer addressed to the receiving processor between the bus and the free buffers in the local memory. By eliminating the requirement to obtain permission from the destination device, such as normally done by a handshake protocol or the like, bus performance is greatly improved. However, the system must be able to tolerate occasional lost messages on the bus.

According to one aspect of the invention, the command list includes at least a first high priority command list and a second lower priority command list so that the apparatus may manage latency of the higher priority commands according to a latency class for the command.

According to another aspect of the invention, the commands stored in the command list identify messages to be transferred across the bus. The bus interface device of the originating processor includes control logic which manages data transfer into and out of the packing buffer for messages identified by the commands in the command list to compose message transfer cells for the messages, and to drive the message transfer cells on the bus in a burst mode. The bus interface which receives the transfer includes control logic which manages data transfar into and out of the inbound buffer, including receiving burst transfers of message transtar cells from the bus, loading free buffers in local memory from the inbound buffer with message transfer cells, and updating the receive list.

Also, according to another aspect of the invention, the receive list includes a first higher priority receive list and a second lower priority receive list for reliability, latency, and throughput management by the receiving station. The system also may include logic which monitors the free list so that lower priority messages may be dropped to prevent overflow of free buffer resources. The logic which monitors the free list includes a first watermark parameter which indicates an amount of free buffer resources, and watermark logic which signals the processor coupled to the receiving interface when the free list indicates that free buffer resources in the local memory fall below the first watermark parameter. Thus, messages may be selectively dropped from the receive list in the event that an overflow condition is threatened, based on message type. Also, a second watermark parameter may be included which indicates a second level in the amount of free buffer resources. Second watermark logic signals the local processor when the free list indicates that free buffer resources in the local memory fall below the second watermark parameter, so that messages having a second tier of priority may be dropped to prevent overflow of the free buffer resources.

In yet another aspect of the present invention, message transfer cells of a given message are allocated to a logical channel in the receiving processor to manage reconstruction of the received message in the receiving processor. For instance, each of the processors on the bus may have a respective slot number or other identifier. The commands indicate the source and destination of messages on the bus using the slot number. Thus, the receiving interfaces may assign incoming messages to a logical channel based on the originating slot number and the receiving slot number.

According to yet another aspect of the present invention, there may be a plurality of high speed parallel buses interconnecting the processors. In this aspect, messages transferred on one of the buses are identified by the sending processor, the bus on which they are sent, and the receiving processor.

Using the higher and lower priority command lists, commands are classified into a first latency class which characterizes transfers of data from local memory across the bus which require lower latency, and a second latency class which characterizes transfers of data from local memory across the bus which tolerate longer latency. Logic managing the data transfers across the bus loads the command list with new commands according to the latency class of the command.

As mentioned above, the preferred system provides a network traffic management device in which the plurality of processors each include at least one network interface, other processing elements such as a compression engine, and resources for managing the network interface and the bus interface.

Using this system, a network traffic management system is provided with managed resource contention, plural latency classes, and very high throughput. Also, message delivery is provided with LAN-like reliability, where very few messages might be lost. Also, fairness may be managed by the processors using the system by managing the command lists and receive lists as suits the needs of a particular implementation.

The design of the present invention provides separate queuing and resource management on both the sending and receiving sides for messages requiring reliability, so that such messages are not dropped in favor of data traffic of lower importance. The design provides for multiple levels of reliability guarantees, using buffer occupancy watermarks in order to give extra reliability to critical messages which provides robustness in the event that the destination falls behind and is unable to accept all of the offered message traffic getting in the way of critical messages. A relatively low rate of such critical messages in the typical network environment (on the order of 1,000 per second) will require relatively small amounts of buffering.

The separate outbound (from bus to network interface) reliable receive queue allows the reliable messages to be processed or transmitted with higher priority than regular data traffic. An important effect of higher priority processing is that a given level of reliability guarantee can be met with less buffering because the pipe is smaller. In addition, the majority of reliable messages are control messages for which delayed processing may have adverse effects on network operation.

The reliability queuing system depends on a software interlock between message passing peers to insure that the destination is willing to accept messages on its reliable receive queue. This interlock can be provided with a simple shared memory interface, or through a message based mechanism. This places a reliability mechanism in software enabling less complex hardware, more flexibility, and lower risk.

The queuing design's ability to scale to larger volumes of traffic is limited mainly by the message passing hardware capabilities.

The design which emphasizes maximum rate message passing hardware capabilities, allows the system performance to grow simply by enhancing the processing capabilities of the card. As faster processors become available, the maximum message handling rates should scale with the performance of the processor.

The queuing design provides for the simplest possible interface between hardware and software, since only a single fast path queue must be supported for transmit and receive functions. In particular, there is no overhead associated with scheduling or buffer management for multiple hardware queues. This maximizes both the hardware and software performance and reduces the memory cycle overhead of the hardware interface, allowing for maximum performance from the memory subsystem. For any given amount of buffering, it allows for increased tolerance in queue servicing latency by providing a single shared buffer pool yielding more flexibility and tuning the overall software scheduling for performance.

The design is highly flexible and relatively low cost in terms of hardware and software implementations.

Other aspects and advantages of the present invention can be seen upon review of the figures, the detailed description, and the claims which follow.

BRIEF DESCRIPTION OF THE FIGURES

FIG. 6 is a heuristic diagram providing an example of message transmission for the system of FIG. 1.

FIG. 7 illustrates message flow scenarios for a system such as that shown in FIG. 1.

FIG. 9 is a table setting forth the data transfer types in the system of FIG. 1.

FIGS. 14–33 illustrate the data paths and address paths for the transfers through the bus interface device according to the present invention, in which FIG. 14 illustrates the message transmit data path, FIG. 15 illustrates the message transmit address path, FIG. 16 illustrates shared memory (SMEM) write data path, FIG. 17 illustrates the SMEM write address path, FIG. 18 illustrates the shared memory access (SMA) read data path, FIG. 19 illustrates the SMA read address path, FIG. 20 illustrates the SMEM read data path, FIG. 21 illustrates the SMEM read address path, FIG. 22 illustrates the memory (MEM) move data path, FIG. 23 illustrates the MEM move address path, FIG. 24 illustrates the cell transmit data path, FIG. 25 illustrates the cell transmit address path, FIG. 26 illustrates the message receive data path, FIG. 27 illustrates the message receive address path, FIG. 28 illustrates the bus write data path, FIG. 29 illustrates the bus write address path, FIG. 30 illustrates the bus read data path, FIG. 31 illustrates the bus read address path, FIG. 32 illustrates the bus promiscuous receive data path, and FIG. 33 illustrates the bus promiscuous receive address path.

FIG. 42 illustrates the command list bit definition for a non-message type transfer.

FIG. 43 illustrates the message address field for a message transferred on the bus.

DETAILED DESCRIPTION

A detailed description of an embodiment of the present invention is provided with reference to the figures. FIGS. 1–5 illustrate a basic hardware environment for the system applied as a network intermediate system. FIGS. 6–43 illustrate the message transfer hardware and techniques applied according to the present invention in the environment of FIG. 1. The message passing architecture of the present invention is also useful for other system environments applied to transferring large amounts of I/O data among plural processors.

I. SYSTEM DESCRIPTION

Figure 1:
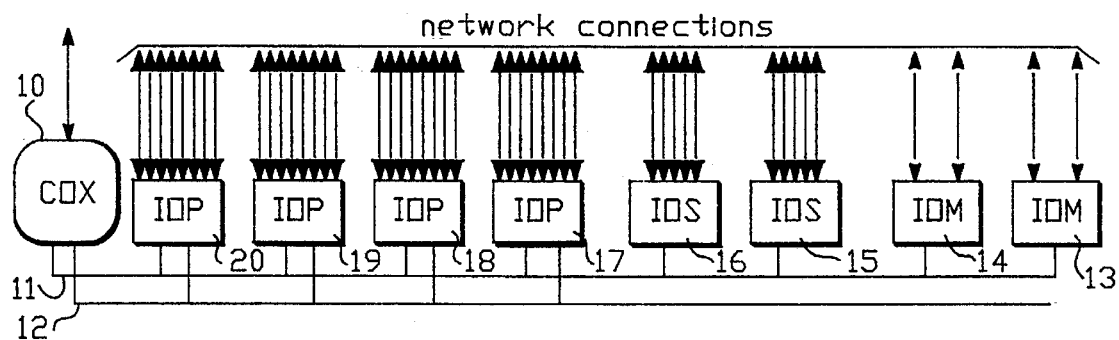
FIG. 1 provides a system block diagram for a network intermediate system implementing the present invention.

FIG. 1 provides a board level block diagram of a router which implements many aspects of the present invention. The router includes a central control card COX 10 coupled to a first high speed parallel bus 11 and a second high speed parallel bus 12. A plurality of processors are coupled to the bus 11 to provide input/output functions for connected networks. The plurality of processors includes in the embodiment described a first relatively passive type interface device IOM 13 and 14, an intermediate level semi-intelligent processing device IOS 15 and 16, and a more powerful processing system IOP 17, 18, 19, and 20. The IOP boxes 17–20 include interfaces to both high speed buses 11 and 12.

Each of the plurality of processors in the figures has at least one associated network connection. The system also supports other types of devices, such as compression engines or the like, which may not have a direct network connection, but provide resources to the other processors. Thus, the IOM boxes 13 and 14 include two network connections each, which might be coupled to, for instance, Ethernet or token ring local area networks. The IOS boxes 15 and 16 include five connections each, coupling to local area networks, such as Ethernet, FDDI, token ring, or the like.

The IOP boxes 17–20 have eight network connections each and handle much higher throughputs.

Figure 2:
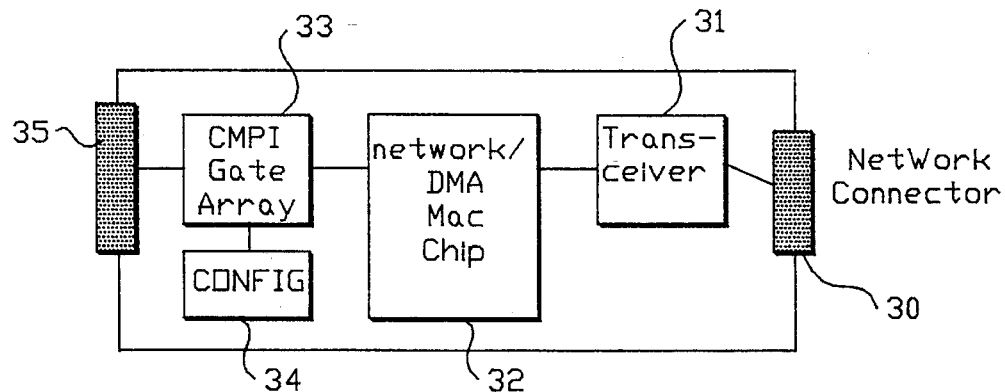
FIG. 2 provides a block diagram of a basic input/output module (IOM) which may be used in the system of FIG. 1.

The basic IOM box 13 is illustrated in FIG. 2. It includes at least one network connector 30 which is coupled to a transceiver 31 and a network/DMA MAC chip 32, such as commercially available for a given type of network. This chip is coupled to a bus interface chip 33 with associated configuration data 34, and through the interface chip 33 to a backplane bus connection 35. The bus interface chip 33 is described in detail in our co-pending U.S. patent application entitled INPUT/OUTPUT BUS ARCHITECTURE WITH PARALLEL ARBITRATION, application Ser. No. 08/033, 008, filed Feb. 26, 1993, invented by Mark Isfeld, et al. Such application is incorporated by reference as if fully set forth herein to fully provide a detailed description of the bus architecture in the preferred system. However, this particular bus architecture is not intended to be limiting. A wide variety of high speed parallel buses are available to those of skill in the art. The IOM box shown in FIG. 2 relies primarily on the central control box COX 10 for the management of data transfer and control functions.

Figure 3:
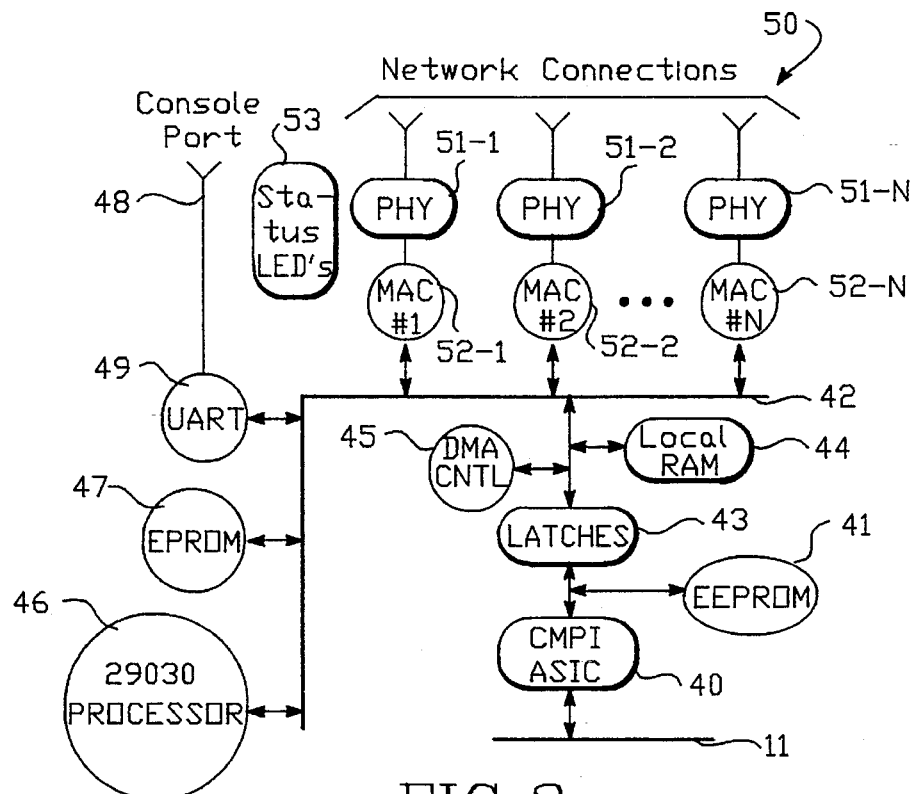
FIG. 3 provides a block diagram of a semi-intelligent I/O module (IOS) such as used in the system of FIG. 1.

The semi-intelligent I/O processor lOS, 15 and 16, is illustrated in FIG. 3. As can be seen, this system is connected to the bus 11 through the bus interface chip 40. A non-volatile memory device 41, such as an EEPROM, stores configuration data and the like for the bus interface 40. A data interface to an intermediate bus 42 is provided through latches 43. Also, a local memory 44 and a DMA control module 45 are coupled to the intermediate bus 42 and the local memory 44. An intelligent microprocessor 46, such as the Am29030 manufactured by Advanced Micro Devices, Inc., is coupled to the intermediate bus 42. A flash programmable read only memory 47 provides storage for programs executed by the processor 46. A console port 48 is provided through a UART interface 49 to the bus 42. A plurality of network connections, generally 50, are coupled to the bus 42 through respective physical interfaces 51-1 through 51-N, and medium access control MAC devices 52-1 through 52-N. The box may include status light emitting diodes 53 connected and controlled as desired by the particular user.

Figure 4:
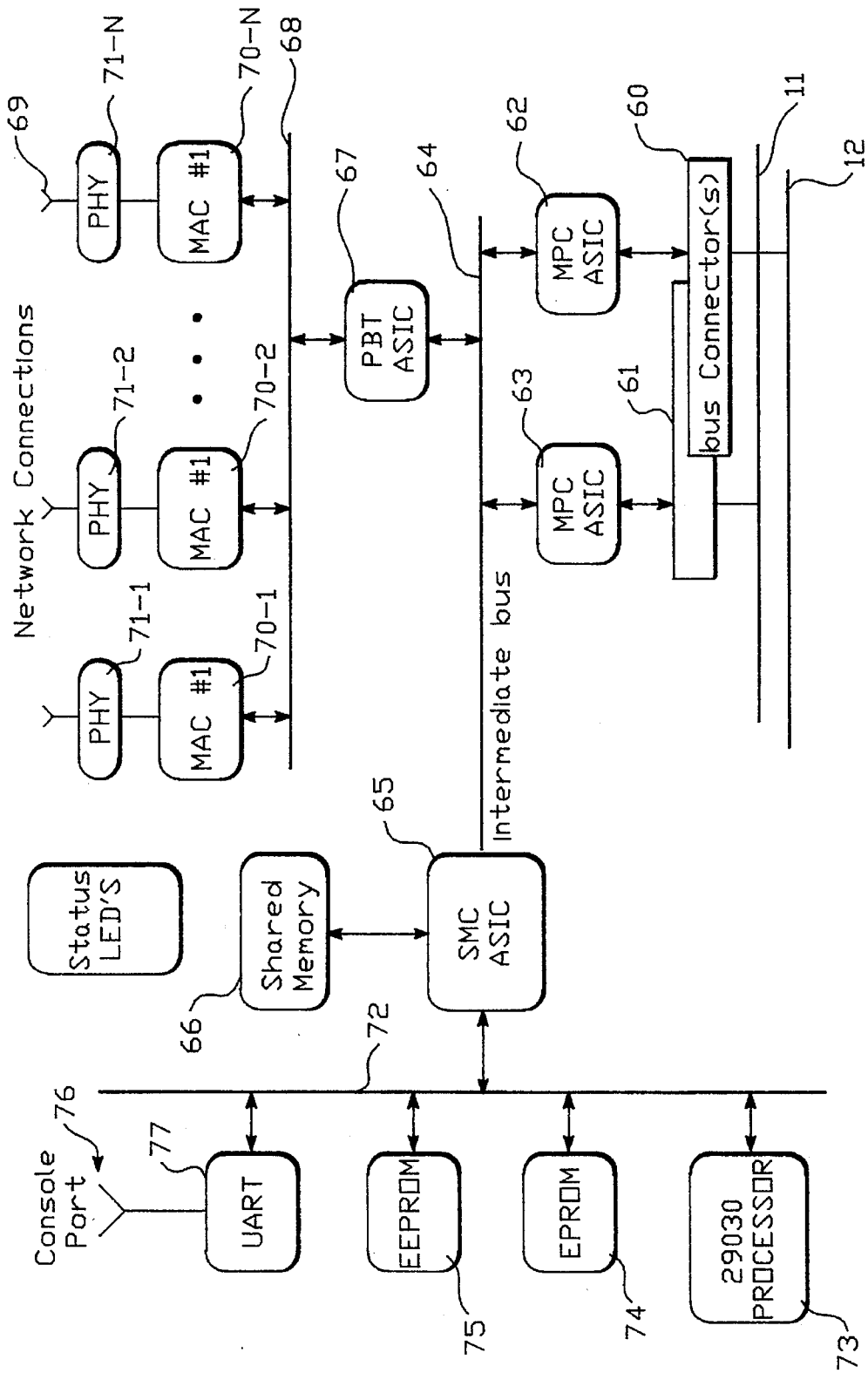
FIG. 4 provides a block diagram of an enhanced function input/output processor (IOP) such as used in the preferred embodiment of the system of FIG. 1.

FIG. 4 illustrates the block diagram of the higher performance input/output processor IOP of FIG. 1. This system is coupled to the first bus 11 and the second bus 12 through respective bus connectors 60 and 61. The bus connectors 60 and 61 are coupled to message passing controller ASICs 62 and 63, respectively, which are, in turn, connected to an intermediate bus 64. The intermediate bus (also called internal bus herein) is coupled to a shared memory controller 65 which controls access to a shared memory resource 66. The intermediate bus 64 is coupled through a peripheral bus interface 67 to a network data bus 68. On the network data bus, there are a plurality of network connections, generally 69, made through respective MAC devices 70-1 through 70-N and physical interfaces 71-1 through 71-N. The shared memory controller 65 is also coupled to a control bus 72, which is connected to a high speed processor 73, flash programmable read only memory 74 storing programs, non-volatile EEPROM memory 75 storing parameters and possibly code, and a console port 76 through a UART interface 77.

Figure 5:
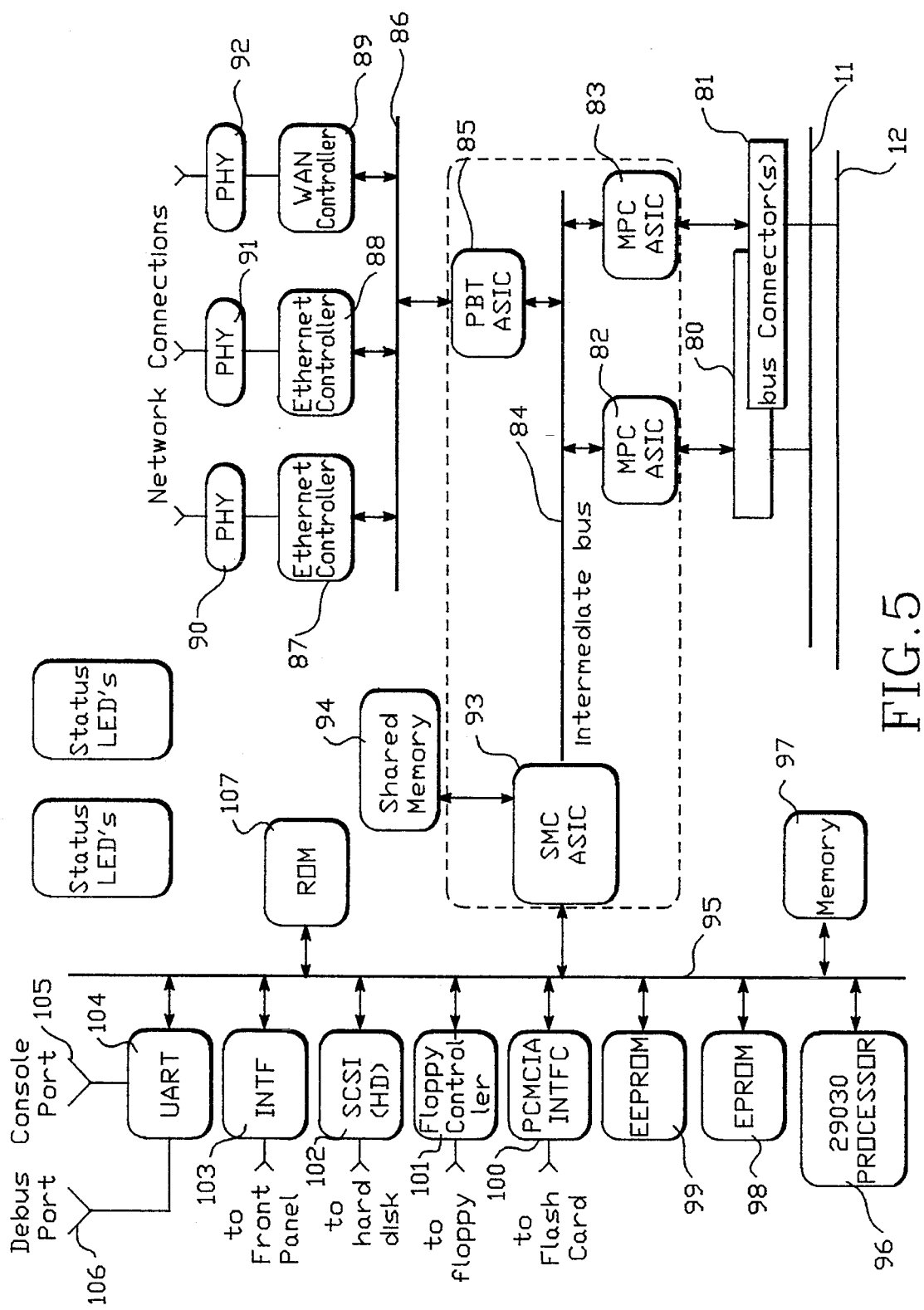
FIG. 5 provides a block diagram of the central processor (COX) used for providing a shared resource for the other processors coupled to the buses in the system of FIG. 1.

The central control box is illustrated in FIG. 5. This box is basically similar to the box of FIG. 4. Thus, the box includes a first bus connector 80 and a second bus connector 81 for the first and second buses, respectively. Message passing controllers 82 and 83 are coupled to the bus connectors 80 and 81, and to an intermediate bus 84. Optionally, a peripheral bus transfer ASIC 85 is connected between the intermediate bus and a peripheral bus 86, to connect an Ethernet controller 87, an Ethernet controller 88, and a wide area network (WAN) controller 89 (or other interface devices) through the peripheral bus 86 and to the respective networks through physical connections 90, 91, and 92.

The intermediate bus 84 is also connected to a shared memory controller 93, and through the shared memory controller 93 to a shared memory resource 94. The shared memory controller 93 is also connected to a processor bus 95 which interconnects a processor 96, working memory 97 for the processor, flash memory 98 for processor code, EEPROM memory 99 for static code and parameters, a PCMCIA interface 100 for accepting flash memory cards for upgrade purposes and the like, a floppy disk controller 101 for driving a floppy disk, an SCSI interface for connection to a hard disk 102, an interface 103 for connection to a front panel providing a user interface, and a dual UART device 104 which provides for connection to a console 105 and a debug port 106. In addition, read only memory 107 may be connected to the processor bus 95. The native PCMCIA interface is provided for enabling a redundant reliable boot mechanism.

The software processing for a high performance router breaks fairly cleanly into two major pieces: the data forwarding functions and the control/management functions. The data forwarding functions include device drivers and link-layer protocols such as HDLC-LAPD in addition to the perpacket processing involved with recognizing, validating, updating, and routing packets between physical interfaces. The control and management software functions include routing protocols and network control protocols in addition to all configuration and management functions.

In general, the data forwarding functions are optimized for maximum performance with near real-time constraints, whereas the control and management functions simply run to completion on a time available basis, with some exceptions. When system performance is measured, it is primarily the forwarding capacity of the router in terms of bandwidth, packets-per-second, and fan-out that is considered, with an implicit assumption that the control and management functions will be sufficient. The control and management software comprises the vast majority of the code and can use large amounts of data space, but most of the data space consumed by these functions need not be shared with the forwarding software.

In the system of FIG. 1, the forwarding function is replicated in the semi-intelligent and full function processors lOS and IOP, leaving the remaining software running on the single central processor COX. Thus, the forwarding functions run on processors near the physical interfaces, and new mechanisms, including hardware supported message passing according to the present invention, tie the distributed processing modules to each other and to the central control functions. This architecture allows some forwarding functions to be distributed, while others are centralized on the central control box. The message passing architecture enables significant flexibility in the management of the location of software in the router architecture.

II. MESSAGE PASSING STRUCTURES AND PROCESSOR

The basic message passing technique is illustrated with respect to FIG. 6. In FIG. 6, the process of receiving a packet on interface 2 on card 4 is illustrated. Thus, the packet is received and proceeds along arrow 100 into a buffer 101 in the card. While it is in the buffer, the processor parses the packet, looks up the destination for the packet, and processes it according to the routing code. Next, a software header 102 is added to the packet. Then, the packet is added to a queue 103 for message transmission according to a transmit priority classification as described below. The hardware 104 in the card sends the message in a fragmented state, which includes a first message packet 105 which has a start identifier, a channel identifier, and a destination slot identifier (in this case, slot 5, channel 4), without having to obtain permission from a destination device to transmit the message. The first packet includes the software header which identifies the destination interface as interface 3 in processor 5, the length of the packet, etc. Packet 105 includes the first part of the packet data. The next fragment of the message 106 includes a header indicating the destination slot and its channel as well as packet data. The final packet 107 includes the destination and its channel, and an indicator that it is the last packet or "end" in the message. Finally, this last packet is filled with the balance of the message data. These three fragments of the message are transferred across the high speed bus 108 to the destination slot 5. In slot 5, the hardware 109 receives the packet, reassembles it in the next free buffer 110, and queues the message to software in the queue 111. The software and hardware in the IOP at slot 5 transmit the packet out interface 3 in card 5 across the arrow 112.

This message passing protocol is a "push" paradigm, which has the effect of using the bus more like a LAN than a normal memory bus. This has several important features:

Receiver allocates/manages buffering independent of transmitter.
Single "address" used for all data sent in one message.
Bus addressing is per-card, port-level addressing in software header.
Bus used in write-only mode.
No shared memory usage.
Reliability not guaranteed (must be supplied at a higher level, if needed).
Messages are sent as a stream of cells, interleaved with other message transmissions.

The paradigm provides the following benefits:
Improved protection/robustness.
Reduced driver overhead.
Reduced complexity, per-destination queues not required, etc.
Improved bus utilization (about 3×previous).
Bus is not monopolized by one device during a message transmission.
Other slots can interleave cells on the bus, so they do not have to wait for a long message from another slot.

In FIG. 6, IOP4 receives a packet, and sends it to IOP5. Note that the input card simply sends the message to the output card. The sender does not need to allocate buffers or get permission from the receiver. A hardware address specifies the slot that should receive the message. A software message header specifies the message type (control, data, etc.), its actual length, output port number, etc. The output card is responsible for dropping messages if there is too much traffic.

FIG. 7 is an example of how messages will flow in the system of FIG. 1 in order to forward a packet. In this example, the path that a packet follows to a destination unknown by the receiver card IOP 1 would travel is shown.

Packet enters from network attached to IOP1 (transition 1). The local processor looks up the destination (whether it be bridged, or routed by various protocols), and finds it does not know what to do with this packet. It generates a high priority cache lookup request and sends it to the COX. The COX looks up the destination in its database, and sends back the answer to IOP1(3). IOP1 adds the destination to its cache, and finds the held packet. Based on its transmit priority relative to other messages, IOP1 then directly forwards it to IOP2(4) as a message complete with instructions on what to do with the packet, without obtaining permission from IOP2 to transmit. IOP2 examines the message header and determines it should transmit the packet out port X(5). IOP2 may not examine the actual packet in any way. It simply looked at a simple message header, and decoded the command to transmit the enclosed packet to port X.

If the packet originated from an IOM, then the IOM puts the packet in COX memory. The COX does the same functions as outlined above, for the IOM based packet. Packets destined for an IOM are sent to the COX which queues them for transmission. In other words, existing IOMs are just ports on the COX as far as the message passing paradigm goes.

Also notice that if IOP1 has the destination already stored in the local cache (normal case), then messages 2 and 3 are eliminated. In either case the packet data only travels across the bus once.

This system uses a layered architecture for communication between processors, with a common set of message passing services supporting both control and data paths. It utilizes the bus for the physical layer and either shared-memory DMA-based software or hardware-supported card-to-card transmissions to provide required services for various classes of messages. The three major classes of messages are:

Internal control messages: low latency (<10 ms), high reliability, low throughput.
Network control messages: medium latency (<250 ms), high reliability, low throughput.
Normal data packets: average (best effort) latency, average (best effort) reliability, high throughput.

Note that the system is designed to require only loose synchronization between processors. There are no critical real-time constraints on any control messages between processors that would cause the system to break if they were not met. All inter-processor control functions must tolerate messages lost in the hardware message passing layer. Some data loss will be acceptable. For instance, a route cache update or a port down message could be lost, as long as the system continues to run smoothly.

Figure 8:
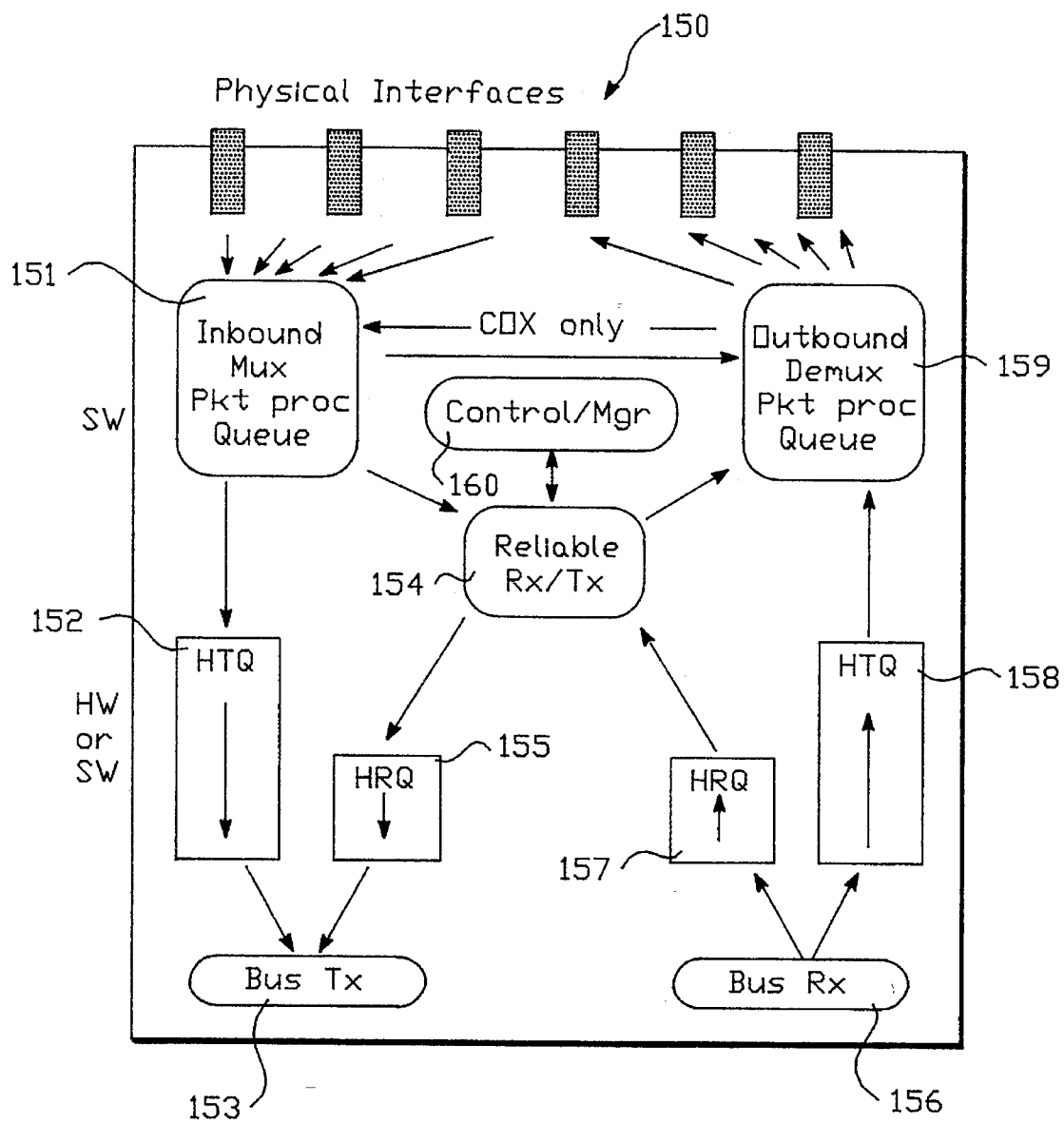
FIG. 8 provides a diagram of the dual queue structure and message paths for the bus interfaces in the system of FIG. 1.

At the lowest layer above the actual data movement function is a dual-queue structure, as illustrated in FIG. 8, which supports these message classes according to their primary service requirements. These queues may be supported in software and in hardware. One queue is designed to provide high reliability and low latency with relatively low throughput, and is used for the first two classes of messages, internal control messages and network control messages. The second queue is optimized for high throughput and supports the majority of the data traffic, the third class of messages.

Both control messages and data packets are encapsulated with a standard header which conveys the message type, destination addressing (output port, control interface, etc.), and other control information associated with the message. For internal control messages this additional information might include sequence numbers, event handles, etc., while data packets might have MAC encapsulation type, transmission priority, etc.

FIG. 8 illustrates the basic dual queue structure used in the messaging paths. In this structure, the card will include a plurality of physical interfaces, generally 150. Inbound data from the physical interfaces is placed in an inbound multiplexing packet processing queue 151, generally implemented by software. From this queue 151, the packets are transferred to a high throughput queue 152 implemented at either hardware or software. From the high throughput queue, packets are transferred out onto the bus transmission path 153.

Alternatively, communications which must be guaranteed, reliable, or low latency are passed through a reliable receive and transmit block 154 through a high reliability queue 155 out through the bus transmit function 153.

Similarly, data received from a bus receive path 156 is passed either through a high reliability queue 157 or a high throughput queue 158. The high reliability queue is passed to the reliable receive and transmit block 154 into the outbound demultiplexing packet processing queue 159. Alternatively, control and management functions 160 receive data through the reliable path. The outbound software queue 159 sends appropriate packets to the physical interfaces 150. There may also be a path between the inbound and outbound software queues 151 and 159.

As illustrated in the figure, preferably the lower level queues 152, 155, 157, and 158 are implemented in the hardware assisted environment while the higher level queues 151 and 159 are software executed by a local processor on the board. However, in the central processor unit, the lower level queues may be implemented in software which serves the IOM blocks described above with respect to FIG. 2, and interface processors may be implemented in the particular application with these queues in software.

For transmission of messages onto the bus, throughput and latency dictate the transmission priority classification. Network and internal control messages with low to medium latency and low throughput are classified with higher transmission priorities. Normal data packets are classified with lower transmission priorities. Thus, messages classified with higher transmission priorities will be transmitted onto the bus before messages classified with lower transmission priorities. For reception of messages, reliability dictates the receive priority. Messages classified with higher receive priorities are queued and delivered to the network port before those messages classified with lower receive priorities.

FIG. 9 provides a table of the various data transfers supported by the system of the preferred embodiment. The table indicates the transfer type across the top row, including a message transmit, a shared memory write, a shared memory access read, a shared memory read, a memory move, a cell transmit, a message receive, a bus input/output and bus memory write, a bus read, and a promiscuous receive transfer. The table summarizes the source of the source address, the source of the destination address, the direction of the transfer, the origin of the cycle, the receive activity, the data buffering, and the alignment and packing functions for each of the different transfers. The summary table can be referred to while reviewing the discussion of FIGS. 10–33 below.

Thus, the system includes a number of hardware and software system buffer structures and control and management modules. Generally, data fragments are gathered and byte-wise aligned to form cells which move across the bus. At the receiving end, cells may be placed into a receive buffer as allocated by the receiving processor.

The basic structures include a command list, a free list, and a receive list. The command list is a managed string of four word entries through which software instructs hardware to perform certain data transfers, generally across the bus. The blocks of memory to be moved may be thought of as buffers, or as data fragments. There is no hardware requirement for these chunks of data to be aligned or sized in any specific way. Implicit in the source and destination address along with the command list entries control field is the type of data transfer. The command list is built in synchronous dynamic RAM (SDRAM) and may be FIFOed (or cached) within the message passing controller hardware. Software writes entries into the command list, while hardware reads and executes those commands. The command list is managed via command head and command tail pointers.

The free list is a series of single word entries pointing to available or "free" receive buffers which may be allocated by hardware for buffering inbound bus data. The free list is maintained in SDRAM and may be FIFOed or cached within the message passing controller hardware. Software places free receive buffers into the free list so that hardware may then allocate a free buffer to a given receive channel, as required by incoming data. Once the buffer is actually filled, hardware places the buffer pointer into one of two receive lists. Only software writes entries to the free list, and those entries are known to be valid by the contents of the software based free tail pointer. Hardware may read entries from the list, and the only indication of what has been read is the value of the hardware-owned free head pointer.

The receive list is a series of two word entries pointing to non-empty receive buffers which need the attention of software. The list itself is SDRAM resident and the list entries point to receive buffers which also reside in SDRAM. In addition to the physical address of the filled buffer, the receive list entry includes a flag and count field.

Figure 10A:
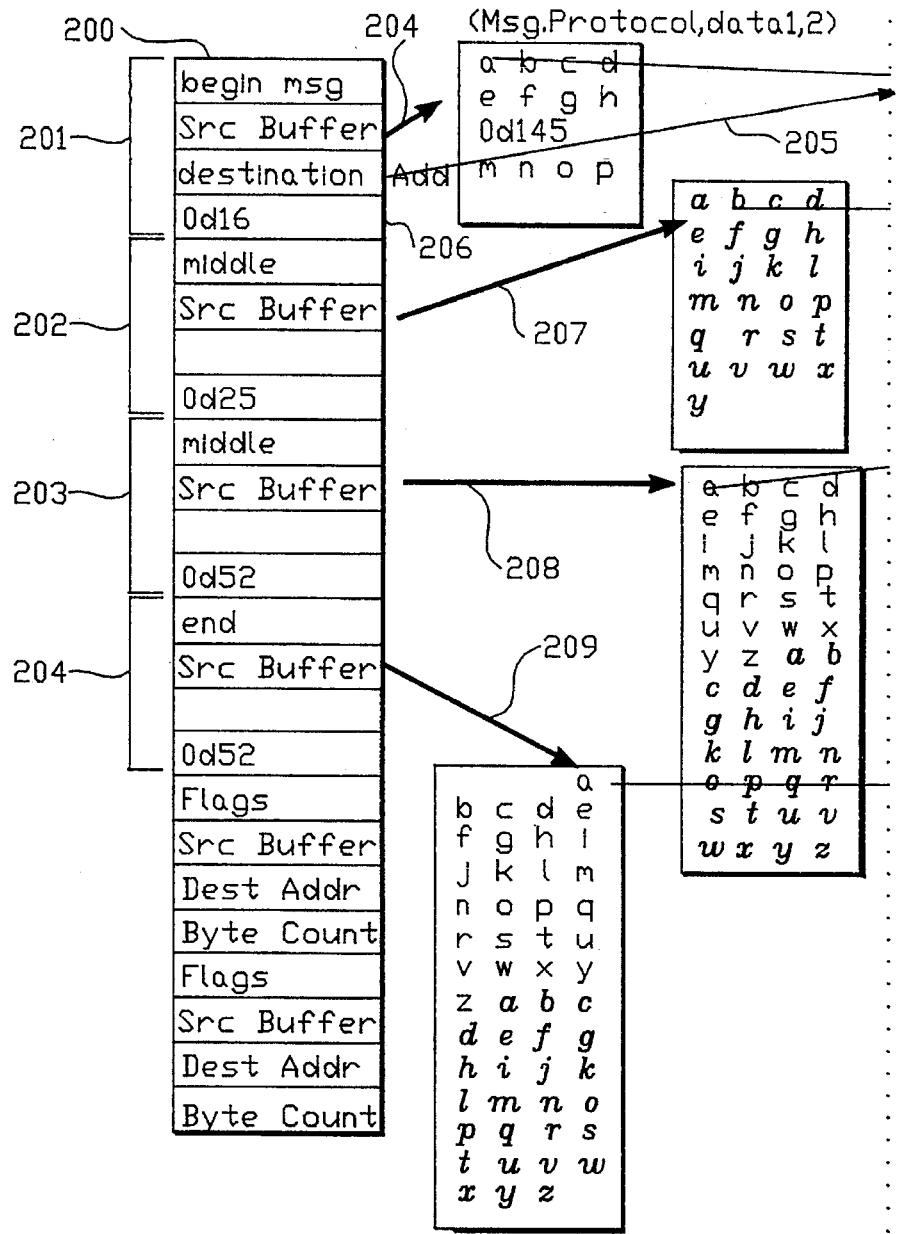
FIG. 10 illustrates the data alignment and packing for messages transferred on the bus.
Figure 10B:
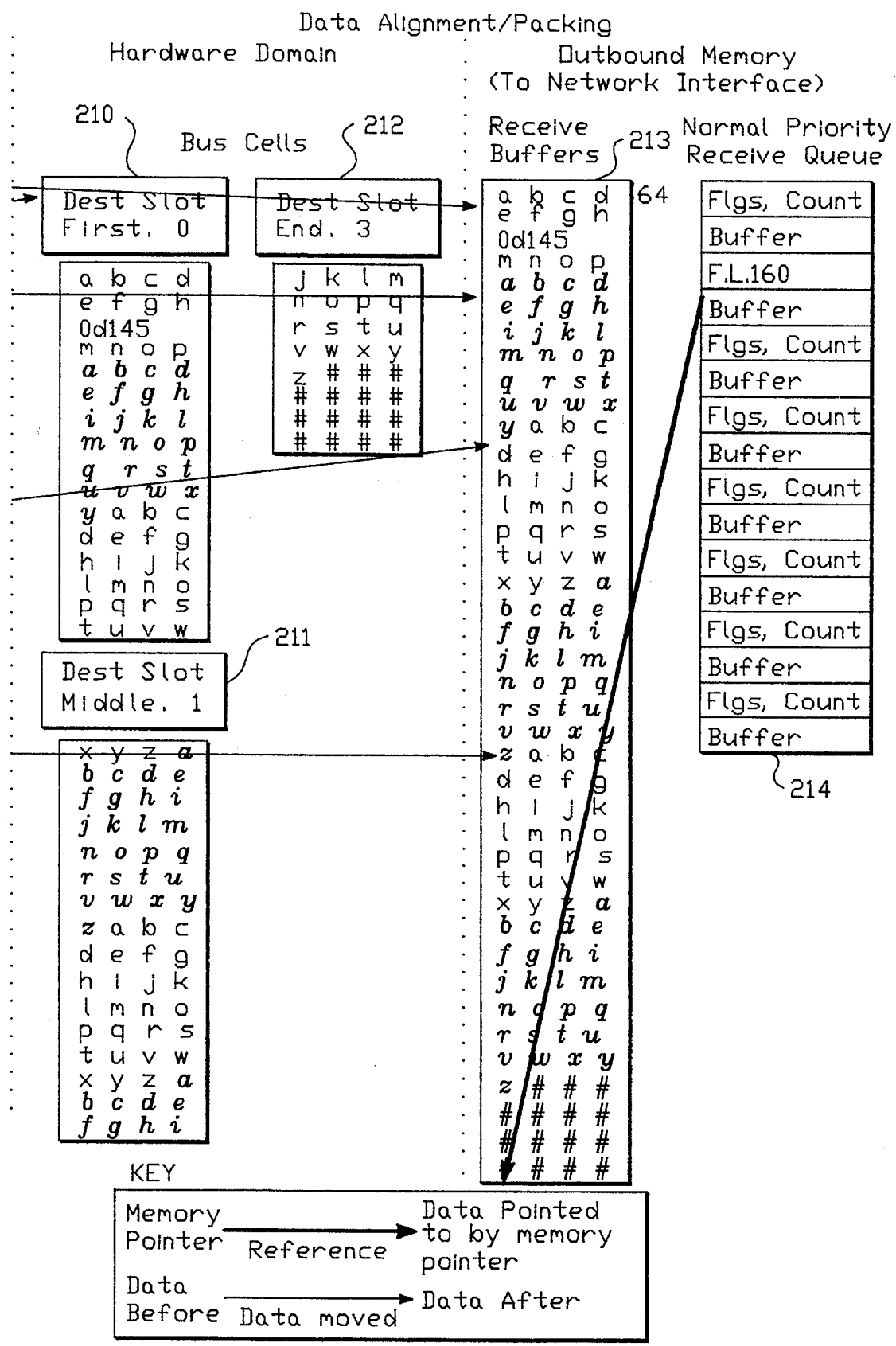

FIG. 10 shows the data flow beginning with a command list and eventually showing up on a normal priority receive list.

As can be seen in FIG. 10, a command list 200 includes a sequence of four word entries. For example, the four entries 201, 202, 203, and 204 characterize a transfer from a network interface in one processor across the bus to a network interface in a different processor. The first entry is recognized as the beginning of a message, includes a pointer 204 to a source buffer, a destination address 205 indicating the destination slot of the message, and a data length field 206. The next entry 202 includes flag indicating that it is a middle fragment, a pointer 207 to a source buffer, and a data length field. The third entry in the list 203 includes a control parameter indicating that it is a middle fragment, a pointer 208 to a source buffer, and a data length field. The final entry 204 includes a header indicating that it is the end of the message, a pointer 209 to the source buffer and a length field.

The transmit buffers pointed to by the pointers 204, 207, 208, and 209 contain the data of the message. They are concatenated according to the address and data length information in the command entries 201, 202, 203, 204 into message cells. The message packing buffers are used to generate a first bus cell generally 210 which includes a destination slot address, an indicator that it is the first cell in a message, and a count. The first cell in this example includes the contents of the buffer from pointer 204, the buffer from pointer 207, and a portion of the buffer at pointer 208.

The balance of the buffer at pointer 208 and the first portion of the buffer at pointer 209 are combined into the second cell 211. The balance of the buffer at pointer 109 is placed into the last cell 212.

The outbound path in the receiving processor loads the incoming bus cells and concatenates them into the receive buffers 213 and creates an entry in the normal priority receive queue for the receive buffer. The receive buffers 213 need not match the size of the buffers on the transmitting processor.

Figure 11:
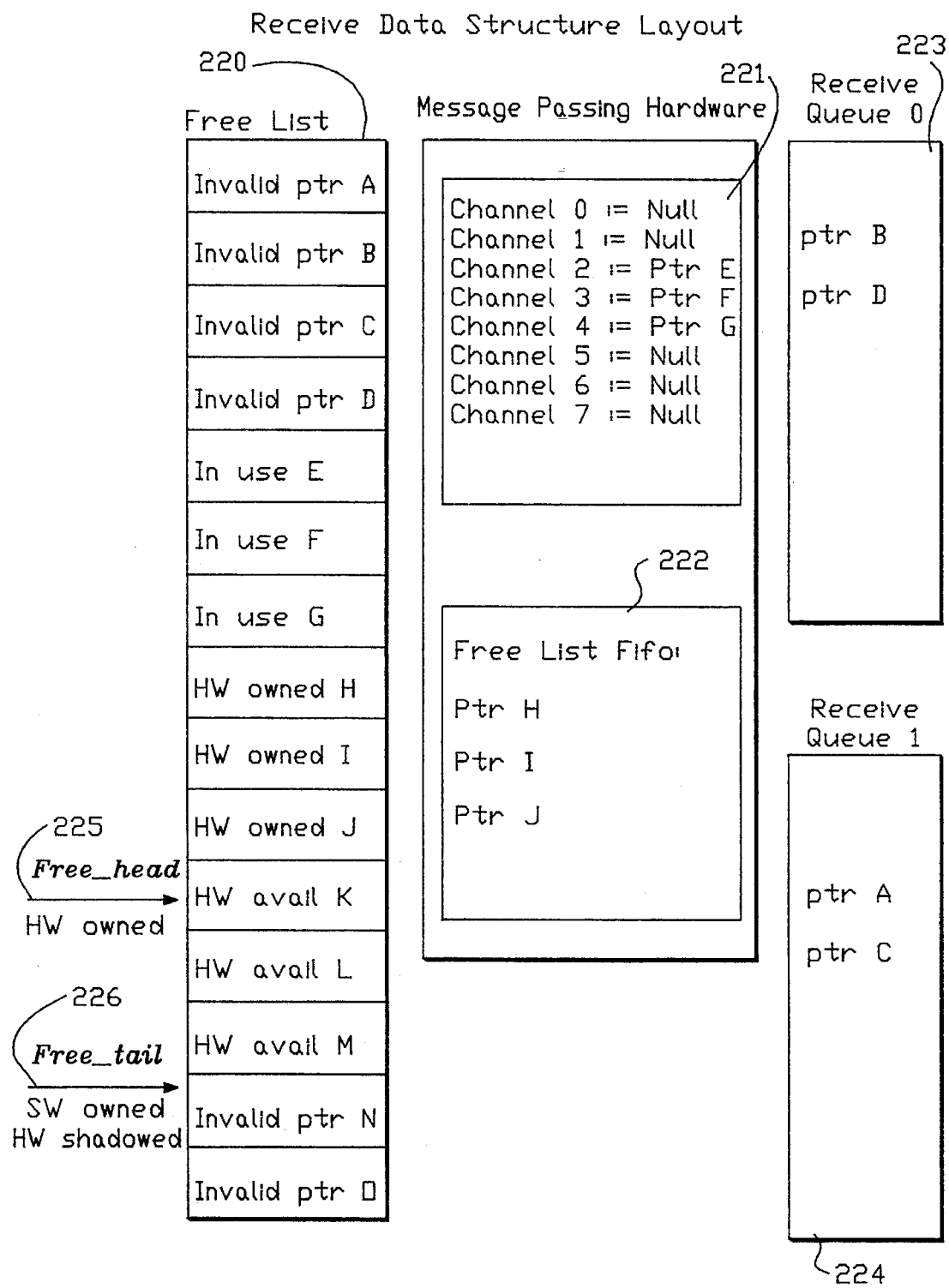
FIG. 11 illustrates the receive data structure layout for the bus interfaces.

The receive data structure is illustrated in FIG. 11. Basically, an incoming data stream is allocated to receive buffers using the free list 220, the channel status SRAM 221, the free list FIFO 222, and the high and low priority receive queues 223 and 224.

The hardware keeps state information for 32 receive channels. Each channel allows one message to be assembled into a cohesive message in memory. The channel keeps pointers to the next place to store the cell as well as a count and status information associated with the message. In one embodiment, receive channels are allocated to particular slots. Thus, slot zero on the bus will be given channel zero, for every processor on the bus; slot one will be given channel one; and so on.

The free list 220 is managed with a free head pointer 225 and a free tail pointer 226. Basically, buffers between the hardware owned free head pointer 225 and the software owned free tail pointer 226 are available for the hardware. Buffers pointed to by pointers above the free head pointer are either invalid because they contain data from previously received messages yet to be processed, are in use by a particular channel, or have been taken over by the hardware and loaded into the free list FIFO 222. In the example illustrated in FIG. 11, the invalid pointer N and invalid pointer O represent pointers to buffers which have been processed, and would be available for hardware when the free tail pointer is moved by the software.

Figure 12A:
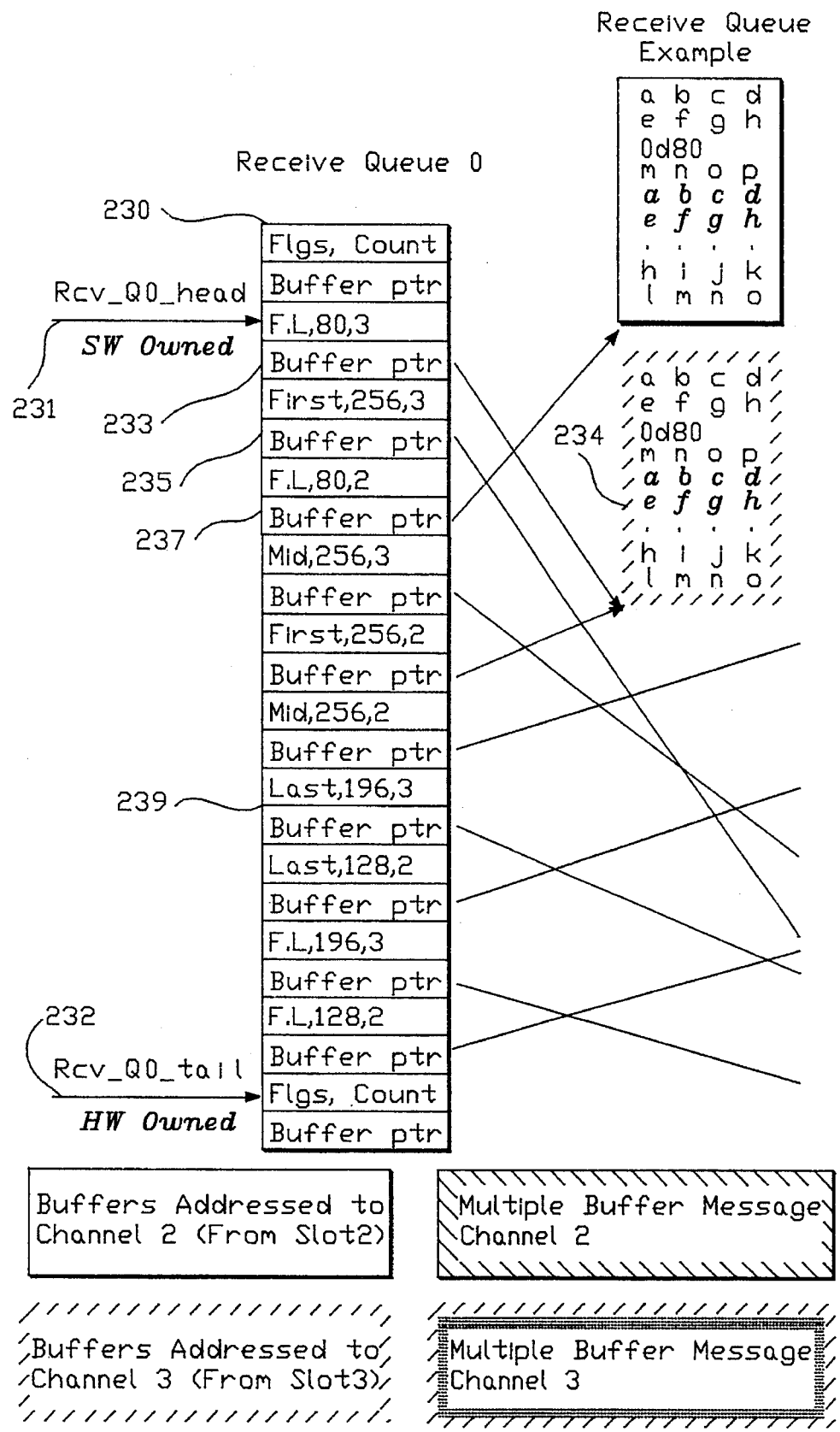
FIG. 12 provides a receive queue example for the bus interface according to the present invention.
Figure 12B:
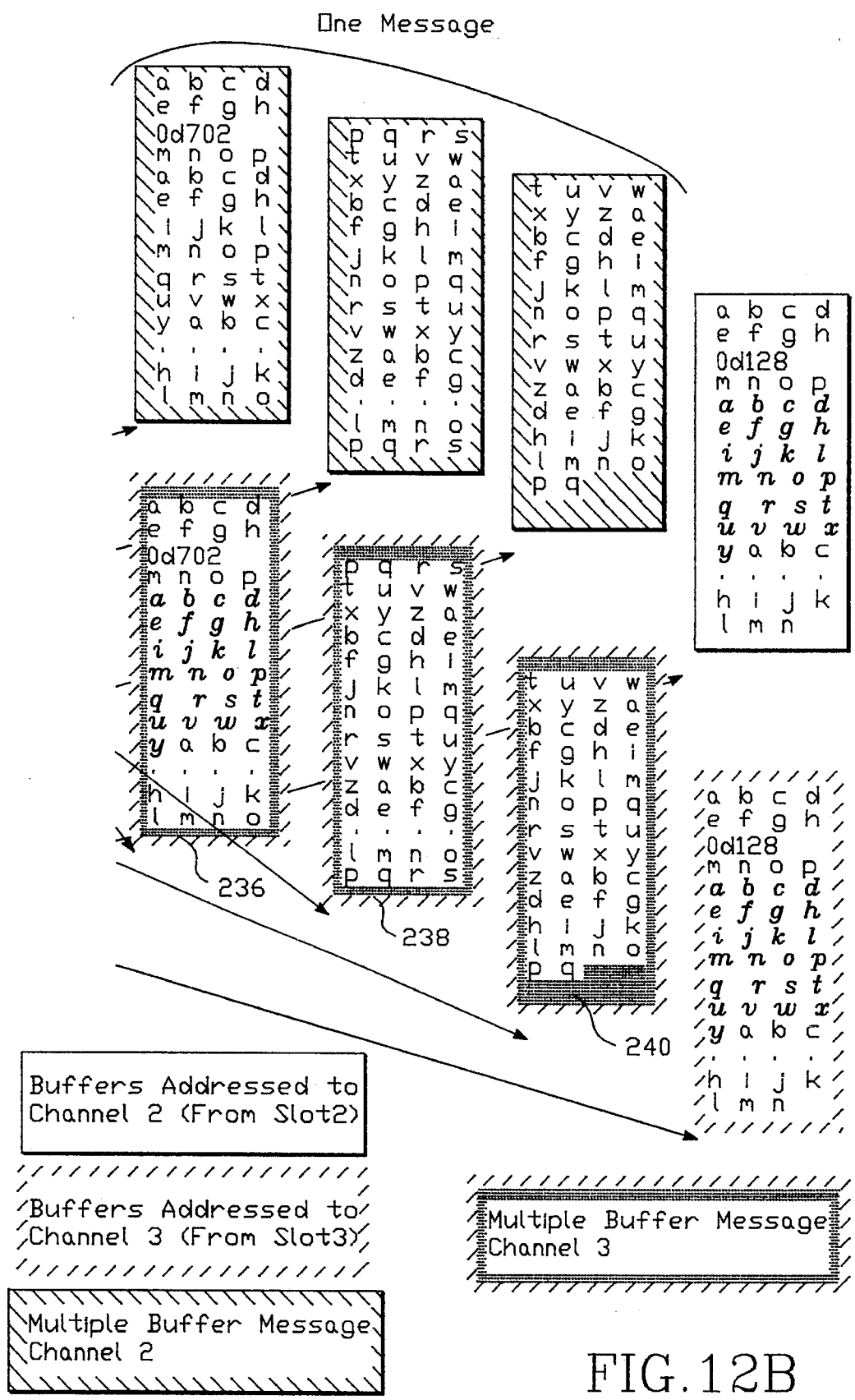

FIG. 12 provides a receive queue example. The receive queue 230 is managed using a receive queue head pointer 231 and a receive queue tail pointer 232. Each entry in the receive queue includes flags, count, and a buffer pointer for a specific buffer. Thus, those entries between the head 231 and the tail 232 contain pointers to buffers in use. Thus, an entry 233 includes a flag indicating that it is both the first and the last cell in a particular message, a length value, and a channel identifier. Also, it includes a buffer pointer to the buffer 234. As can be seen, this is a pointer to a buffer in channel three of length 80.

The next entry 235 is the first buffer with a length of 256 bytes in channel three with a pointer to buffer 236. The next buffer in this message is characterized by entry 237. It includes a pointer to buffer 238 and a parameter indicating that it is the middle transfer in the message. The last buffer in this message is characterized by entry 239, which includes a pointer to buffer 240. The other examples shown in FIG. 12 include transfers that are characterized through a second channel, channel two, as described in the figure.

Hardware calculates the difference between the free head and the free tail pointers and uses that value to decide when to stop accepting lower reliability messages in the receive queue to allow space to free up for additional messages. Alternatively, currently filled buffers could be dropped in favor of new buffers. This mechanism provides higher reliability to high reliability queue, and a lower reliability to high throughput transfer queue. Hardware will provide a number of watermarks that can be used to determine whether to accept new high throughput queue messages, or whether to drop them. The high throughput messages will be dropped so that the free list will not become depleted and high reliability queue messages can always be received. The source of the high reliability queue messages either has to have exclusive permission to send X number of frames, or get new permission occasionally through a handshake protocol, or the sender can rate limit requests to some number/second that the receiver must be configured to handle.

This mechanism will also be used to provide several levels of priority to provide some level of fairness among the high throughput traffic. The concept is to mark a small number of packets per second as high priority, and the rest as normal priority. The receive hardware will start dropping normal priority messages first, and this should guarantee that each slot can get data through, even in the case of another sender trying to hog the bandwidth.

Figure 13:
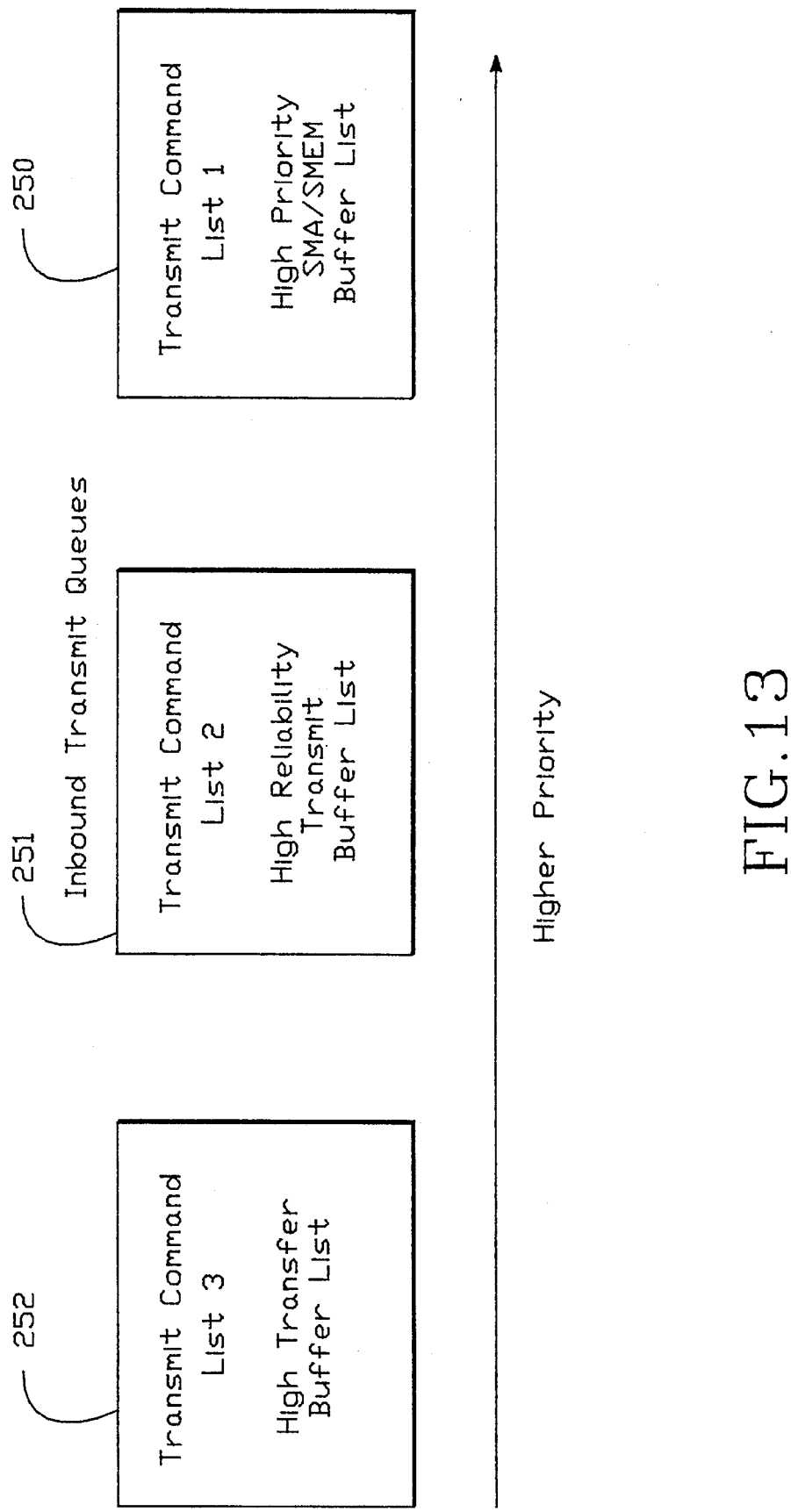
FIG. 13 illustrates the inbound (from network interface to bus) transmit queues or command lists for the bus interfaces according to the present invention.

As illustrated in FIG. 13, there are three command lists according to one embodiment of the invention. The first command list 250 includes a high priority SMA/SMEM transmit buffers list. The second command list 251 includes a high reliability transmit buffer list, and the third transmit command list 252 includes a high transfer throughput buffer list.

These three command lists each have different priorities. The hardware will process all commands from the highest priority list first, followed by all commands in the second priority list, followed by all commands in the lowest priority list. If a new command is entered in a high priority list, the hardware will execute that command next, after completing the current command. There are no hardware restrictions as to what kind of commands can be put in each command list. However, the intended use of the highest priority list is to process SMA/SMEM requests. The middle priority is intended to be used for low latency, high reliability packets, and probably will have SMA/SMEM commands as well as message send commands. The lowest priority is intended for normal data traffic, and will have a variety of commands also.

FIGS. 14–33 illustrate the data paths and address paths for each of the transfer types listed in the table of FIG. 9 through message passing controller hardware. The data path structures and the address path structures are the same for each of the respective data path and address path figures, and will be given like reference numbers.

Figure 14:
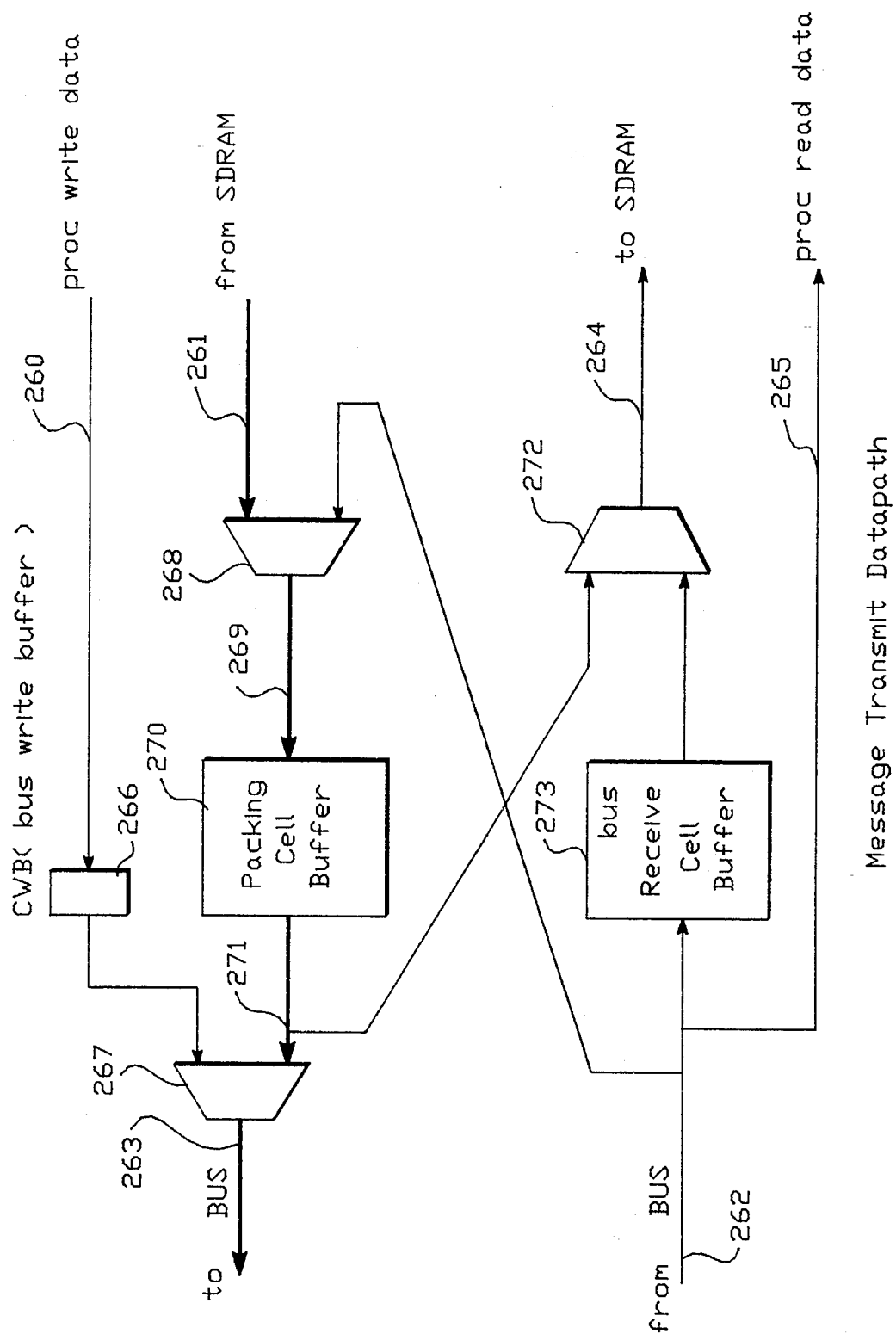

The message transmit data path is illustrated in FIG. 14. The possible sources of the data include a processor write data on line 260, data from the local synchronous DRAM (SDRAM) on line 261, and data from the bus on line 262. Data is directed to the bus on line 263, to the local synchronous DRAM on line 264, or to the local processor directly during a processor read operation on line 265. The processor write data is supplied through a bus write buffer 266 to an output multiplexer 267. Data from the SDRAM on line 261 is supplied through multiplexer 268 across line 269 to a packing cell buffer 270 including three 16 word blocks of memory. The output of the packing cell buffer 270 is supplied on line 271 to the output multiplexer 267. It is also supplied in feedback to the inbound multiplexer 272.

Data from the bus on line 262 is supplied to a receive cell buffer 273, including four 16 word blocks of memory, the output of which is supplied as a second multiplexer 272. Also, data from the bus is supplied as a second input to the multiplexer 268 which supplies input to the packing cell buffer 270. Further, data from the bus is supplied on line 265 directly to the processor read path.

As can be seen in the figure, the message transmit data path is sourced from the SDRAM on line 261, and selected through multiplexer 268 into the packing cell buffer 270. From the packing cell buffer 270, it is supplied through multiplexer 267 out onto the bus.

Figure 15:
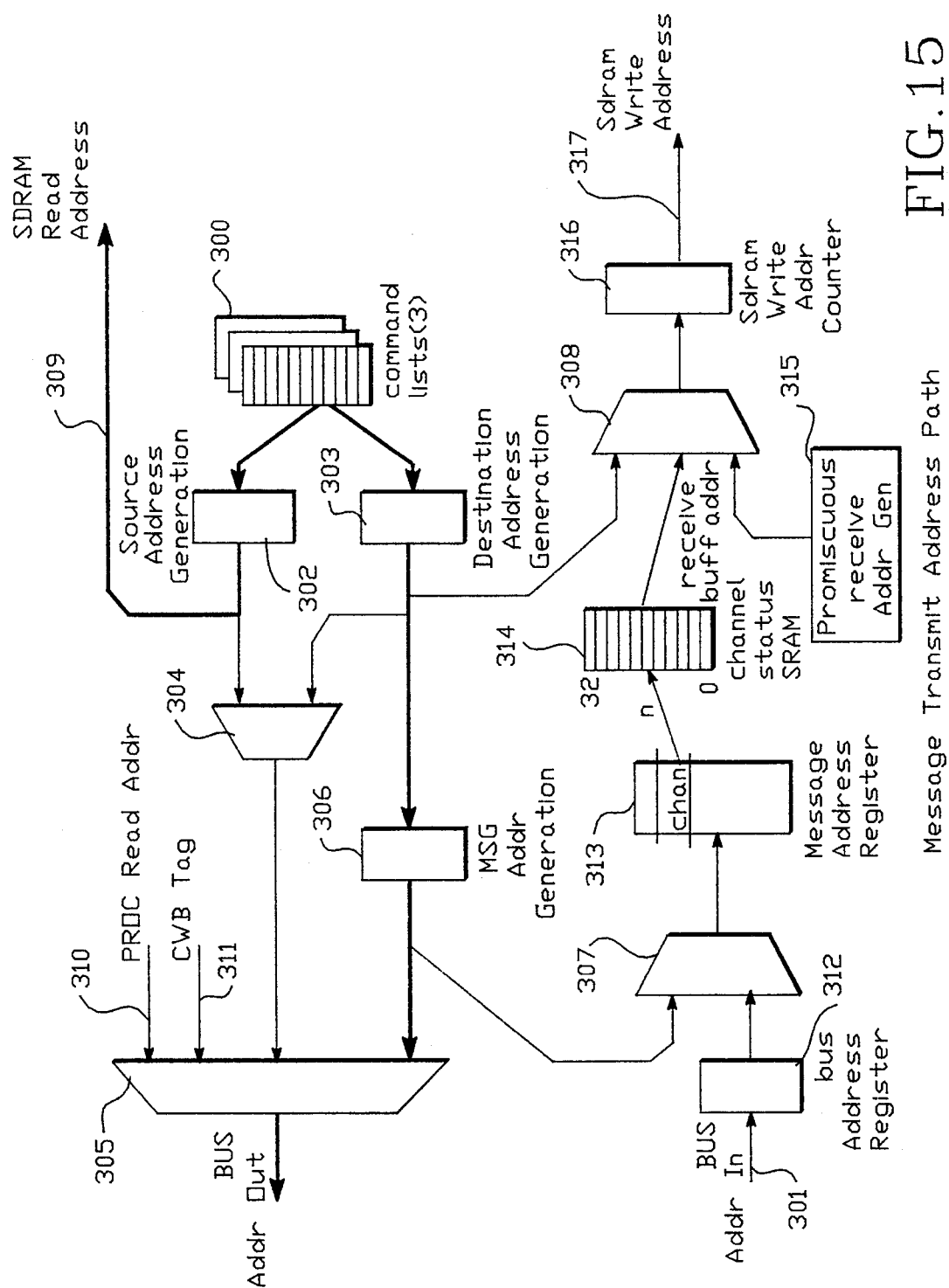

FIG. 15 illustrates the address path structures, and the message transmit address path. As can be seen, the addresses are generated in response to the command lists 300, and from the bus address in line 301. Addresses from the command list drive a source address generation block 302, and a destination address generation block 303. The output of the source address generation block is supplied through multiplexer 304 to the address out multiplexer 305. The output of the destination address generation block 303 is supplied through the message address generator 306 to the bus address output multiplexer 305, and to the multiplexer 307 in the inbound path. Also, the destination address generation output is supplied as a second input to multiplexer 304 in the output path, and as an input to multiplexer 308 in the input path. The source address generation block also sources the synchronous DRAM read address line 309.

Other inputs to the multiplexer 305 include a processor read address directly from the local processor on line 310, and a tag address on line 311.

The bus address register 312 is driven by the address in on line 301. The output of the register 312 is supplied through multiplexer 307 to the message address register 313. This address register identifies the channel for the message which is used to access the channel status RAM 314. The channel status RAM supplies a receive buffer address as an input to multiplexer 308. The mechanism also includes a promiscuous receive address generator 315 which supplies a third input to the multiplexer 308. The output of the multiplexer 308 is the synchronous DRAM write address counter 316, which drives the synchronous DRAM write address on line 317.

As can be seen, the message transmit address path originates with the command list 300. The command list drives the source address generation block 302 to supply a synchronous DRAM read address on line 309. Also, the command list drives the destination address generation block 303 to supply a message address generator 306. This basically supplies the slot number and channel number for the message to be supplied on the output bus.

Hardware initiates message transmit from a command list maintained in SDRAM. The message may consist of multiple fragments stored in SDRAM memory which are then packed into double-buffered outbound cells. The bus transfer address is really a message control field containing such things as a field identifying the cell as part of a message, the destination slot and logic channel, first and last cell control bits, and the cell sequence number within the message.

To transmit a message fragment:
read command list entry, decode as outbound msg fragment (for addr generation).
recognize first, middle, last fragment of a message (for outbound buffer control purposes).
request SDRAM read access (and check packing cell buffer availability).
wait for granting of SDRAM resource.
if buffer available, begin transferring data bytes/words from SDRAM to cell buffer.
continue to move data to cell buffers (with data flow control).
maintain cell buffer byte count and buffer status to implement flow control.
pack and align data within cells.
generate message address for bus (including first, last, sequence information).
generate bus transfer byte count field (depends on size of buffer flush).
queue cell for flush (i.e., bus transmit).
arbitrate for bus interface resource (other functions may request bus transfer).
wait until bus interface granted.
arbitrate for ownership of bus.
move data words from cell buffer to bus interface (with flow control).
generate or check outbound data parity.
complete burst write on bus.
log cell transmit status (success/fail).
free cell buffer for more outbound data.
move more data from SDRAM into cell buffer.
continue this process until fragment move is complete.
update command list pointer (indicates transfer complete).
To transfer a complete message:
process multiple fragments from command list as detailed above (a message may be a single fragment).
pack fragments into continuous cells without gaps.
flush partial cell buffer when message ends.
notification of message sent.

Figure 16:
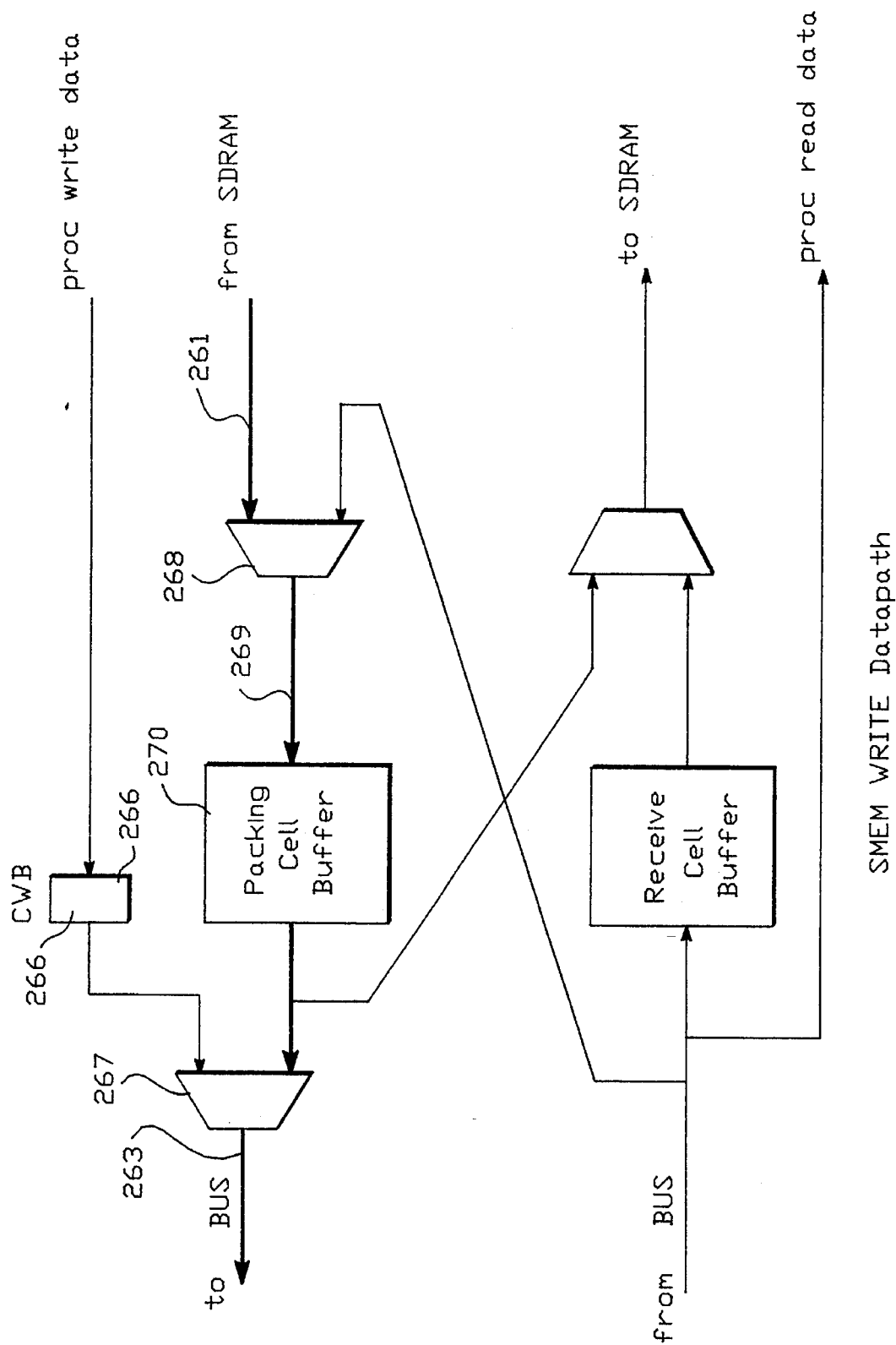
Figure 17:
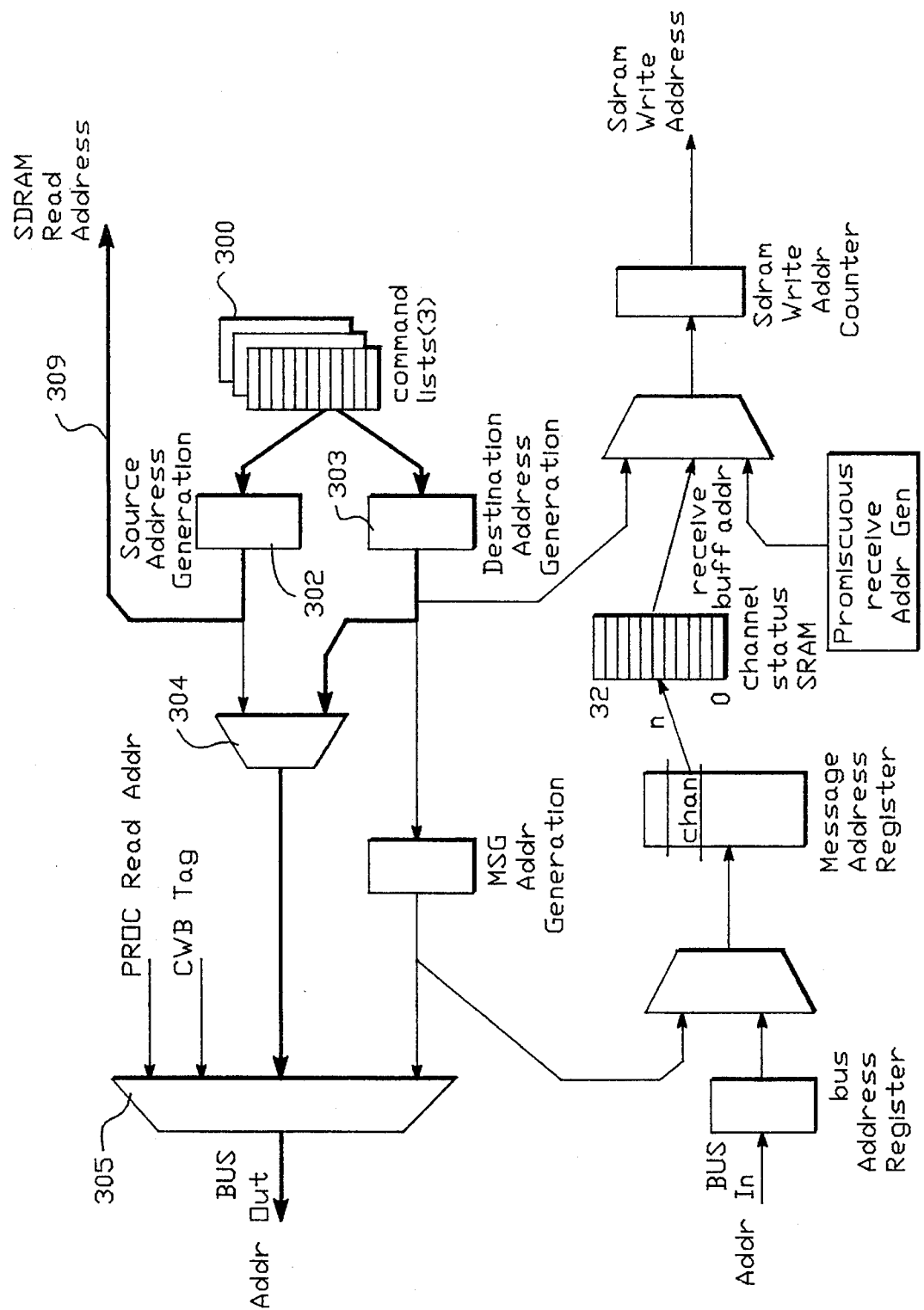

As can be seen in FIG. 16, the data path for an SMEM write begins with data from the synchronous DRAM on line 261, is selected through multiplexer 268 into the packing cell buffer 270, and from the packing cell buffer through multiplexer 267 out onto the bus 263. Addresses for the SMEM write operation originate with the command list as shown in FIG. 17. The command list supplies a source address seed to the source address generation block 302. The source address generation block 302 supplies addresses to the SDRAM on line 309. The destination address seed from the command list is supplied to the destination address generation block 303, which generates the bus addresses. These addresses are supplied through multiplexer 304, and multiplexer 305 out onto the bus.

Hardware initiates SMEM write transtar from a list of transfers. The same outbound fragment packing and byte-aligning mechanism is used as is used for message transmit. SMEM fragments are moved from SDRAM to buffers which are flushed out to bus. In this case, the bus transfer address is the physical memory destination, not a message control field. Any single block of SDRAM memory may be moved to any legal 64-byte-aligned bus shared memory location. As well, nonaligned memory fragments may be packed together into a continuous location in shared memory (by putting each successive fragment onto the command list).

The destination address is a physical memory location, not a message address. The flexibility of the command list control fields allows the software to gather and pack any blocks of data together and move them into shared memory using this command.

To transfer an SMEM WRITE fragment:
read list entry, decode as outbound fragment.
recognize first, middle, last fragment of a transfer (for outbound buffer control purposes).
request SDRAM read access (and check outbound cell buffer availability).
wait for granting of SDRAM resource.
if buffer available, begin transferring data bytes/words from SDRAM to cell buffer.
continue to move data to cell buffers (with data flow control).
maintain cell buffer byte count and buffer status to implement flow control.
pack and align data within cells.
generate burst address for bus (physical addr incrementing over multiple burst transfers of 8 words).
generate bus transfer byte count field (depends on size of buffer flush, 8 words max).
queue cell for flush (i.e., bus transmit).
arbitrate for bus interface resource (other functions may request bus transfer).
wait until bus interface granted.
arbitrate for ownership of bus.
move data words from cell buffer to bus interface (with flow control).
generate or check outbound data parity.
complete burst write on bus.
log cell transmit status (success/fail).
free cell buffer for more outbound data.
move more data from SRAM line buffer or DRAM into cell buffer.
continue this process until fragment move is complete.
update command list pointer (indicates transfer complete).
To transfer a complete burst:

process multiple fragments from command list as detailed above (an access may be a single fragment).
pack fragments into continuous cells without gaps.
flush partial cell buffer when access ends.
notification of transfer complete.

Figure 18:
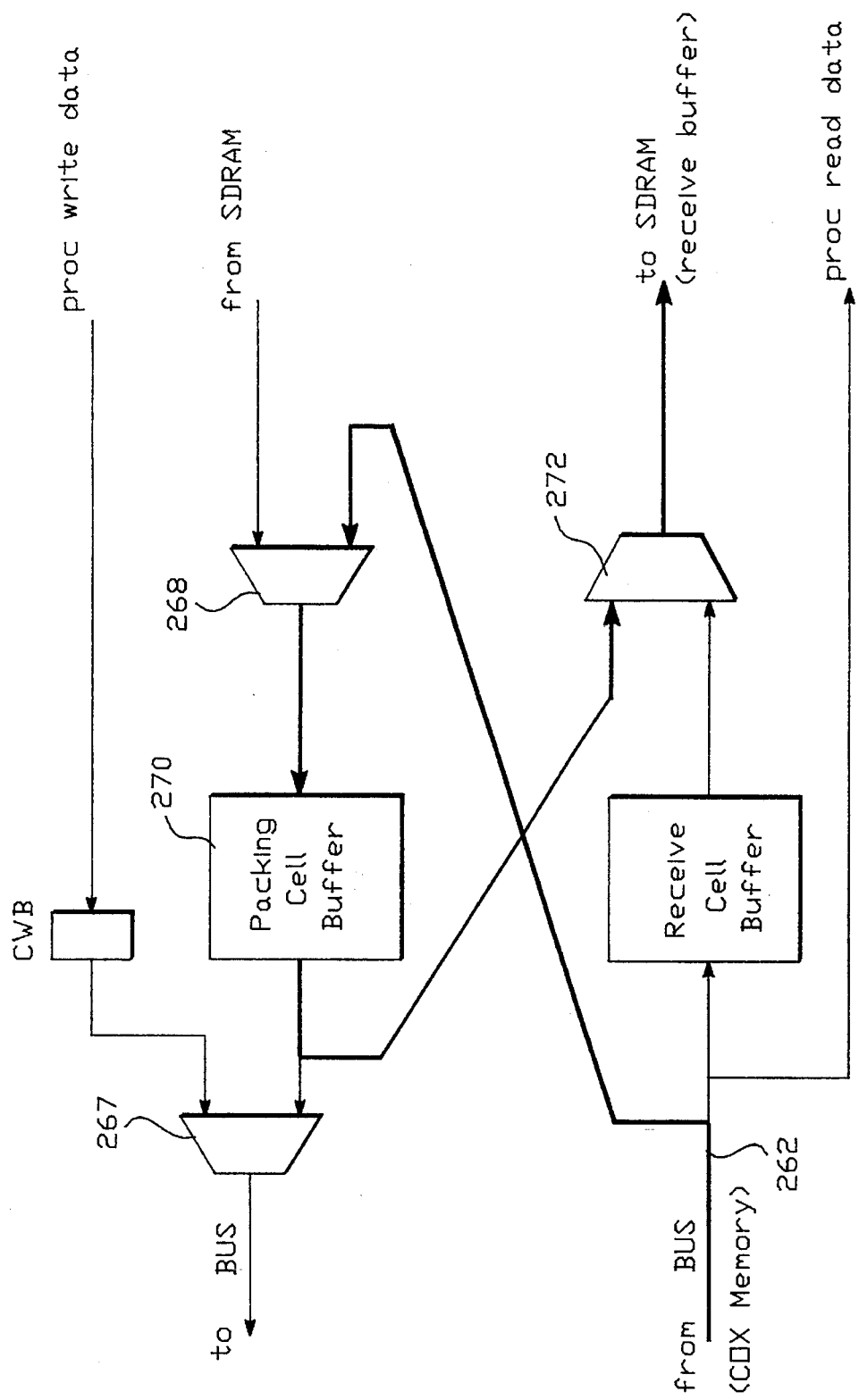

The SMA read data path is shown in FIG. 18. As can be seen, the data originates from the bus on line 262, and is selected through multiplexer 268 into the packing cell buffer 270. From the packing cell buffer 270 it is selected through multiplexer 272 into the local synchronous DRAM received buffer.

Figure 19:
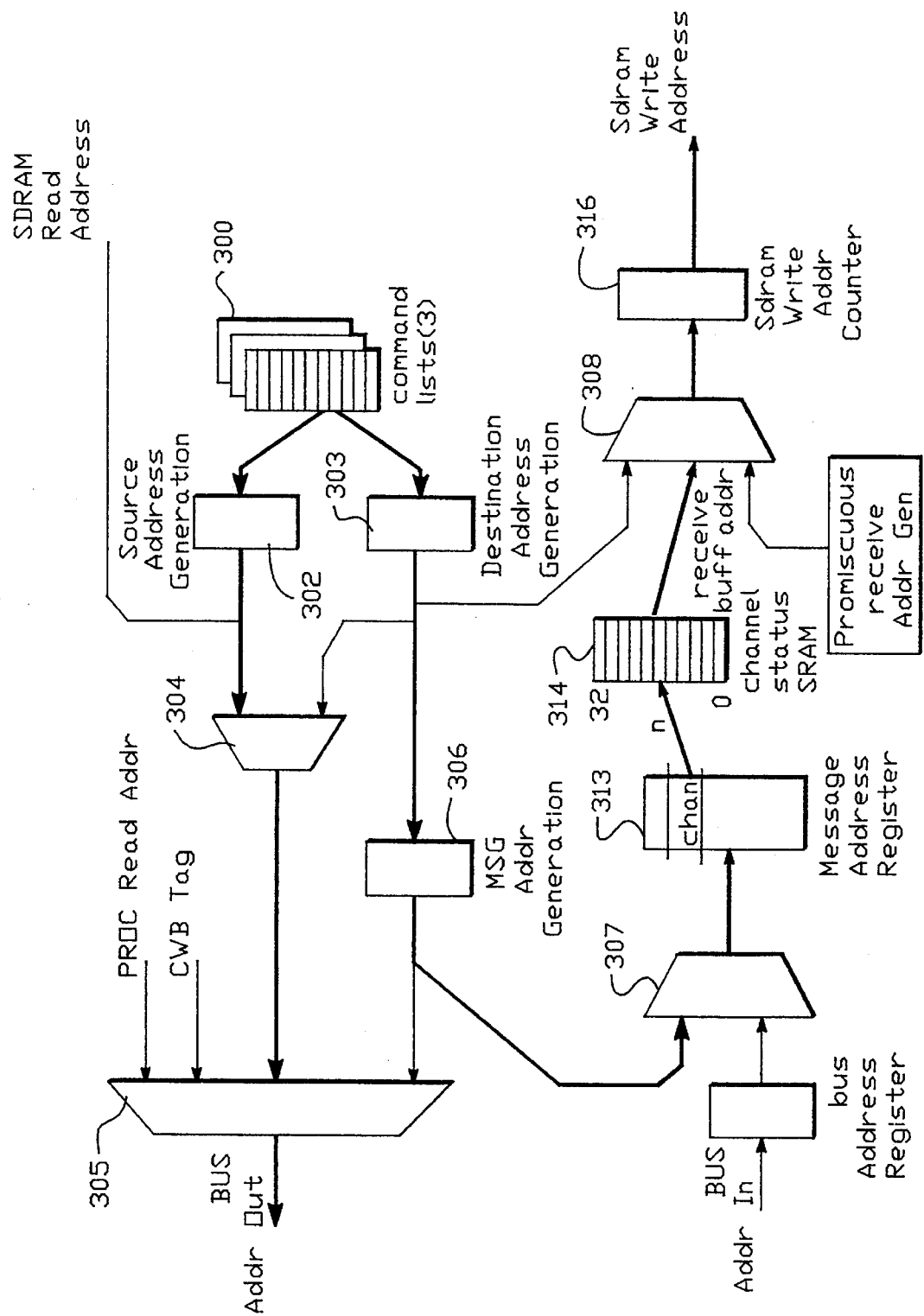

The address path for an SMA read is illustrated in FIG. 19. The source address originates from the command list 300 and is supplied through the source address generation block 302 through multiplexer 304 and multiplexer 305 out onto the bus. The destination address is originated with the command list 300, and is supplied through the destination address generation block 303. This generates destination addresses which are supplied to the message address generation block 306, and from block 306 through multiplexer 307 into the message address register 313 which identifies the appropriate channel. The channel is accessed in the channel status RAM 314, which supplies a buffer pointer through multiplexer 308, to the SDRAM write address counter 316 onto the synchronous DRAM.

This amounts to an IOM-generated read of a message which is built of fragments residing in the COX shared memory. The IOM initiates the SMA reads based on entries in the command list and provides a message address directly to receive logic. Packing logic uses this address to correctly buffer and pack and align the incoming data. Receive logic does not differentiate that the transfer was initiated by the IOM hardware versus an unsolicited message sent from another card. The data moved via SMA read is in message format, allowing it to be received into buffers allocated from the bus receive free buffer list.

To transfer an SMA READ fragment:
read command list entry, decode as SMA READ fragment.
recognize first, middle, last fragment of a transfer (for outbound buffer control purposes).
generate message address/control field for receive logic use.
initiate bus read from shared memory space.
handle exception cases: nobody home, bus time-out, etc.
check inbound data parity.
move data from bus interface into Packing Cell Buffer.
apply internal message address/control field to the cell buffer (includes channel no, first/last, etc.).
as each inbound SMA buffer is filled and available, check channel number.
check channel state for filter/receive decision.
if buffer allocation required check against free list watermark rules.
if filter: clear inbound cell buffer and wait for next inbound cell.
if receive:
move receive buffer descriptor into rcv channel SRAM, bump hardware pointer into free list.
check sequence number of cell-drop cell if sequence error, move rcv buffer to rcv list w/err logging.
move cell buffer to SDRAM receive buffer (DMA).
feedback buffer status to flow control bus read bursts (avoid buffer overrun).
count data words received (summing for this channel, this rcv buffer).
check for rcv buffer full condition.
move rcv buffer onto receive list when it has been filled or at end of message.
handle sequence errors and other illegal conditions.
recognize end of message: flush inbound cell buffers and move rcv buffer onto rcv list.

Figure 20:
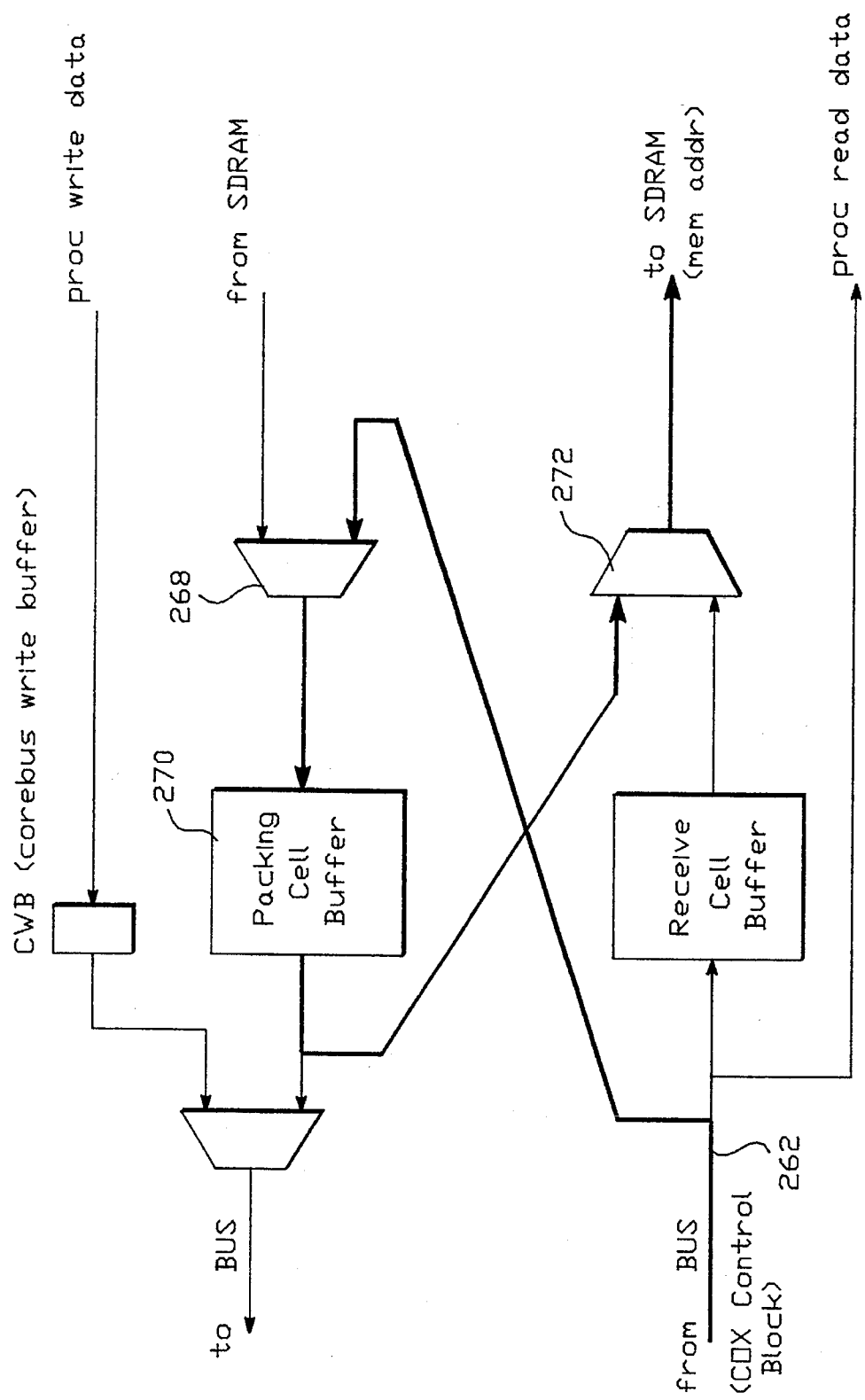
Figure 21:
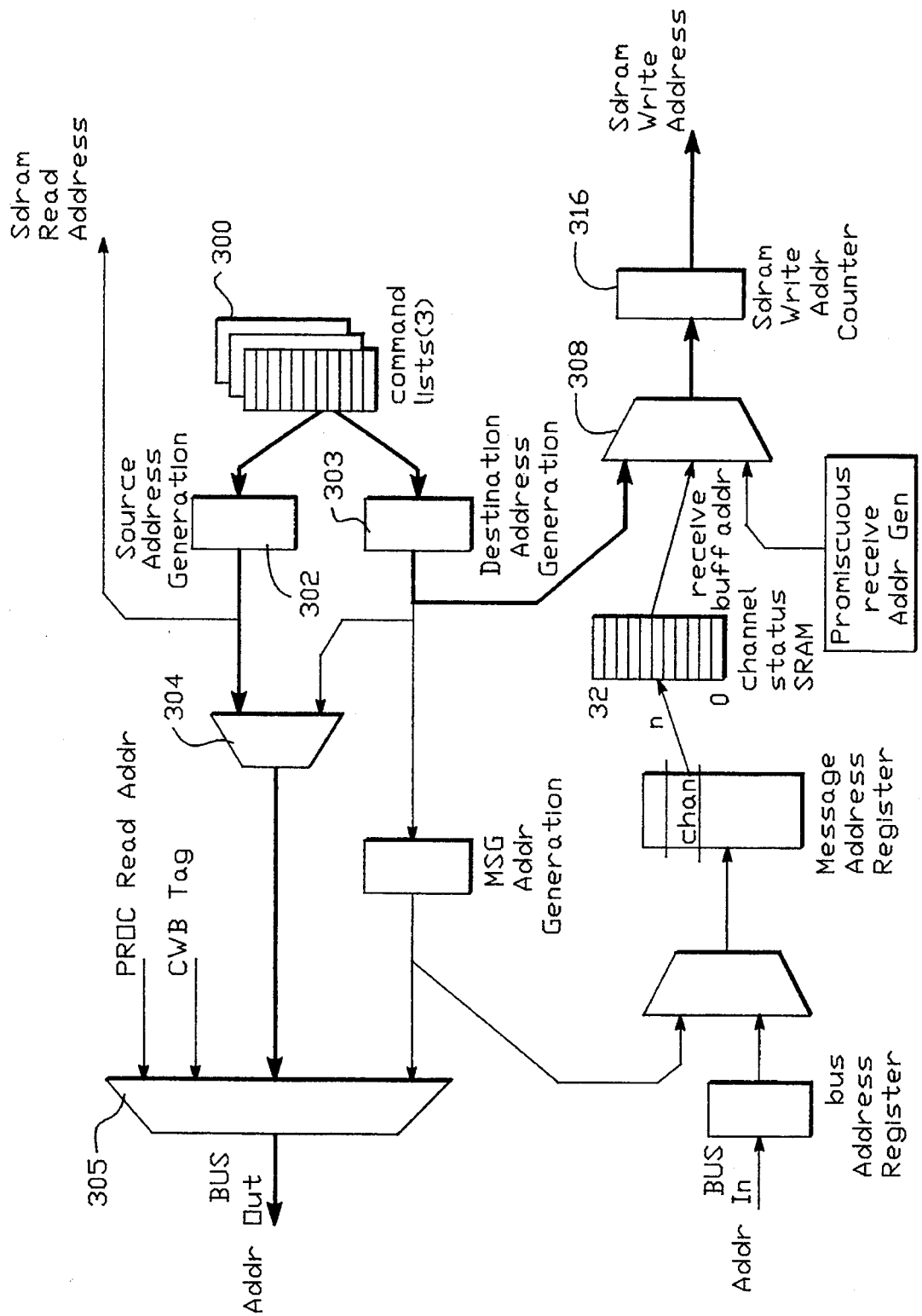

An SMEM read data path is illustrated in FIG. 20. The data originates from the bus 262 and is supplied through multiplexer 268 into the packing cell buffer 270. From the packing cell buffer 270, it is supplied through multiplexer 272 into the local SDRAM. The address path for an SMEM read is shown in FIG. 21. Again, this read originates with the command list 300. The source address seed from the command is supplied through source address generation logic 302. These addresses are supplied through multiplexer 304 and multiplexer 305 out onto the bus. The destination address for this type of transfer is seeded from the command list 300 into the destination address generation block 303. These addresses are supplied through multiplexer 308 into the SDRAM address counter 316.

This is much like an SMA read operation, except that the destination address is directly into physical SDRAM address space and does not use the bus receive buffer mechanism. This allows software to physically copy from shared memory to SDRAM without encapsulating the data structure inside of a message.

Since the only thing about this transfer which differs from the SMA READ operation is the activity on the receive-side logic, the identical gather and pack functionality may be used for SMEM READ operations.

The SMEM READ function may gather fragments of shared memory into a single block within SDRAM. The SMEM READ command may then consist of multiple entries in the command list, but with no associated message structure. The size of an SMA READ is finite, but may be quite large: up to 5 Kbytes of more. Data are packed into the Packing Cell Buffer and then moved directly to a location in SDRAM, bypassing the receive buffer list structure. To transfer SMEM READ data:
read command list entry, decode as SMA READ fragment.
recognize first, middle, last fragment of a transfer (for outbound buffer control purposes).
generate SDRAM physical destination address for receive logic use.
initiate bus read from shared memory space.
handle exception cases: nobody home, bus time-out, etc.
check inbound data parity.
move data from bus interface into Packing Cell Buffer.
indicate SMEM READ and flush bit to cell buffer control logic.
as each inbound Packing Cell Buffer is filled and available, queue for flush to SDRAM (using SDRAM physical address).
feedback buffer status to flow control bus read bursts (avoid buffer overrun).
move cell buffer to SDRAM (dma).
count data words received, check at end of transfer.
handle count errors and other illegal conditions.
recognize end of transtar: flush packing cell buffers.
notify processor (software) that transfer is complete (w/status).

Figure 22:
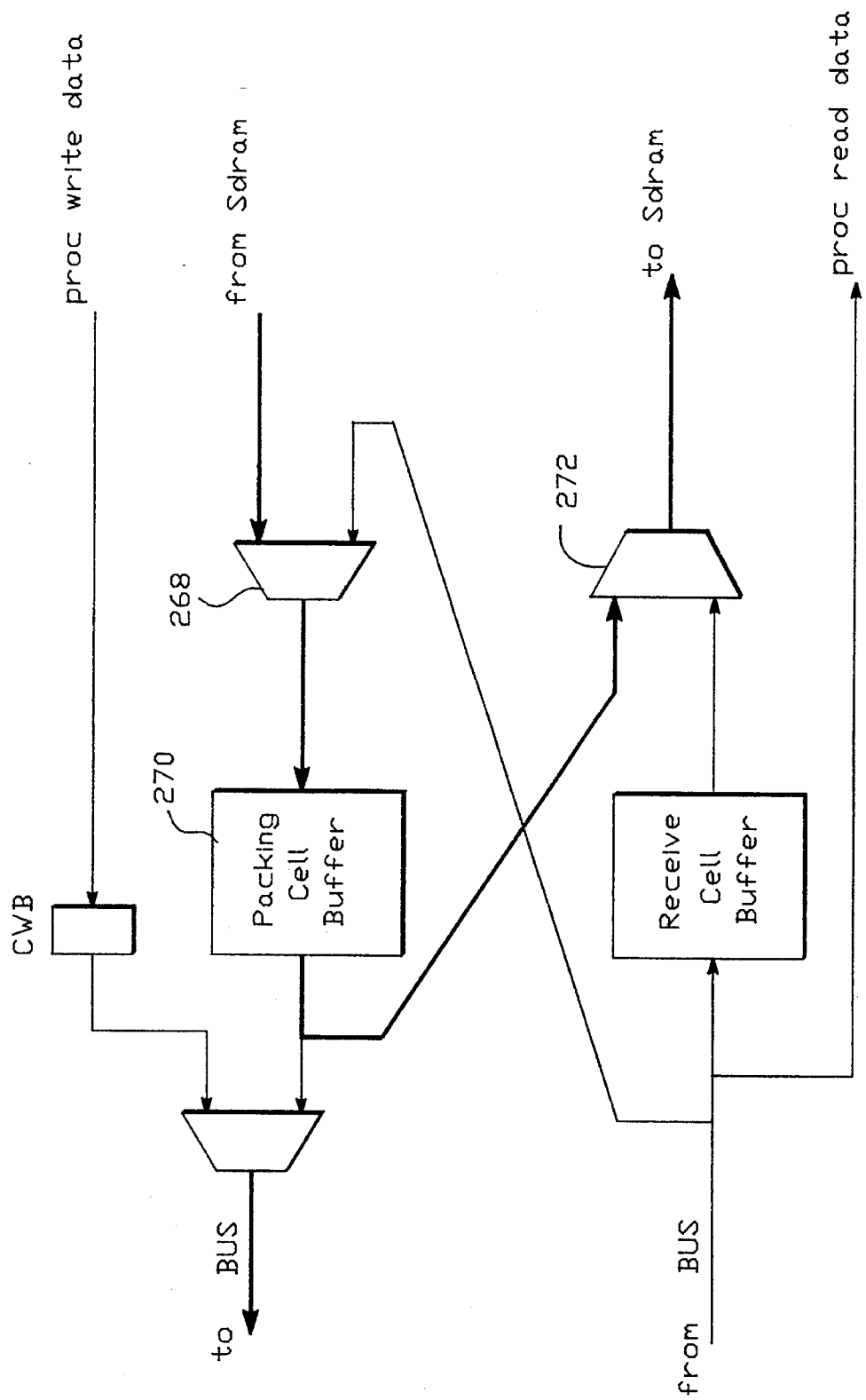

The MEM move data path is shown in FIG. 22. In this path, data is sourced from the SDRAM through multiplexer 268 into the packing cell buffer 270. From the packing cell buffer 270, it is supplied through multiplexer 272 back into the SDRAM.

Figure 23:
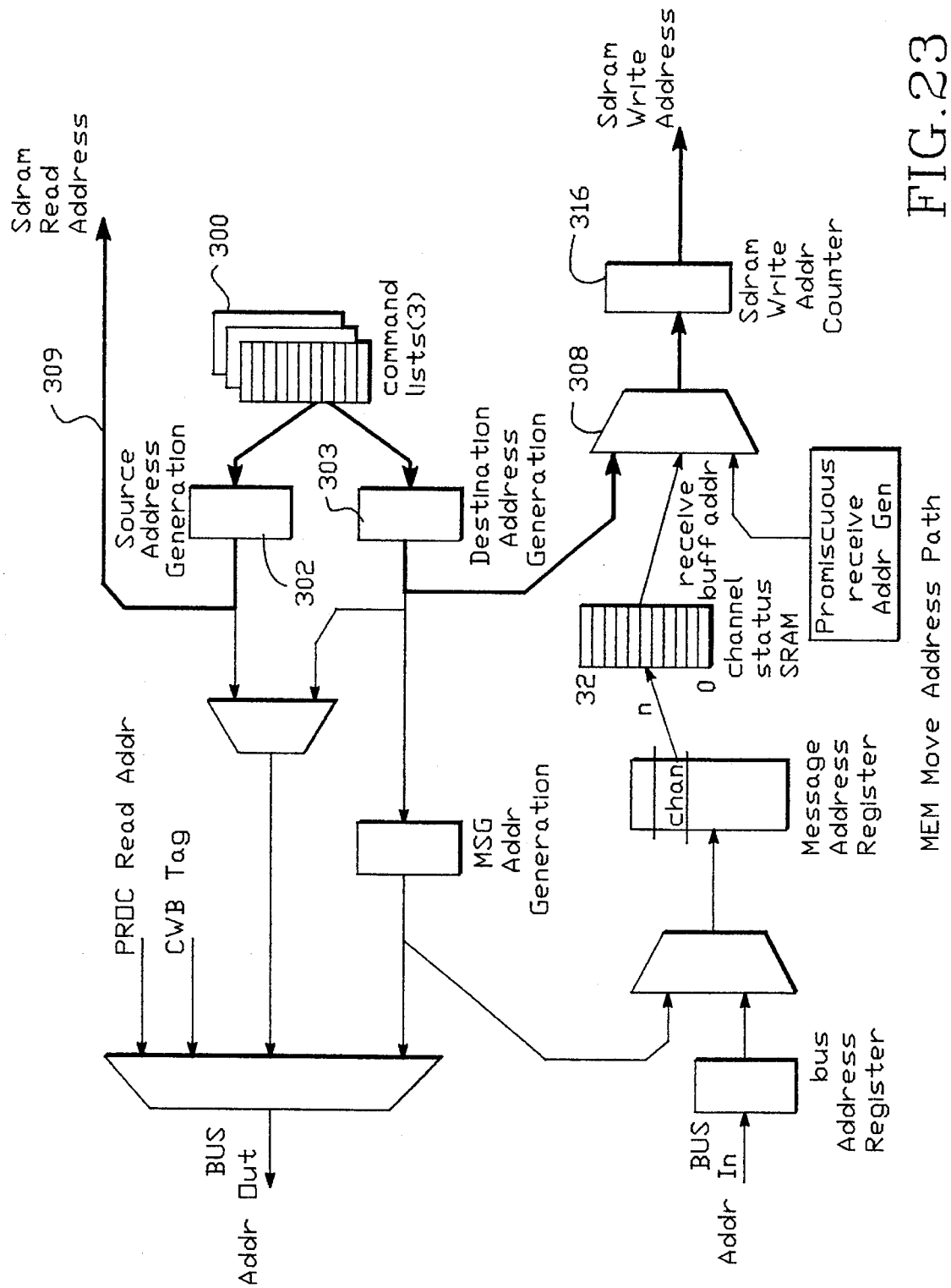

Address generation for the MEM move transfer is illustrated in FIG. 23. This transfer is originated with a command list 300. The source address seed is supplied to source address generation logic 302 which drives the SDRAM read address bus 309. The destination address is again seeded from the command list 300 through the destination address generation block 303. Addresses are supplied from block 303 to multiplexer 308 to the SDRAM write address counter 316.

A Memory Move is the special case of moving a block of data within SDRAM. This might be done to realign data or to pack fragmented data, but is done at the expense of SDRAM bandwidth. Although the data does not flow out to the bus (so other third-party transfers on the bus are not slowed) command list processing may stack up behind this operation.

This is the special case of writing data out through the Packing Cell Buffer and wrapping it back into SDRAM without using the receive buffer logic. The write portion of the activity looks much like the SMA WRITE operation, while the receive logic acts much like it would for an SMEM READ operation.

read list entry, decode as MEM Move fragment.
recognize first, middle, last fragment of a transfer (for packing buffer control purposes).
request SDRAM read access (and check outbound cell buffer availability).
wait for granting of SDRAM resource.
if buffer available, begin transferring data bytes/words from SDRAM to cell buffer.
continue to move data to cell buffers (with data flow control).
maintain cell buffer byte count and buffer status to implement flow control.
pack and align data within cells.
generate destination address fro SDRAM (physical address incrementing).
queue cell for flush (i.e., write to SDRAM).
arbitrate for SDRAM resource (other functions may be requesting SDRAM transfer).
wait until SDRAM interface granted.
move data words from cell buffer to SDRAM interface (with flow control).
generate or check data parity.
log cell transmit status (success/fail).
free cell buffer for more outbound data.
move more data from SRAM line buffer or dram into cell buffer.
continue this process until fragment move is complete.
update command list pointer (indicates transfer complete).
  To transfer a complete MEM Move burst:
process multiple fragments from command list as detailed above (a MEM Move may be a single fragment).
pack fragments into contiguous memory without gaps.
flush partial cell buffer when MEM Move ends.
notification of MEM Move complete.

Figure 24:
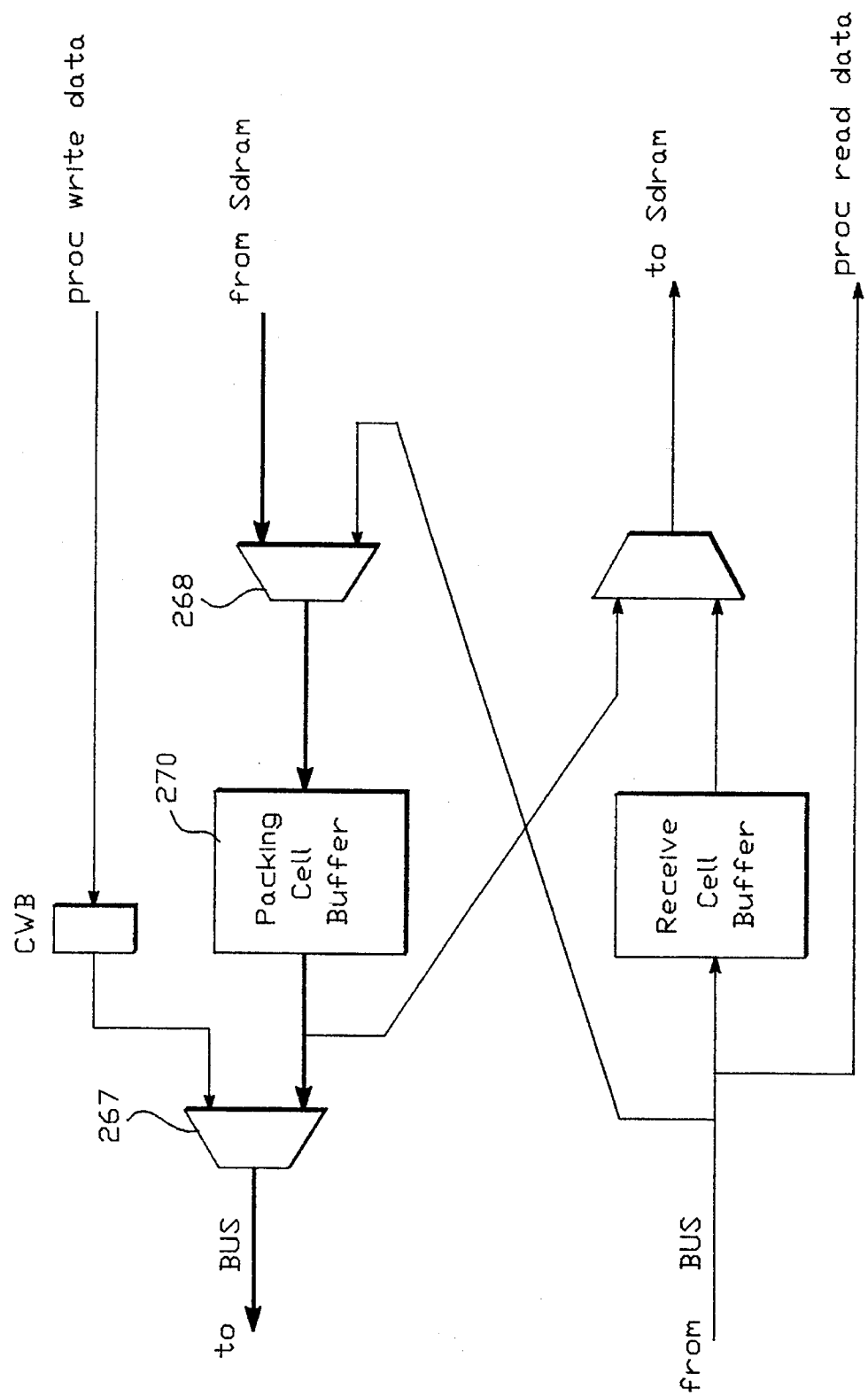

Cell transmit data path is illustrated in FIG. 24. Data for cell transmit is sourced from the SDRAM from multiplexer 268 into the packing cell buffer 270. From the packing cell buffer, it is supplied through multiplexer 267 to the bus.

Figure 25:
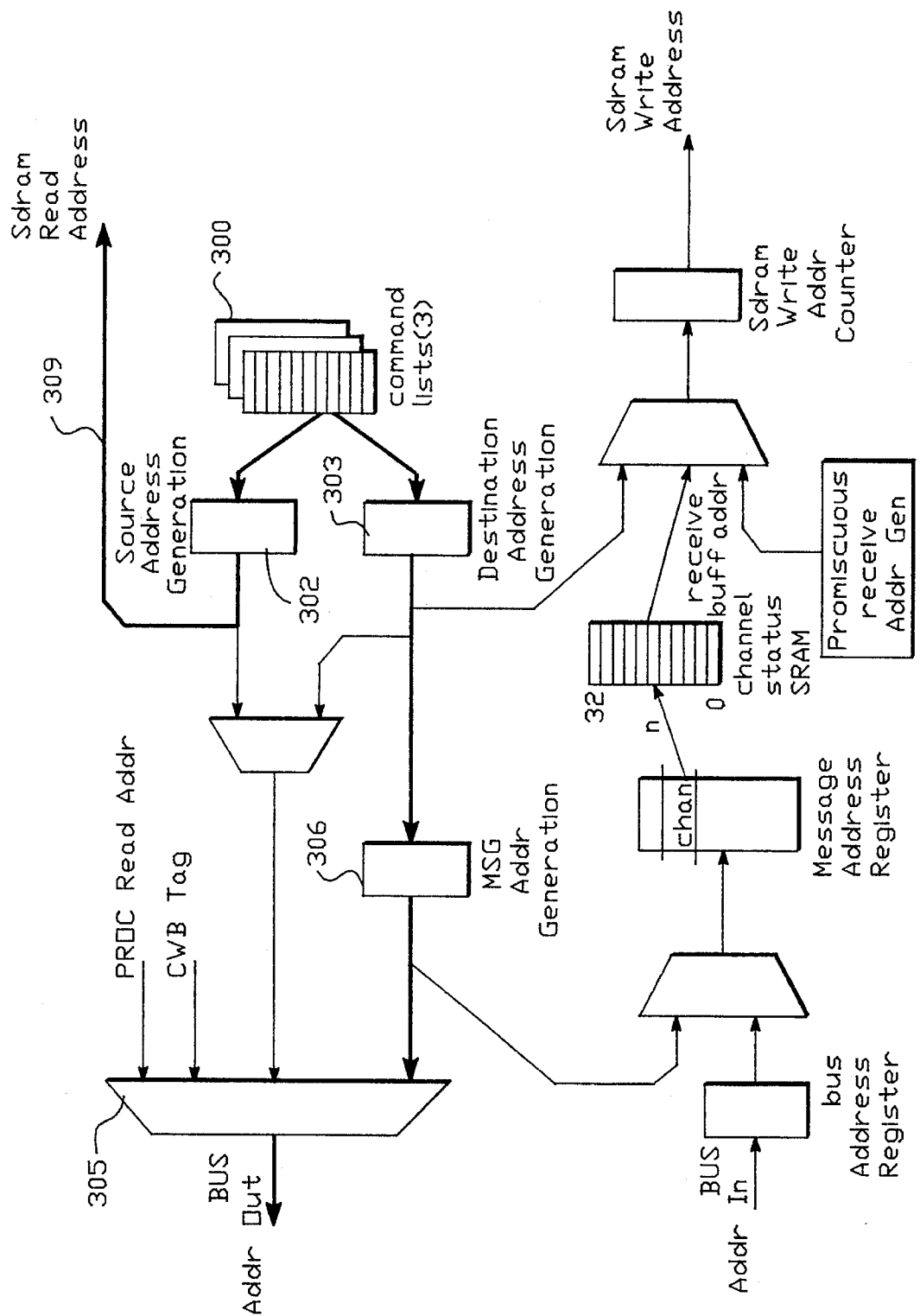

Address generation for a cell transmit transfer is shown in FIG. 25. Source addresses are generated by the source address generation logic 302 as indicated by the command from the command list 300. These addresses are supplied on line 309 back to the SDRAM. The destination address indicated by the command is generated in the destination address generation block 303. These addresses are supplied through message address generation logic 306 and multiplexer 305 out onto the bus.

This transfer allows software to create arbitrary cells on the bus. The outbound bus address will be only of a message format and the processor may indicate explicitly the state of various control bits such as first, last, channel number and sequence number. This feature exists for diagnostic purposes.

Figure 26:
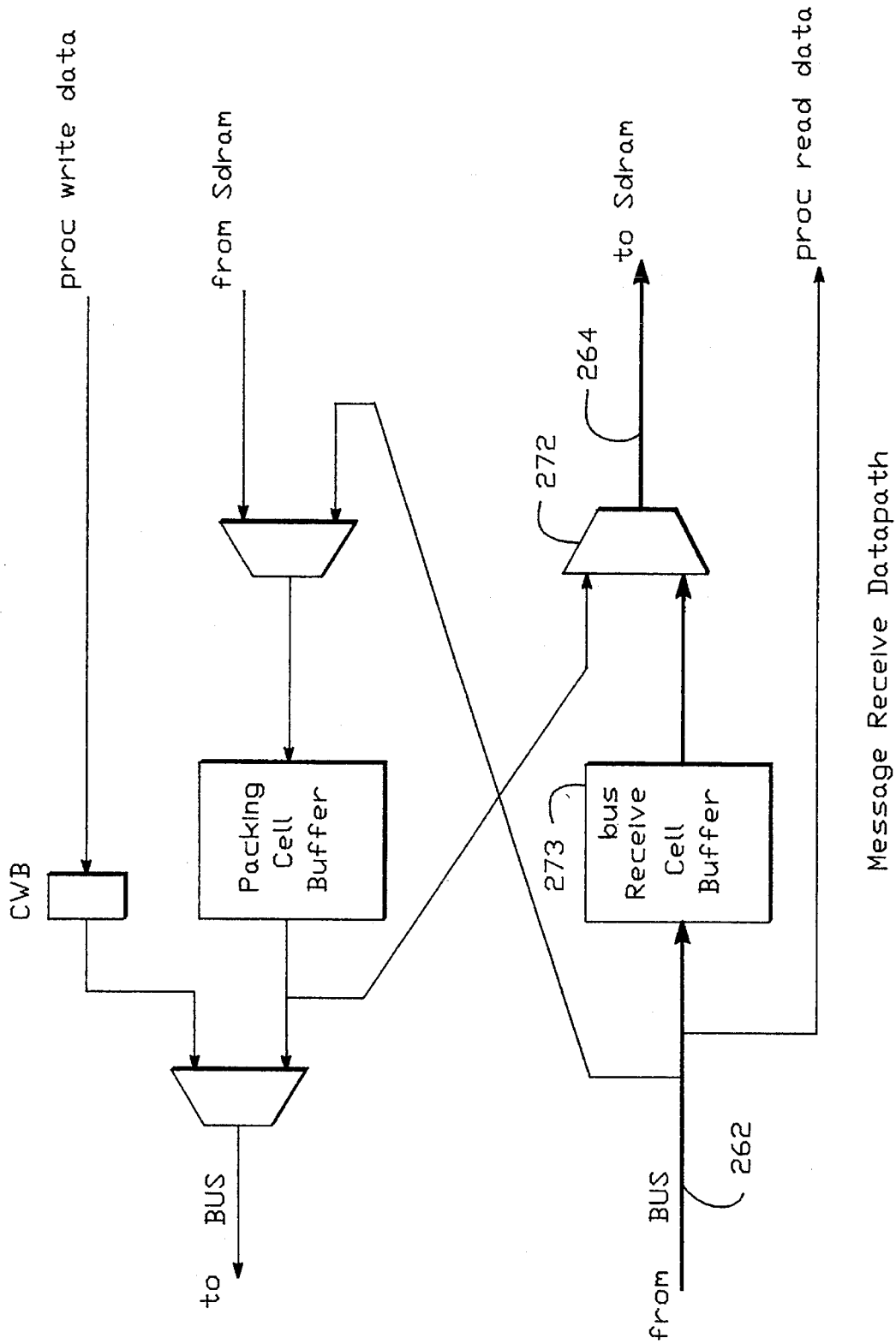
Figure 27:
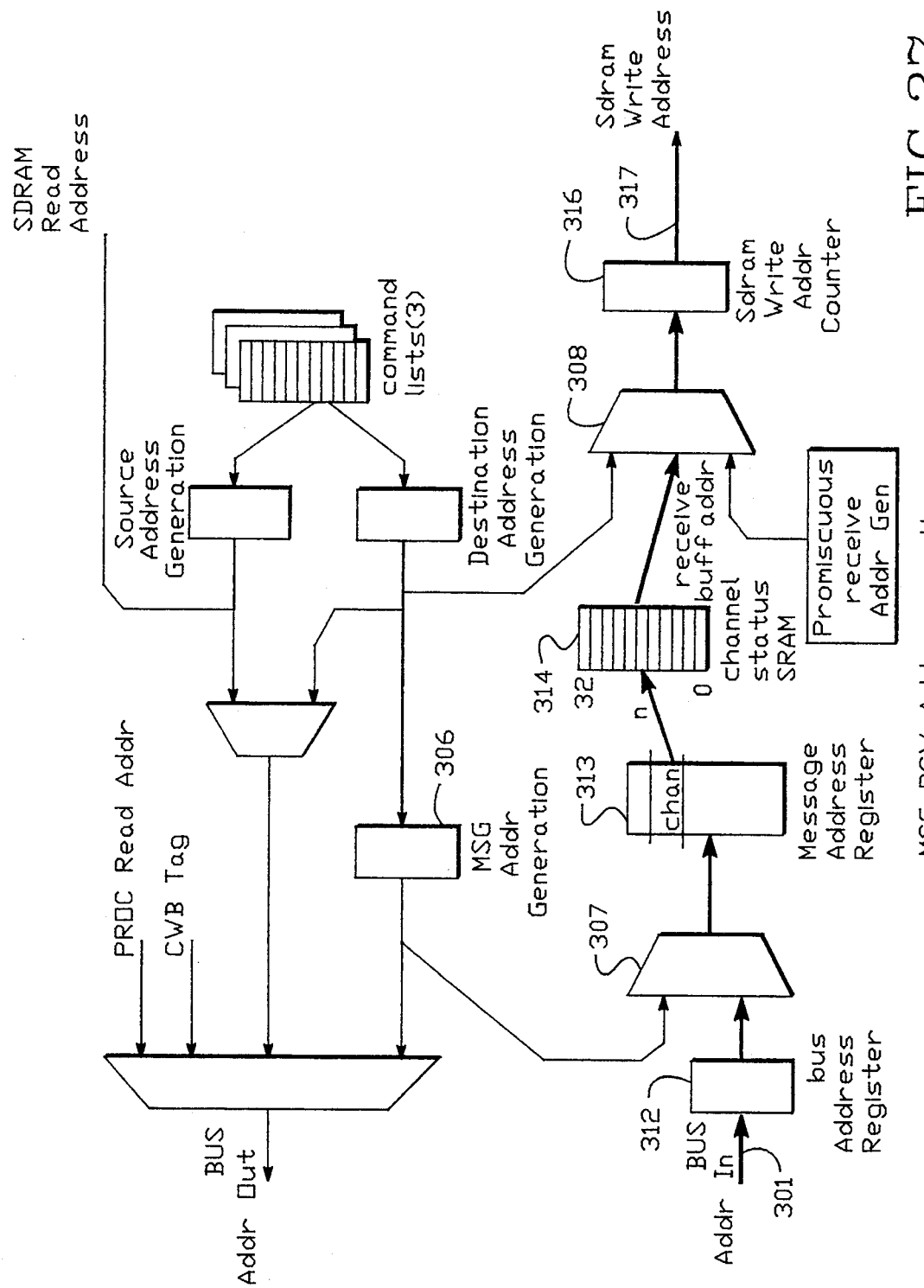

The message receive data path is shown in FIG. 26. This data originates from the bus 262 and is buffered through the bus receive cell buffer 273. From the cell buffer, it is supplied through multiplexer 272 into the SDRAM. The message receive address path is shown in FIG. 27. Addresses are received from the bus in the bus address register 312. This address is selected through multiplexer 307 into the message address register where the appropriate channel is assigned. The channel's status SRAM 314 is accessed based on the channel to retrieve an address pointer. This pointer is selected through multiplexer 308 into the SDRAM write address counter 316. From there, it supplies a write address on line 317 to the SDRAM.

Unsolicited cells comprising a message are received into inbound cell buffers from the bus. The message is then moved into SDRAM receive buffers as allocated from a free buffer list also maintained in SDRAM memory. The processor frees buffers on the list while the hardware allocates from the list. As receive buffers are filled, the buffers are added to a receive list (normal or high priority) for processing by software.

check bus address on incoming cell.
move data from bus interface into inbound message cell buffer (no packing required).
check inbound data parity.
fill first inbound cell buffer.
as each inbound cell buffer is filled and available, check channel number.
allocate a receive buffer for that channel if this is the first cell of a message.
check against free list watermark rules for receive buffer allocation vs. drop (filter).
if filter: clear inbound cell buffer and wait for next inbound cell.
if allocate: move receive buffer descriptor into rcv channel SRAM, bump hardware pointer into free list.
check sequence number of cell-drop cell if sequence error, move rcv buffer to rcv list w/error notification.
move cell buffer to SDRAM receive buffer(dma).
count data words received (summing for this channel, this rcv buffer).
check for rcv buffer full condition.
move rcv buffer onto receive list when it has been filled or at end of message.
handle sequence errors and other illegal conditions.
recognize end of message: flush inbound cell buffers and move rcv buffer onto rcv list.

Figure 28:
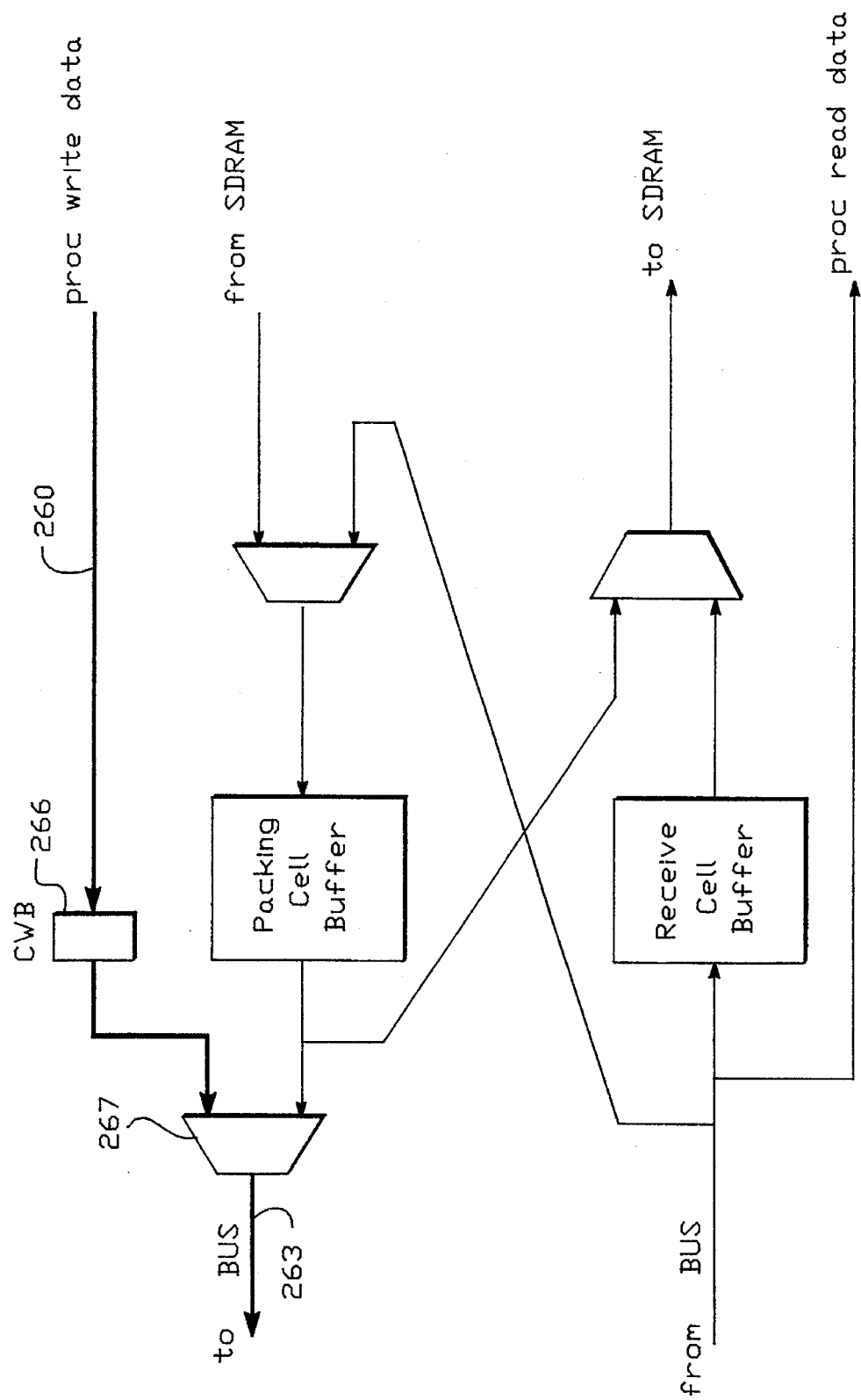
Figure 29:
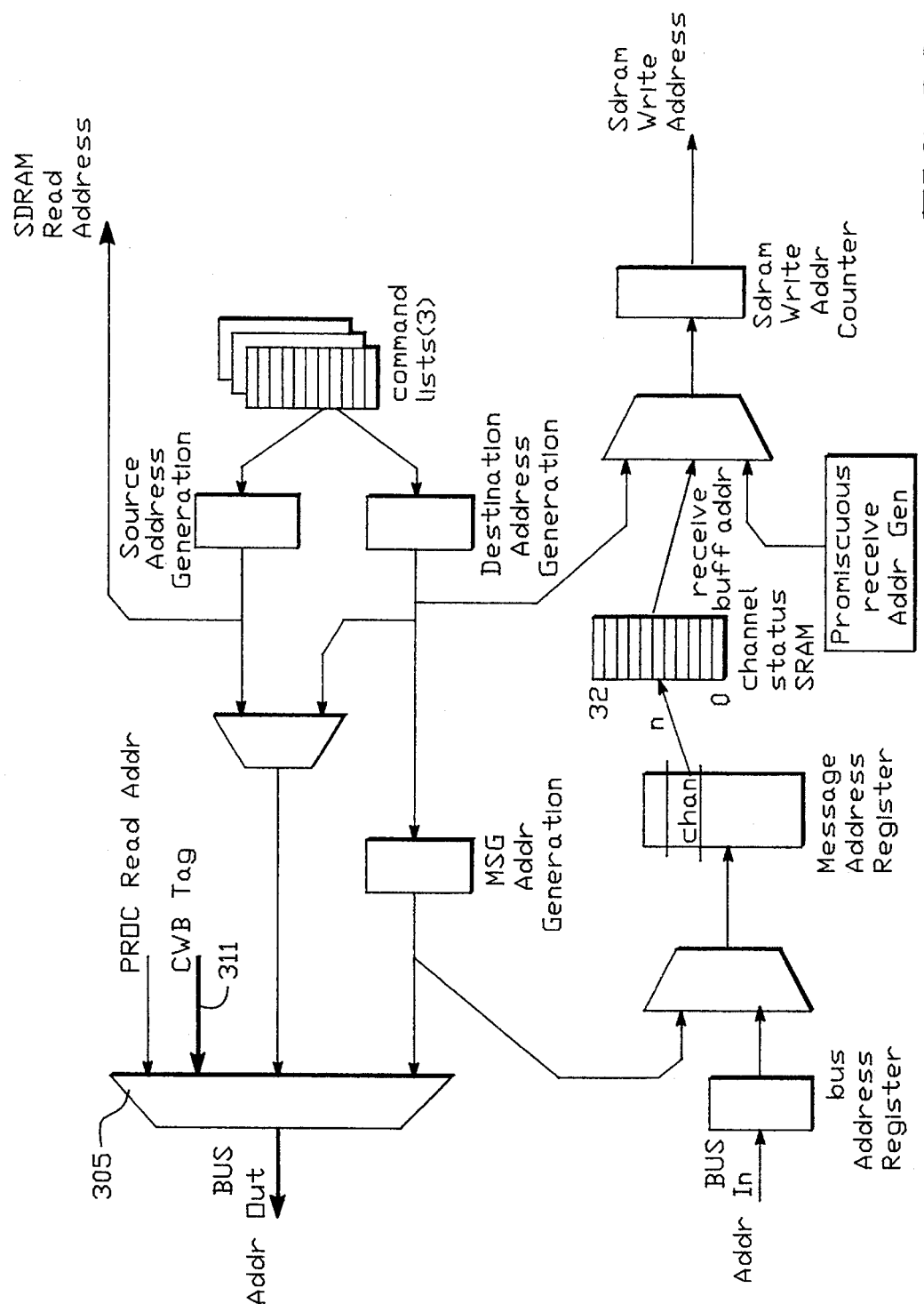

The bus write data path is shown in FIG. 28. The source of this data is the local processor on line 260. This data is buffered through buffer 266, and selected through multiplexer 267 out onto the bus. Address generation shown in FIG. 29 for a bus write transfer is originated from a bus write tag on line 311 which is selected through the multiplexer 305 out onto the bus.

Processor writes to the bus memory or I/O space will be single-word-buffered in the bus Write Buffer (CWB). The write posting is non-blocking, so that the processor may continue execution as the CWB flushes.

The processor may post single-word writes to any address in the bus memory or I/O space:
processor performs write operation mapping to the bus space.
(initial access is zero-wait-state, i.e., two clocks).
data is held in CWB (Corebus Write Buffer) and address held in CWB Tag.
CWB controlling module requests a bus write operation.
wait for grant of bus Interface.

wait for arbitration win of bus.
perform write operation.
report failures only—through error interrupt OR trap mechanism
general:
first write (hitting CWB) is non-blocking.
a second write to bus space before CWB flushes blocks processor until CWB flush completes.
error of first flush with no pending write results in an error interrupt.
error of first flush with second write pending results in trap of second write data cycle.
writes are full-word, single-word only.
bus address will be some translation of processor address.

Figure 30:
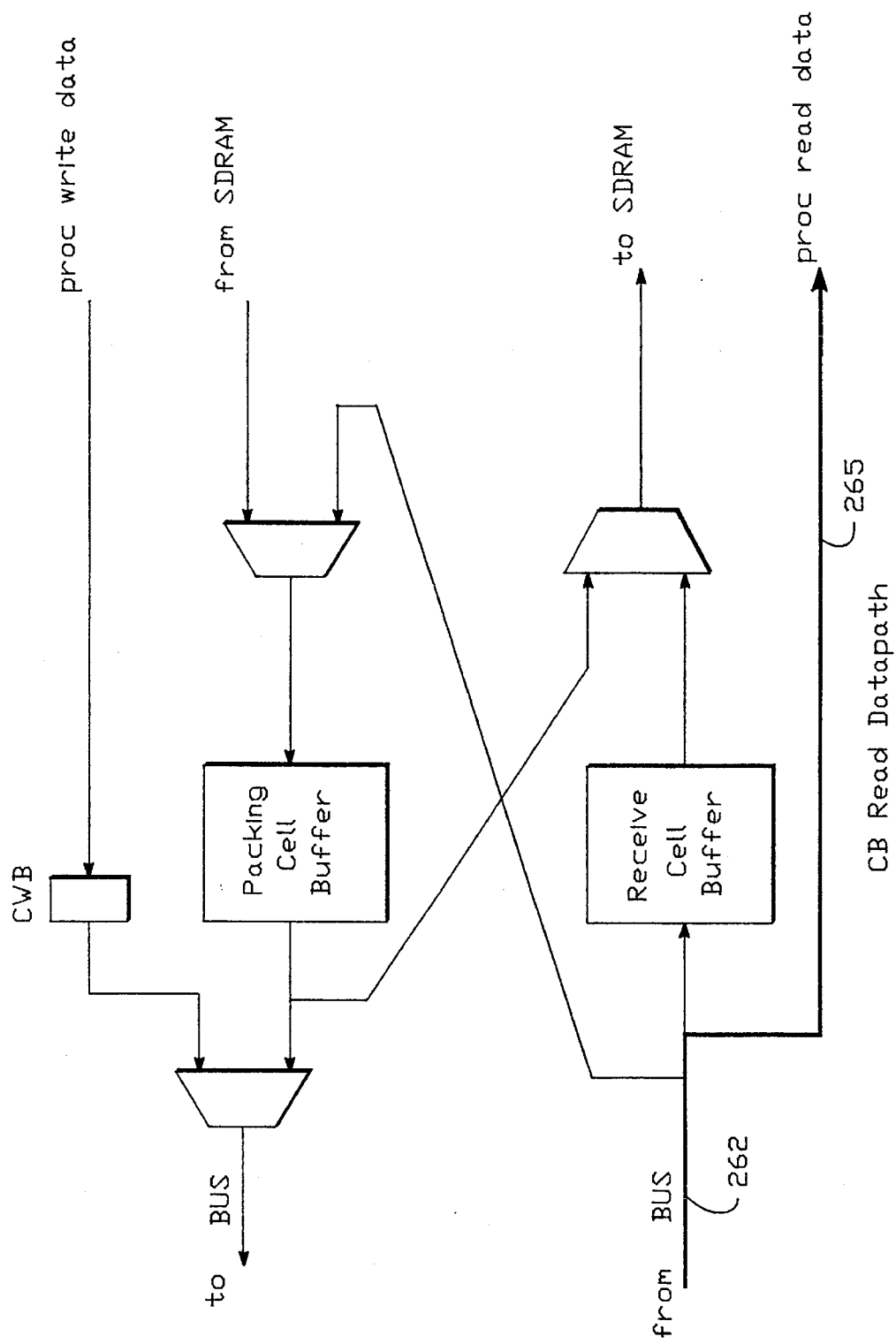
Figure 31:
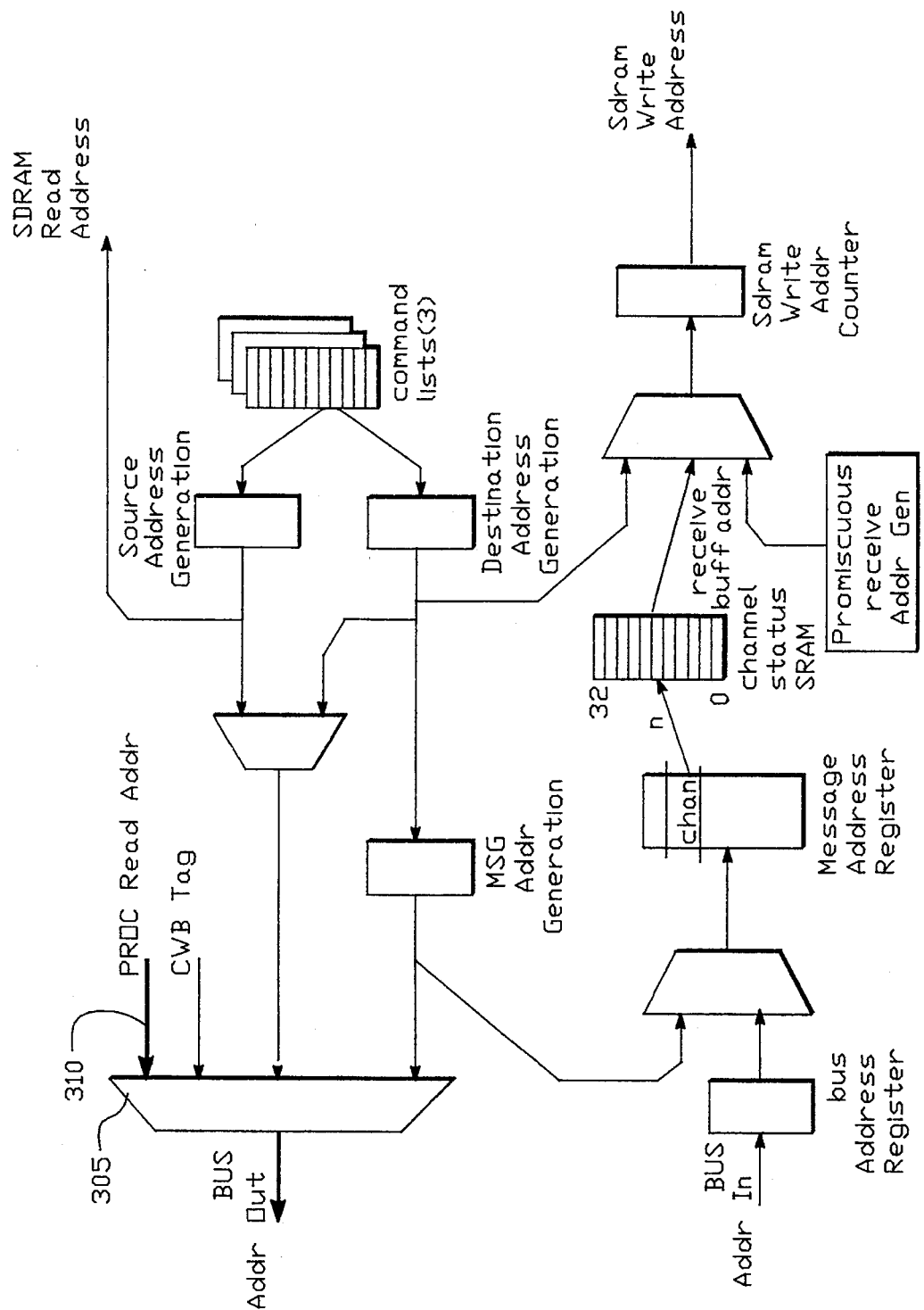

The bus read data path is shown in FIG. 30. This data originates from the bus on line 262 and is passed directly to the processor read data path 265. The address generation shown in FIG. 31 for a bus read operation originates from a processor read address line 310. This address is selected through multiplexer 305 out onto the bus.

The processor may perform a direct read from bus memory or I/O space. This will be a blocking operation, so that the processor will incur wait states (this could be quite high-latency) until the read can complete. There is no buffering involved in this transfer and reads are single-word only, no partial word reads allowed.

Data from a bus read operation is only registered within the bus interface. There well may be a second register for holding processor read data while the processor arbitrates for the use of an intermediate bus. This is to say that peripheral data transfers and even incoming bus data may continue to move to/from the SDRAM subsystem while the processor is waiting around for a bus read access to complete.

Again, use of an intermediate bus between ASIC devices may require a read address holding register which is presently not shown.

Figure 32:
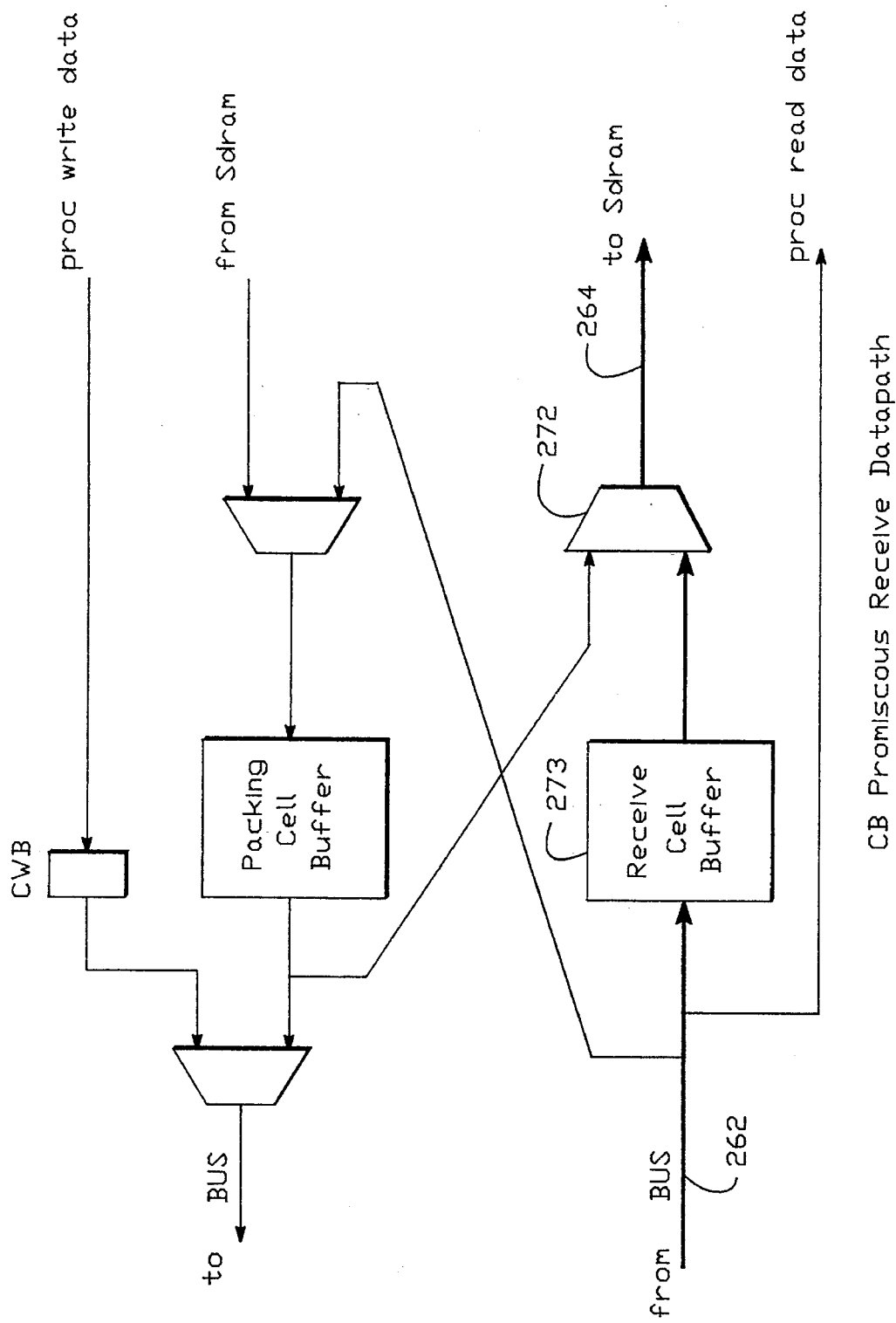
Figure 33:
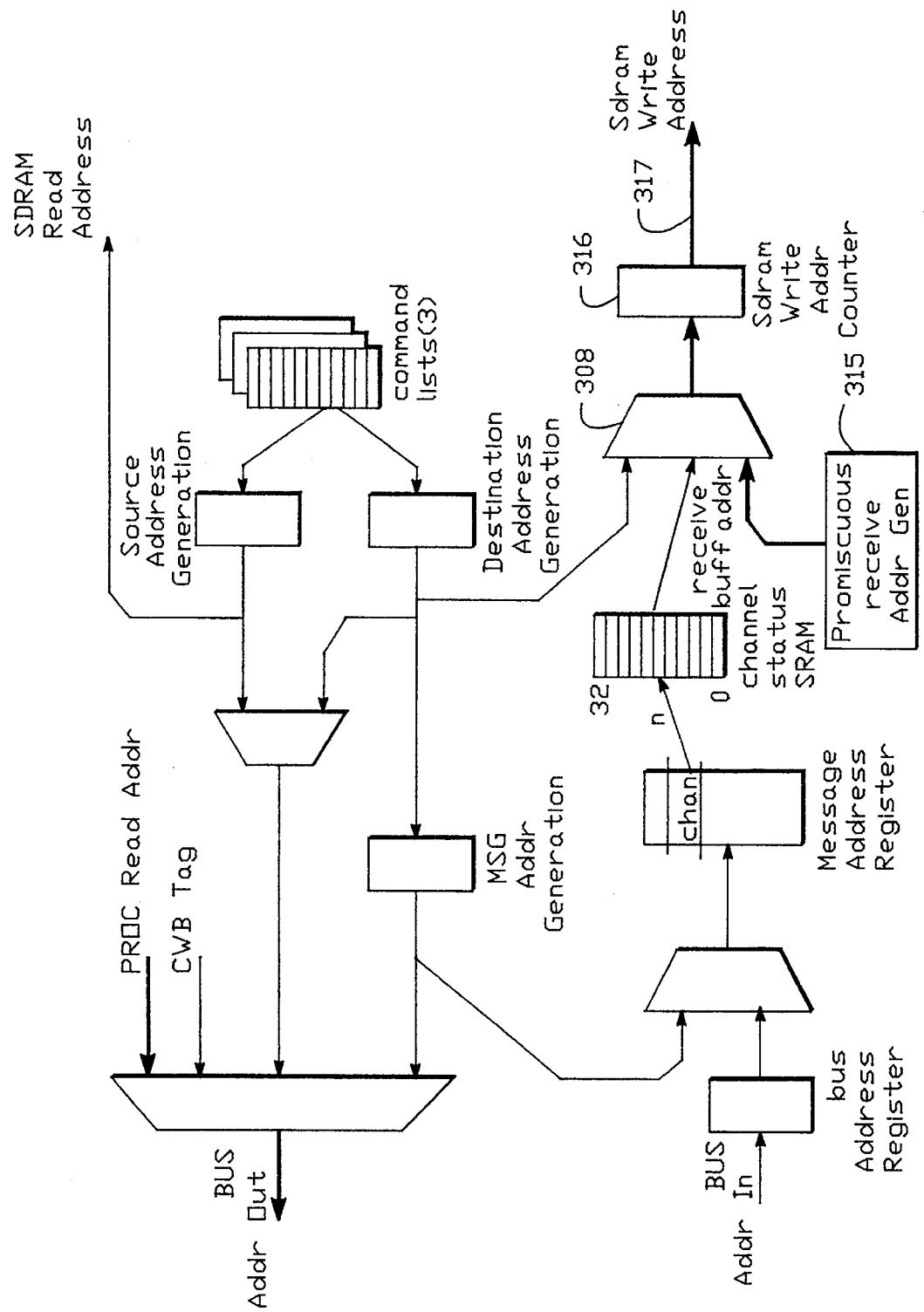

A promiscuous receive data path is shown in FIG. 32. This data is received from the bus on line 262 into the receive cell buffer 273. It is selected from the buffer through multiplexer 272 back into the SDRAM. Address generation in the promiscuous receive transfer originates from the promiscuous receive address generator 315. This address is selected through multiplexer 308 into the SDRAM write address counter 316 and on as the write address to the SDRAM.

This is a special mode of operation for system diagnostic and debug purposes. The software may filter the reception of bus transfers via MASK and COMPARE registers. Given the correct address comparison, all bus data transfers will be received and moved into SDRAM in a continuous string of cells tagged by address entries into the receive list structure. The normal receive buffer free list does not operate in this case, and so the Promiscuous Receive Feature cannot be used concurrently with normal board operation.

Note that the bus address is considered to be data in this operation, and that piece of data, associated with each received cell, needs to be written into the receive list structure in SDRAM as well. This is not shown here.

III. MESSAGE PASSING CONTROLLER

Figure 34:
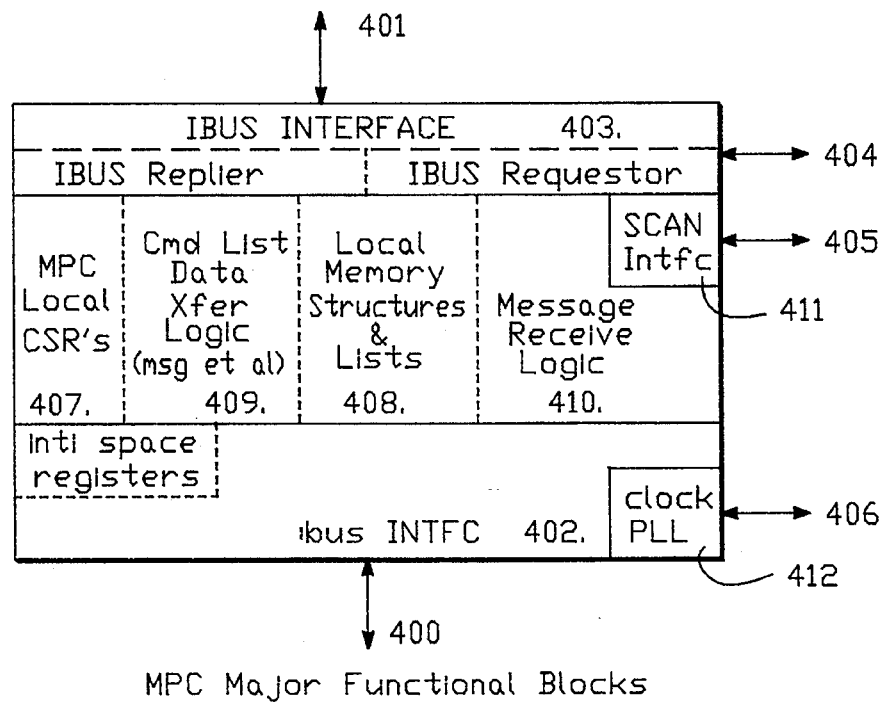
FIG. 34 illustrates the major functional blocks of the message passing controller.

The basic building blocks of the bus interface are: bus State Machines, Address decodes, Arbitration Logic, Init Space register Set, Error checking logic, and other standard features embodied in a Message Passing Controller (MPC) structure shown generally in FIG. 34.

The primary function of the MPC ASIC is to provide a bus 400 to IBUS 401 path with integrated Message Passing Logic. The MPC provides the full signal interfaces (402, 403) to the bus and the IBUS. Additional external interfaces (404, 405, 406) are only for testability (boundary scan, etc.) and for clocks and resets. The MPC contains the following major functional blocks:

| bus Interface (incl. init space regs) 402 | Memory Structures and Lists 408 | Scan Interface 411 |
| IBUS Interface (channel device) 403 | Cmd List Data Transfer Logic 409 | Clock generation (PLL) 412 |
| Local CSRs (control/status registers) 407 | Message Receive Logic 410 | Reset logic (not shown) |

A. Message Passing Logic

Three of the top-level blocks have to do with "Message Passing Logic." These blocks control the buffering and movement of data between the IBUS and bus. They are:

Local Memory Structures and Lists 408 (data buffering and control structure caching).

Message Receive Logic 410 (receives data from bus or command list data transfer).

Command List Data Transfer Logic 409 (initiates bus data transfers).

B. Messages and Non-Message Data Transfers

The MPC supports a number of different types of transfers on the bus as shown in FIG. 9. The initiation of bus transfers is generally via a command list mechanism. Software (via the processor) queues transfers onto the two command lists and then the MPC ASIC hardware executes the data transfer. Command list data transfers may be subdivided into two categories: message transfers and non-message transfers.

Note that in FIG. 9, SMA stands for Shared Message Access, a type of message transfer which accesses data in COX shared memory. SMEM stands for Shared Memory. An SMEM READ or SMEM WRITE is a type of non-message transfer.

Message Transfers

There are three types of message transfers found on the command list. These include MSG XMIT, SMA READ, and CELL XMIT (see FIG. 9). Data associated with any of these transfers will be treated with the message passing protocol, i.e., any data written out to the bus will use message address fields as prepended cell headers and any data read in from the bus will be processed via the free list/receive list mechanism.

Non-Message Transfers

There are six types of non-message transfers found on the command list. The burst-oriented transfers include SMEM WRITE, SMEM READ, and MEM MOVE. Data associated with any of these transfers will bypass the message passing protocol, i.e., any data written out onto the bus will use non-message address fields (physical memory locations) as prepended cell headers and any data read in from the bus will bypass the free list/receive list mechanism.

The single-word non-message transfers are called CBIO READ, CBIO WRITE, and CBMEM WRITE. The first functions identically to the SMEM READ except now we are reading from bus I/O space instead of bus memory space. The latter two are known as embedded-data transfers. They are intended for transferring only one word of data at a time.

This word of data is communicated to hardware by having software place it in the command list entry.

C. Command List Processing

The MPC supports two command lists (bus transmit queues). The command lists are managed using head and tail pointers as described above.

Software needs to reliably detect when a command entry with a destination address into SDRAM is truly complete (i.e., the data is present in the SDRAM, not just somewhere in a buffering pipeline). To do this, the MPC hardware will automatically block command list processing (not bump head pointer) until data bound for SDRAM through a Packing Cell Buffer has successfully flushed across the IBUS. Also, any event associated with this entry will not be sent until the write to SDRAM is completed. This allows the software event handler to read head pointers to determine which entries are actually complete once an event is received (since there could be several entries causing events quite close together, head pointer management is critical). Command list entries need to contain a "notify" bit in the flags word to allow selective generation of an event on only certain entry completions.

Moving all bus read/write operations to the command lists requires an additional flag bit for bus IO space accesses. And, command list logic may generate a bus access as small as a single word as opposed to causing only short burst accesses. The MPC will not generate partial-word bus accesses.

D. Receive List Management

The MPC enforces no particular relationship between command list, destination receive list and cell priority. The Message Address includes a single bit for receive list (bit 28) and a two-bit field for cell priority (bits 11:10). The cell priority bits work against two watermark registers, implementing three levels of reliability for bus messaging. The local processor will be notified via an event mechanism whenever a receive buffer is completed and a write to one of the receive lists has occurred.

E. Message Passing Data Path

Figure 35:
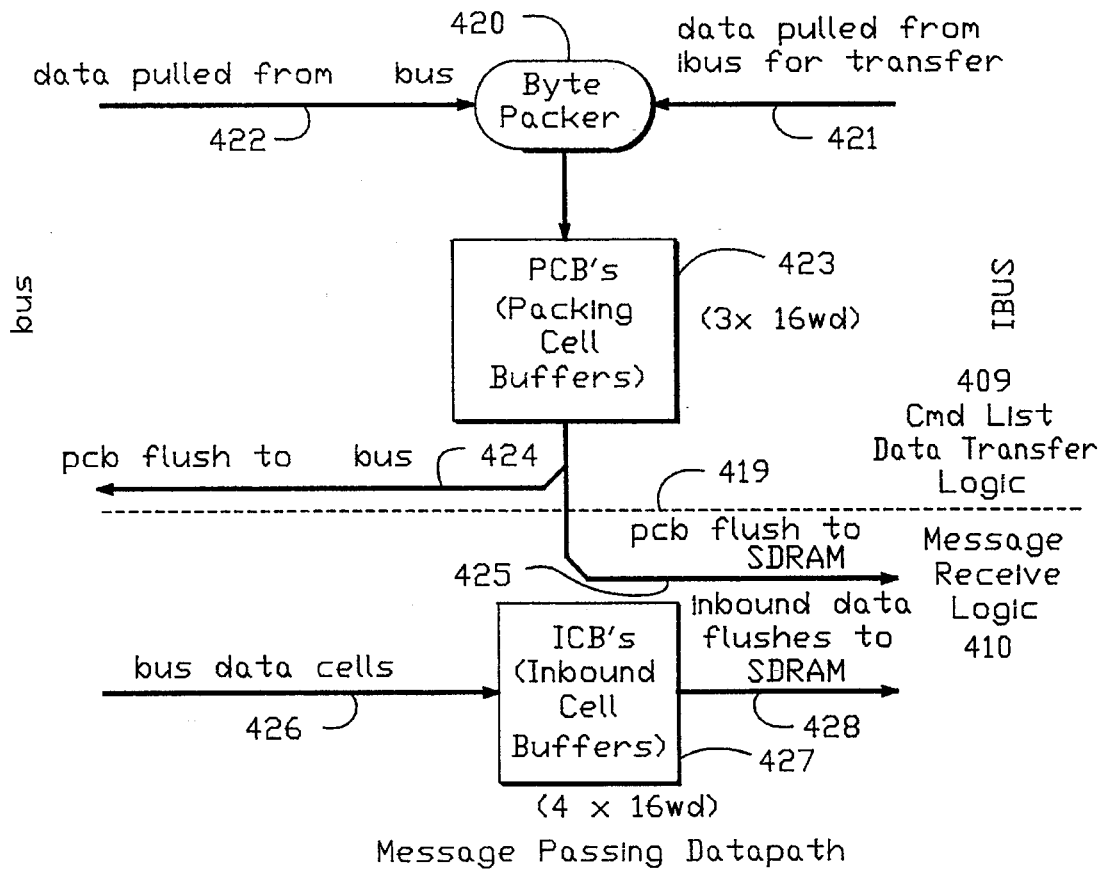
FIG. 35 illustrates the message passing data path within the message passing controller.

The message passing data path is shown in FIG. 35 divided generally along line 419 between the command list data transfer logic 409 and the message receive logic 410. The path includes a byte packer 420 which receives solicited data from the internal bus on line 421 or from the system bus on line 422. Data from the byte packer 420 is supplied to the packing cell buffer 423. From the packing cell buffer 423, data may be flushed to the bus on line 424 or to the SDRAM on line 425.

Data outbound to the bus may move through the Packing Cell Buffers (PCBs) 423 or may be embedded in the command list (bus write entry). Data buffered in the PCBs may also wrap back to the inbound data path when the destination address maps to SDRAM (including a message address with destination slot matching the local slot id).

Unsolicited data inbound from the bus on line 426 always comes through the Inbound Cell Buffers (ICBs) 427. Data from the ICBs 427 is flushed to the SDRAM on line 428. ICBs 427 may hold message cells or non-message cells; tags are kept which indicate whether the ICB flushes to a physical SDRAM location or through the receive buffer mechanism.

The PCB 423 is a three-buffer structure, so that two buffers may be queued for flush to the bus while the third is filling. This helps keep IBUS transfers efficient (maximizing the use of 16-word, full-cell transfers) while allowing the MPC to transmit full-rate on the bus as IBUS bandwidth permits. Note that PCBs may fill from SDRAM or from the bus and may flush to either as well.

Four ICBs 427 provide a reasonable amount of buffering to ensure maximum availability of the bus receive channel. It is clearly undesirable if bus overruns the receive data path, and four ICBs soaks up a bit of IBUS/SDRAM latency in the receive path. ICB flush to IBUS is the highest priority IBUS request from the MPC (assigned hi-priority within the MPC and uses the HREQ IBUS signal).

F. Message Passing Address Path

Figure 36:
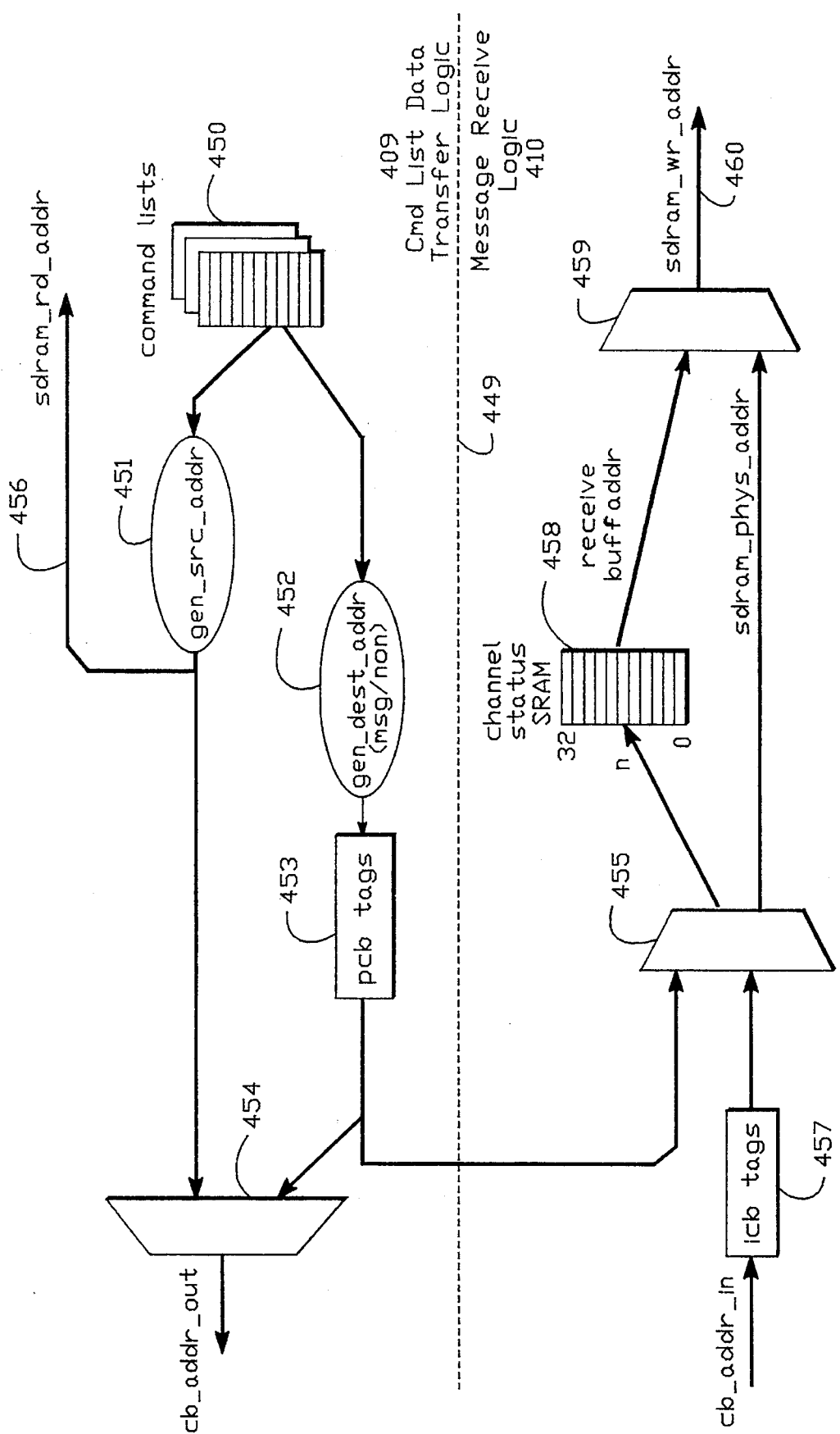
FIG. 36 illustrates the message passing address path within the message passing controller.
Figure 37:
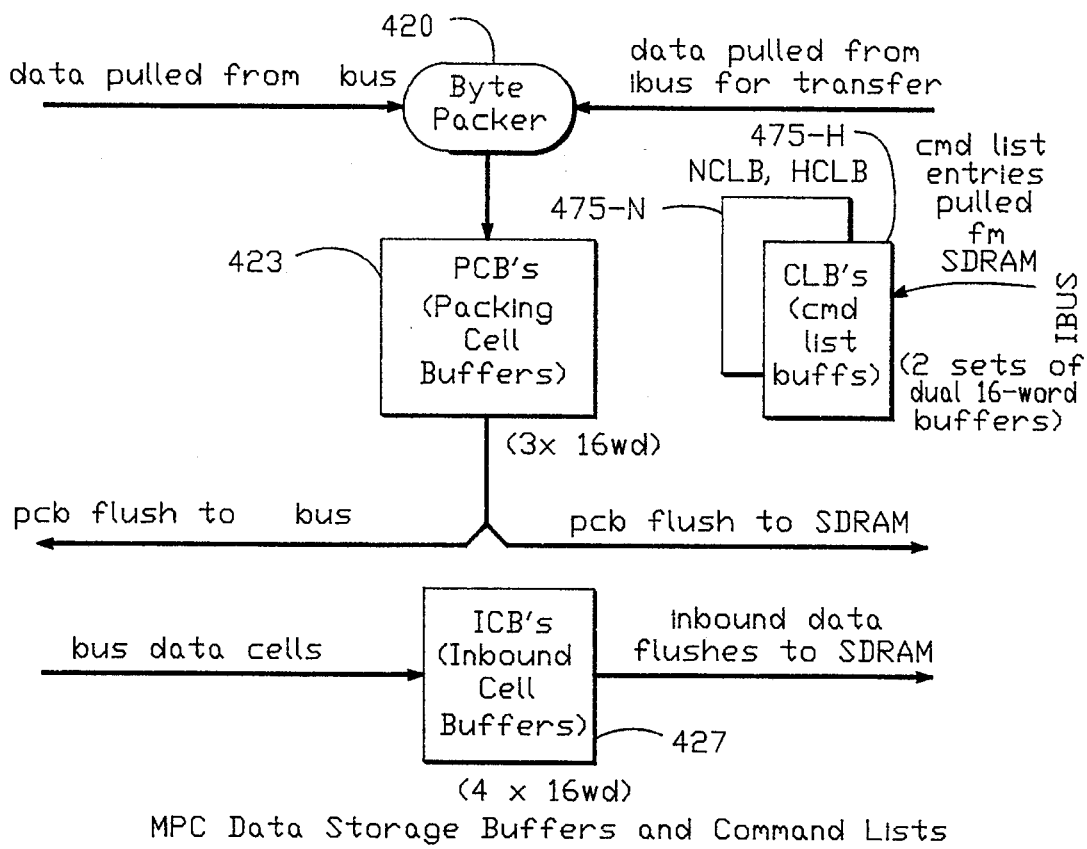
FIG. 37 illustrates the message passing controller data storage buffers and command lists.

FIG. 36 shows the message passing address path of the MPC divided generally on line 449 between the command list data transfer logic 409 and the message receive logic 410. Command lists 450 seed the address generation to logic 451 (gen_src_addr) which generates source addresses and to logic 452 (gen_dest_addr) which generates destination addresses. Destination addresses are tested against packing cell buffer tags 453 (pcb tags) and supplied to bus output multiplexer 454 and to input multiplexer 455. Source addresses are supplied to the output multiplexer 454 and back to SDRAM read logic on line 456. Addresses from the system bus are tested against incoming cell buffer tags 457 (icb tags) and supplied to the input multiplexer 455. From the input multiplexer, addresses are supplied through the channel status SRAM 458 to the address selector 459, or directly to the address selector 459. The address selector 459 drives the SDRAM write logic on line 460.

Transfers which derive from command list entries are handled within the Cmd List Data Transfer Logic block 409. The Source address may apply to SDRAM on line 456 (via the IBUS) or to bus Memory Space (as in COX Shared Memory). The Source address is always a physical memory address and carries no alignment restrictions. The gen_src_addr function 451 creates a sequentially increasing series of addresses for multiple cell transfers. The Destination address (which may be either a physical memory address or a message address) also comes off the command list, is transformed by gen_dest_addr logic 452, and is written into the PCB tag 453 as the buffer is filled. Destination addresses must be 16-word aligned.

The ICB 455 and PCB 453 tags are used by logic to determine the IBUS destination address (either a physical address kept in the tag, or a receive buffer address held in the channel status RAM). PCBs will flush either to bus or to IBUS depending on the tag value.

G. The MPC Memories

PCB—Packing Cell Buffers 423. These are three 16-word buffers filled through byte-packing logic. Three buffers allow full-rate bus transfer under certain conditions. The PCBs 423 are only written under control of the command lists and fill from either ibus or bus. Likewise, they may flush to either ibus or to bus.

ICB—Inbound Cell Buffers 427. These are four 16-word buffers like the PCB. Data are not byte-packed into the ICBs and normally only unsolicited message cells move through the ICBs which then are flushed to the receive buffer structure in SDRAM.

NCLB and HCLB—Normal and Hi-priority Command List Buffers 475-N, 475-H. The NCLB 475-N and HCLB 475-H are each double-buffered structures (2 ea. 16-word buffers per CLB). Cmd list entries are pulled from SDRAM into the CLBs. Once a message or memory transfer is begun all the list entries associated with that transfer are processed. Once a transfer is completed the priority logic considers switching to the higher priority command queue.

Figure 38:
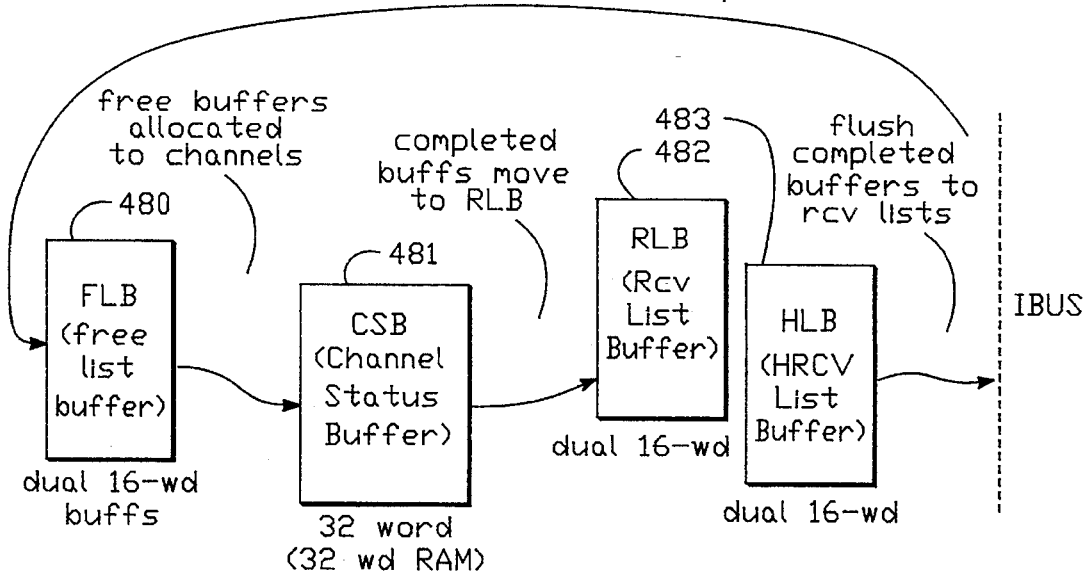
FIG. 38 illustrates the message passing controller receive buffer memory structures.

The MPC receive buffer memory structures are summarized with reference to FIG. 38.

The MPC pulls entries from the SDRAM-resident free list into a free list buffer 480 (FLB) and from there allocates free buffers to logical receive channels (there are 32 receive channels) for which status is monitored in the channel status buffer 481. As the buffers are filled or otherwise completed, they are moved to one of the two receive list buffers 482, 483 and subsequently flushed to the receive lists in SDRAM. Software may then process the filled receive buffers. Them are no tags associated with the buffers other than validity bits used to manage fill and flush.

FLB—Free List Buffer 480. This is actually a FIFO structure which holds up to 32 single-word free list entries. All fills of the FLB 480 are done as 16-word reads from SDRAM (via IBUS). Buffers are always allocated to logical receive channels strictly in the sequence that they arrive from SDRAM. Actual FLB may be implemented as dual 16-word SRAMs or as a compiled 32-word FIFO—the performance of the structures will be similar.

CSB—Channel Status Buffer 481. This is a random-access 32-entry structure, with each location associated with a logical message receive channel. Entries are allocated to channels by reading a free buffer and writing it into the CSB 481 (in whatever location is associated with the channel involved). The CSB entries basically consist of the receive buffer SDRAM address and the current cell count (or the "fullness" of the buffer; only so many cells fit into a buffer). The size of this structure may be reduced by reducing the number of supported logical channels.

RLB and HLB—Receive List Buffer 482 and Hi-priority List Buffer 483. These are dual 16-word structures which are filled as buffers "complete". A buffer completes when it fills with cells or it partially fills but the last cell of the message is received or when some error condition occurs. Buffer entries are pulled from the CSB 481 and put into the RLB 482 or the HLB 483, depending on the receive list bit in the message address. The RLB 482 and HLB 483 are each double-buffered to avoid blocking completion of buffers because of IBUS latency. The worst-case situation occurs when each cell received is a message: a buffer completes with each cell received and RLB/HLB flushing is at maximum rate. FLB/HLB entries are two words including address, cell count, status flags.

Several SRAMs exist within the MPC as can be seen with reference to FIGS. 35 and 36. These memory devices aid in buffering data before being written to SDRAM or the bus, and holding necessary address information.

The Packing Cell Buffer (PCB) (423, FIG. 35)

In many cases, messages of data stored at various locations within the architecture are broken apart into pieces kept in non-continuous memory locations. It is, therefore, advantageous to pack message fragments together into one block of contiguous memory. The cell packer 420 accomplishes this task.

The packing cell buffer 423 holds data released from the cell packer 420 until it receives a command to flush its contents. This buffer spans 16×32 bits x3, dual-ported SRAM locations. A cell is defined to be sixteen words long. Therefore, the dual-ported nature of the packing cell buffer allows for flushing one cell while filling another cell. The cell packer and packing cell buffer are active during the following data transfers: MSG XMIT, SMEM WRITE, SMA READ, SMEM READ, MEM MOVE, CELL XMIT, and CBIO READ.

The PCB Tag (454—FIG. 36)

The packing cell buffer (PCB) is divided into three, one-cell sections. The flushing of the PCB occurs one cell at a time. Each one-cell section of the PCB has a tag with which it is associated. The tag stores information about the data loaded into its corresponding section. The information in a message tag consists of cell destination address error status, validity, loss priority, sequence number, and start and end. As well, two bits will hold address decode information: one bit will indicate message/non-message and the other will determine if the transfer is to the system bus or to the I-Bus. Non-message tags hold a subset of the information associated with a message tag.

Bit 5, the MorN bit, distinguishes between the message and non-message tags (MorN=1 for a message tag; MorN=0 for a non-message tag). The other fields are as described below:

Bits 21 through 26 determine the channel over which an IOP is receiving a message. Each incoming message is granted a channel number unique during its transmission time.

Bits 17 through 20 define the destination slot.

Bits 16 through 19 define the destination bus.

Bits 11 and 12 define the receive list.

Bits 9 and 10, seq, hold the sequence number of the incoming cell.

Bit 8, P, holds the loss priority bit.

Bit 7, start, holds the start-of-message bit.

Bit 6, end, holds the end-of-message bit.

Bit 5, seqe, will be set if a sequence error has occurred.

For Non-Msg Tag

Bits 5 through 30 represent the cell's physical destination location in SDRAM or COX shared memory. It should be emphasized that this tag is for non-message transfers, i.e., transfers which bypass the free list/receive list mechanism. (These include SMEM WRITE, SMEM READ, MEM MOVE, CBIO READ, CBIO WRITE, and CBMEM WRITE).

For both Msg and Non-Msg Tags par—Bit 4 will be set if a parity error has occurred.

error—Bit 3 will be set if any type of error has occurred.

CorI—Bit 2 tells hardware if the data transfer is destined for the system bus (CorI=1) or for the I-Bus (Cod=0).

Morn—Bit 1 shows if this particular tag is associated with a cell which is part of a message (MorN=1) transfer or part of a non-message transfer (MorN=0).

V—Bit 0, the valid bit, determines if the data in the buffer with which this tag is associated contains valid data or invalid data.

The Inbound Cell Buffer (ICB) (427—FIG. 35)

There also exists a buffer called the inbound cell buffer 427. This buffer must receive unsolicited messages from other IOPs as well as allow for eavesdropping on the bus; therefore, it is active during MSG RCV and PROMISCUOUS RCV transfers. Data will be held in the inbound cell buffer until it can be flushed onto the Inter-ASIC bus and into the SDRAM. To keep from dropping data except under extreme conditions, the inbound cell buffer will cover four 16×32 bits, dual-ported SRAM locations.

The ICB Tag (457—FIG. 36)

There exist two types of ICB tags. One is associated with MSG RCV transfers and, therefore, requires a MSG tag. The MSG tag for the ICB is identical to the MSG tag for the PCB. The other tag pairs with the PROMISCUOUS RCV transfer, active when the MPC is in promiscuous mode.

The Channel Status SRAM (458—FIG. 36)

The channel status SRAM 458 in the MPC directs incoming data into receive buffers in the SDRAM. This buffer contains thirty-two, one-word entries. Each entry corresponds to a different logical channel device. The information in an entry points to a receive buffer location in SDRAM and also supplies count information.

Data written to the SDRAM always moves in chunks of 64 bytes, i.e., one cell. The responsibility of incrementing address information within the 64-byte cell lies with the SMC or local processor. Therefore, the MPC need only specify address locations sixty-four bytes apart. Hence, the lowest six bits of address information will not be communication to the SMC during data transfer to the SDRAM.

The MPC must determine when a receive buffer in the SDRAM becomes full at which time it will be required to consume another entry from the free list. The count information indicates the number of cells which have been written to a receive buffer. The size of the receive buffer is indicated in the Receive Buffer Size register and may be $N*64\epsilon(1, 2, \ldots, 256)$ bytes long. Given that 16384/64=256, at most 256 cells can be written into the largest buffer thereby explaining the need for an eight-bit count field in the channel status SRAM bit definition.

H. Message Receive Logic Block

Figure 39:
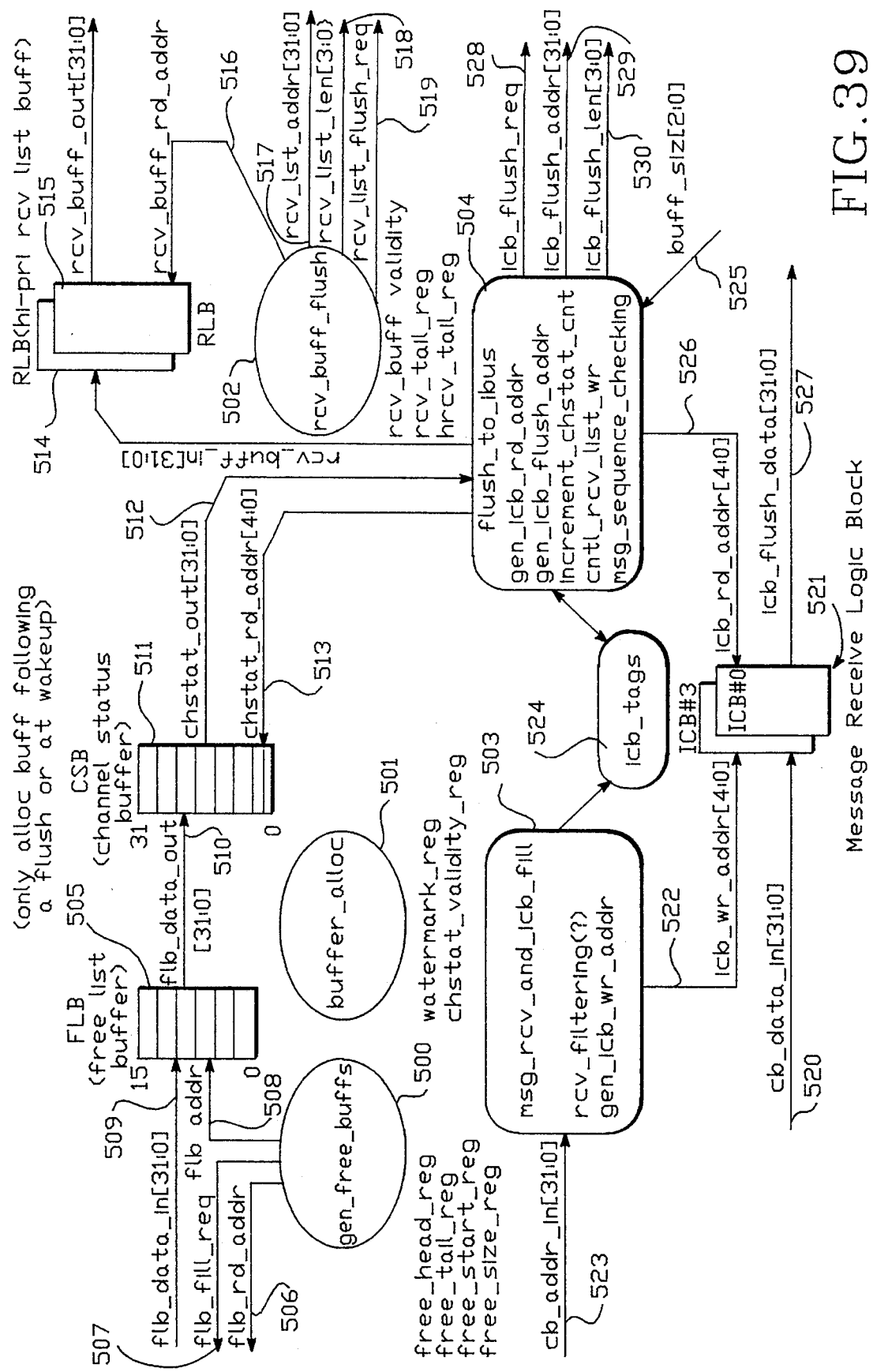
FIG. 39 illustrates the message receive logic in the message passing controller.

FIG. 39 shows the structure of the Message Receive Logic Block 410 of FIG. 34. Any data transfer bound for SDRAM moves through this logic. Message and non-message transfers are treated differently: cells which are part of a message transfer are moved into the SDRAM receive buffer structure, while non-message cells do not move into receive buffers—they are written to a specific physical SDRAM address.

Quite a bit of the logic in this section is associated with management of the receive buffers and bus logical receive channels.

The major functional blocks are summarized as follows:

get_free_buffs 500

Maintain status of the double-buffered free list buffer FLB. Post ibus read requests and manage movement of data into the FLB from IBUS. Contains free_head_reg, free_tail_reg, free_start_reg, and free_size_reg registers.

buffer_alloc 501

Allocate buffers from the FLB to logical receive channels. Read the next sequential FLB entry and write it into the CSB along with a zero count field. Maintain the Channel Status validity register. This module is necessarily quite intimate with an icb_flush module which needs to mark CSB entries invalid as they are flushed to receive buffers and which needs to check for a valid channel status entry before flushing an ICB message cell to SDRAM.

rcv_buff_flush 502

Manages the queuing and flushing of completed receive buffers onto the two receive lists maintained in SDRAM. Buffers and status are moved into the rcv and hrcv list buffers (RLB and HLB) by the flush to ibus function. Then, the rcv_buff_flush function manages posting requests to the ibus and the associated flushing of the RLB and HLB.

msg_rcv_and_icb_fill 503

Moves data from bus into the ICBs. Writes the ICB tags. Performs receive filtering (perhaps).

flush_to_ibus 504

Reads ICB tags and performs ICB flush to IBUS. Updates CSB cell count field and determines when an entry moves from the CSB to the RLB or HLB. Writes RLB entries based on CSB and ICB tags. Checks cell sequence and maintains channel status -may drop ICBs and report error conditions.

gen_icb_flush_addr (within flush_to_ibus 504)

This function takes the bus channel status RAM contents and conditions them to create an ibus address for flushing one of the ICBs. At the same time, the cell count associated with the logical bus receive channel is incremented for write back into the channel status RAM or into the rcv_list buffer RAM. Some registering logic may be required in this path, since the CSB is being modified as the flush occurs.

The get_free_bufs block 500 generates addresses and requests for management of the free list buffer 505. Thus, outputs of the block 500 include the free list buffer read address on line 506, the free list buffer fill request on line 507, and the free list buffer addresses on line 508. In response to requests from the get_free_bufs block 500, the free list buffer data is supplied from the intermediate bus on line 509 to the free list buffer 505. Data from the free list buffer is supplied on line 510 to the channel status buffer 511. This process is managed by the buffer allocation block 501, which maintains the watermark registers and the channel status validity registers. The channel status buffer outputs are supplied on line 512 to the flush_to_ibus block 504. Also, addresses from the flush_to_ibus block 504 are supplied on line 513 to the channel status buffer for accesses to it.

The rcv_buff_flush block 502 manages the high priority receive buffer 514 and the normal priority receive buffer 515. This block manages the receive buffer validity, and the tail registers for the receive buffers. Outputs of this block include receive buffer addresses on line 516, the receive list addresses on line 517, receive list length value on line 518, and a receive list flush request on line 519.

The incoming data path from the system bus is driven across line 520 to the incoming cell buffers generally 521. Write addresses for the incoming cell buses are supplied on line 522 from the msg_rcv_and_icb_fill block 503. Block 503 receives the addresses from the system bus on line 523 and generates the incoming cell buffer addresses on line 522. Also, the block 503 manages the incoming cell buffer tags 524.

Data from the incoming cell buffers are flushed to the internal bus under control of the flush_to_ibus block 504. This block receives the channel status on line 512 and buffer size information on line 525. It generates the read addresses for the incoming cell buffers on line 526 and causes a flush of data on line 527 to the local SDRAM. This block also generates the incoming cell buffer flush request two control signals on lines 528, the flush address on line 529, an the flush length value on line 530 for management of the flush to the local memory.

I. Cmd List Data Transfer Logic

Figure 40:
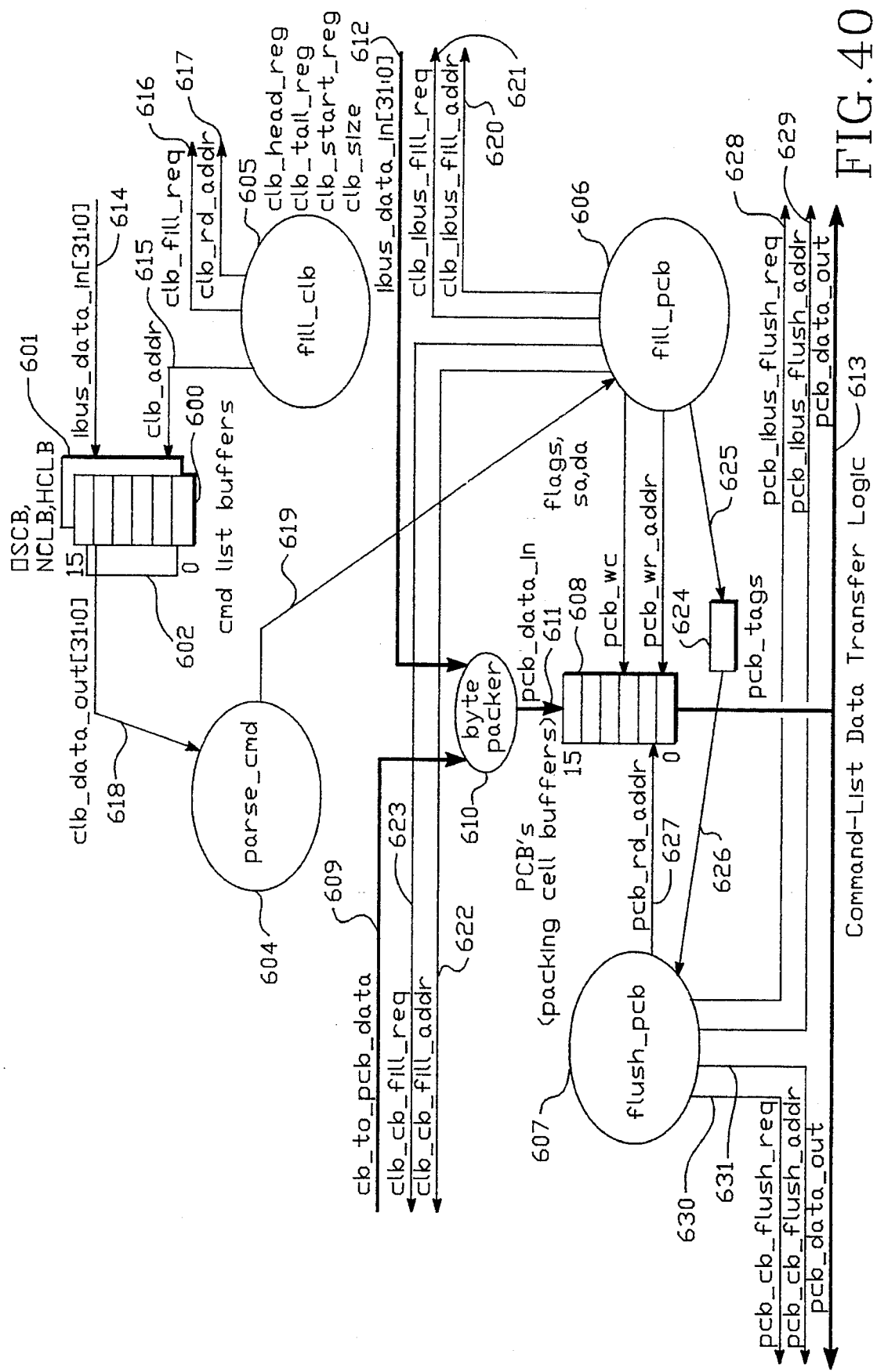
FIG. 40 illustrates the command list data transfer logic within the message passing controller.

FIG. 40 shows the structure of the Command List Data Transfer Block 409 of FIG. 34. The MPC transfers data according to commands placed by software onto one of two command lists (NCLB 600, HCLB 601) or onto a high priority one-shot command buffer (OSCB 602). All data transferred under command list flows through the packing cell buffers 608 PCBs, and both source and destination (fill and flush) may be either system bus or internal bus.

The major functions of this block are summarized as follows: parse_cmd 604

Read entries from the CLBs 600, 601 and OSCB 602. Determine which command to next process. Associate multiple CLB entries and handle as a single message (cause packing to occur). Move address entries to fill_pcb module 606. Write CLBs invalid once entries are processed. Flush entries for a message that hits an error condition.

fill_clb 605

Generate ibus request to get next block of CLB entries. Mark CLBs valid as they are successfully filled.

fill_pcb 606

Generate request to either ibus or bus to read data (through byte_packer) into PCBs. Flow-control filling of PCBs. Write PCB tags.

flush_pcb 607

Read PCB tags. Generate request to either ibus or system bus to flush PCBs. Write PCB tags empty once transfer completes.

Data from the system bus comes into the packing cell buffers across line 609 into a byte packing mechanism 610. From the byte packing mechanism, the data is supplied on line 611 into the packing cell buffers 608. Also, data may be supplied to the packing cell buffers from the internal bus across line 612 which is coupled to the byte packer 610 and across line 611 into the packing cell buffers. Data may be supplied from the packing cell buffers on line 613 either to the system bus or to the internal bus, as required.

The command list buffers are filled from the internal bus across line 614 at addresses supplied on line 615 from the fill_clb module 605. The fill_clb module 605 also generates the fill requests on line 616 and the read addresses on line 617 to support fills and reads of the command list buffers. Also, the fill_clb module 605 manages the clb head register, the clb tail register, the clb start register, and the clb size registers.

Command list data comes out of the command list buffers across line 618 into the parse_cmd module 604. This module supplies the source and destination addresses and necessary flags on line 619 to the fill_pcb module 606. The fill_pcb module 606 generates the internal bus fill address on line 620 and the internal bus fill request online 621. Also, it generates system bus fill addresses on line 622 and fill requests online 623. Further, it loads the packing cell buffer tags 624 with appropriate data across line 625. These tags are read by the flush_pcb module 607 which manages flushing of the packing cell buffers. This module 607 supplies the read addresses for the packing cell buffers on line 627, and issues the internal bus flush requests and flush addresses on line 628 and 629, respectively. Also, system bus flush requests and flush addresses are supplied on lines 630 and 631 from the flush_pcb module 607.

The message passing controller acts as a channel device on the internal bus operating according to the protocol of that bus. The types of message passing controller initiated transfers on the internal bus are detailed in Table 1.

TABLE 1

| type of transfer | MPC-initiated IBUS transfer types | | |
|---|---|---|---|
| | expected length | priority factors | priority |
| read command list(s) [there are two or three cmd list] | always 16-word (4 entries) | if cmd list not filled, then we cannot transmit full rate on bus, no real problem | REQ |
| read free list | always 16-word (16 entries) | free list buffer needs to always have valid entries for allocation to new receive activity | HREQ |
| write receive lists [there are two, normal and hp] | min 2-word, max 16-word | needs to flush to make room for completed buffers, less frequent than cell buff flush | HREQ |
| flush inbound cell buffer (write to SDRAM) | generaly 16-word xfers, always 16-word aligned partial cells at end of message | critical need to flush cell buffers to keep available for bus receive at full rate (worst case, not sustained) | HREQ |
| fill outbound packing cell buffer (read SDRAM) | non-aligned and random length dependent on transmit buffers - large buffers will mean most transfers burst full 16 words | bus transmit data takes back seat to receive activity | REQ |
| event | single-word write to SMC | latency of intr/event to processor is a factor, but there is no danger of loss or orverrun here | REQ |

Event/interrupt signals from the MPC are supplied to the local processor through the shared memory controller SMC, according to the internal bus protocol.

The conditions set out in Table 2 send an "event" from the MPC to the SMC (causing a bit-set operation in the SMC's out-of-band event register):

TABLE 2

IBUS out-of-band event codes

| event code | condition | synchronous with data xfer |
|---|---|---|
| 0 | no event | n/a |
| 1 | command list entry complete (when notification bit set) | if data write to sdram involved |
| 2 | receive list write (new receive tail) | yes |
| 3 | uart_trap assertion (system bus cycle) | no |
| 4 | out of receive buffers | no |
| 5 | system bus error condition | no |
| 6 | dropped hi-cell-priority system bus cell | no |
| 7 | spare | — |

The MPC makes efficient use of the SDRAM memory system. This means that the MPC will read up to 16-words across the internal bus and the transfers may cross 16-word-aligned boundaries. Any number of words up to 16 may be read from any word-aligned address. The SMC is expected to deal with SDRAM page crossings, so the MPC need not account for or track that case. If the SMC needs to put ibus wait-states out to deal with page crossings then the MPC will implement ibus wait-states (as instructed via a wait command code from the SMC chip). In the case when a long transmit buffer is to be read, the MPC will shorten the first ibus burst read so that subsequent bursts for that buffer will be 16-word aligned bursts.

The following categories of events and interrupts are implemented in the MPC:

uart_warn

This is a non-maskable trap signal to the local processor. A bus write to the MPC's uart_warn register causes the MPC to assert an active low warn signal directly to the local processor. The MPC simply sources a signal which, at the board-level, is connected to the processor. This signal bypasses the IBUS and SMC.

uart_trap

Used for out-of-band debug, a bus write to the uart_trap register causes the MPC to send an event to the SMC (via out-of-band event mechanism on the ibus), which in turn asserts a trap signal to the local processor.

channel_device_interrupts

This class of events uses the ibus out-of-band event mechanism including the event_tag field in the upper nibble of the ibus address. This is used by the MPC to notify the local processor of command completion, dropped cells, bus error, illegal command entry, etc. In the SMC, each event may be set as a polled event or summed into an active low intr signal to the processor.

in-band interrupts and events

This amounts to a register access from a channel device to the SMC (the SMC sums events and interrupts into registers providing up to 32 bits per channel device). The MPC does not use this mechanism, but would do so if bus interrupt and event receives were implemented.

J. REGISTER DEFINITION

Registers in the MPC are listed below with detailed description of their function. The name will be given first, then in parentheses the address offset is stated in hexadecimal. The size of each register will be given along with a description of the register's function. Unless stated otherwise, assume that the register is R/W. Unless stated otherwise, assume that all registers are set to zero when the MPC comes out of reset.

1. System Registers Slot Number (0000)

This is a 4-bit register providing the encoded slot number, from 0 to 15.

Arbitration and Priority ID (0004)

This 4-bit register provides a device with an encoded arbitration ID. The priority bit used by the device is determined by adding 16 to the arbitration ID. This use of priority is enabled by device specific means.

Arbitration Mask (0008)

This 16-bit register is used to mask (AND) arbitration/priority levels on the bus. Thus, 0's are set in every bit corresponding to non-existent cards, and 1's are set in every bit corresponding to existing cards. Thus, all devices must drive both arbitration and priority lines during every arbitration phase.

Revision Register (000C)

This 4-bit read-only register gives a revision number for the bus device.

System Bus Device Type (0010)

This 8-bit register gives a hard coded bus device type. Different bus devices will have different register configurations, so software must check the value in this register before attempting to program the device. The COX is set to 0, CMPI is set at 1, and the MPC will be set at 2.

Backoff Timer (0018)

This 3-bit register indicates how long to wait when a backoff indication is received.

Parity Error Byte Flags (001C)

This 5-bit register has one or more of its four bits set to indicate which bytes of the data at the affected address caused a parity error. The appropriate bits in this register are written by a bus device receiving bus data with bad parity. These flags are read only. The lowest 4-bits indicate a data parity error, while the highest bit indicates an address parity error. The lowest bit is associated with the data byte on D0–D7, and the fourth lowest with the data on D31–D24.

Address Generating Parity Error (0020)

This 32-bit register holds the address which had parity error problems.

Backoff Counter (002C)

This 4-bit read/write register gives a count of the number of backoffs received by this chip. An error is generated by the chip when 16 backoffs in a row are received.

System Bus Device Configuration (0030)

This 5-bit register holds the reset and enable bits shown in Table 3:

TABLE 3

Corebus Device Configuration

| Bits | Description |
|---|---|
| 4 | BRES - This bit is used to reset IOP board |
| 3 | SCRES - When this bit is set is initiates a cold reset. A cold reset reinitializes all values to be identical to power-up except that the error state information is saved. This bit can also be set as a side effect of the bus ERR bit being set more than 24-clock period. |
| 2 | SWRES - When this bit is set it initiates a warm reset. A warm reset stops operation of the device and returns it to a known free and idle state, disabling operation, but does not reinitialize the values of registers. The SWRES bit |

TABLE 3-continued

Corebus Device Configuration

| Bits | Description |
|---|---|
| | can be set by the ERR signal being asserted more than 12 clock periods. |
| 1 | ARBE - This enables the device to drive its arbitration bit on the bus. Note that driving its arbitration bit is not the same as asserting its arbitration bit. |
| 0 | CBE - This enables the device to transmit over the bus. When disabled the device may still participate in arbitration. |

UART Register (0034)

This 32-bit register allows out-of-band communication to other devices on the bus.

Error Status (0128)

This 10-bit register provides error bits to guide the software when it receives an error interrupt as shown in Table 4. Any bit set causes the error interrupt to be requested.

TABLE 4

Error Status Register

| bits | Description |
|---|---|
| 0 | This bit indicates that a core time out occurred. |
| 1 | This bit indicates that a backoff retry sequence was not successful. |
| 7:4 | These bits indicate a parity error occurred on data sourced from the bus. If these bits are set it may be in tandem with bit 9 (processor read) or bus agent write. |
| 8 | This bit indicates that an address parity error occured. |
| 9 | This bit indicates whether the last cycle that had an error was a write from another device or a read by this device. |

2. List Registers

There are a group of registers which can be described as list registers. There are registers for the free list, normal priority command list, high priority command list, normal priority receive list, high priority receive list. Each may have a start and size register, and/or head and tail registers. The start and size registers will be set during initialization by software. Initially both the head and tail registers will be set to 0. For the command lists, the MPC, will be continually updating the head register, and the software writes the tail register. The software will occasionally read the head register and set the tail register (not necessarily at the same time). From the perspective of the MPC, the command list head pointer will always be current while the tail pointer may be stale (being stale does not mean that it cannot be used, it means that the current tail pointer may be old). For the receive lists, the MPC updates the tail pointer, and there is no head pointer.

2.a. Free List Registers

Free Head Register (0200)

This is an 11-bit register which holds part of the address of a pointer in the free buffer list (in SDRAM) which points to the next free receive buffer (in SDRAM) to be loaded into the free list buffer (in MPC). The bottom 6 bits of the 32 bit address are not included because the free list entries are transferred-in 16-word aligned blocks. The top 15 MSBs of the address are not included because it will never change and is specified by the free start register. The value of the free tail register must be 1 or more higher than the value of the free head register for the MPC to use the entries specified by the free head register. If they are equal it means that there are no valid entries available. If the free tail register is smaller than the free head register, it means that the free tail register must have already wrapped around the bottom of the free buffer list and started from the top again. This means that it is alright to transfer the pointers to the free buffers into the MPC's free buffer list. Reads to this register will behave differently than writes because during writes the entire 32 bits of the address will be valid. This address is generated by concatenating the bits [31:17] from the free start register, the merge of bits [16:10] of the start with bits [16:10] of the free head, the bits [9:6] of the free head register and bits [5:0] are padded with 0's.

Free Tail Register (0204)

This is an 11-bit register which holds a portion of the address of a pointer in the free buffer list (in SDRAM) which will point to the next free buffer as determined by software. Like the free head register, the bottom 6 bits of the 32-bit address are not needed since software will be assigning 16 buffers at a time and the top MSBs of the address will not be needed since they will always be the same as the free start register. Once again the reads to this register will behave differently than writes (see the free head register definition for additional information).

Free Start and Size Register (0208)

This is a 30-bit register which holds the 22 MSBs of the address of the top of the free buffer list (in SDRAM) and 8 bits of size information. A size value of 00000001 will correspond to the minimum normal priority command list size of 256 entries, 00000010 corresponds to 512 . . . 10000000 corresponds to the maximum normal priority command list size of 32768.

Free Watermark 0 Register (0210)

This 11-bit register stores the count (×16) of valid entries in the free list below which the hardware will have different characteristics knowing that the number of entries in the free list is getting low. The MPC will start dropping medium and low reliability cells when the free buffers are less than the number indicated by this register.

Free Watermark 1 Register (0210)

This 11-bit register is similar to the free watermark 0 register; just replace "0" with "1". The MPC will start dropping low reliability cells when the free buffers are less than the number indicated by this register.

2.b. Command List Registers

The command list registers are very similar to the free list registers. Both need to get information off a list while keeping track of where to get the next element of the list and the location of the end of the list. For the command list registers a watermark register will not be necessary. (Thus generating the difference between the head and tail register will not be necessary, just an equality check to see if we are out of commands.) The MPC will assume that the software will update the command lists 4 commands (16 words) at a time. If the software cannot fill the 4 commands, it will put the null command in the next empty command field.

Normal Priority Command Head Register (0214)

This 11-bit register is identical to the free head register; just replace "free" with "normal priority command."

Normal Priority Command Tail Register (0218)

This 11-bit register is identical to the free tail register; just replace "free" with "normal priority command."

Normal Priority Command Start and Size Register (021C)

This 30-bit register id identical to the free start and size register; just replace "free" with "normal priority command."

High Priority Command Head Register (0228)

This 11-bit register is identical to the free start and size register; just replace "free" with "high priority command."

High Priority Command Tail Register (022C)

This 11-bit register is identical to the free start and size register; just replace "free" with "high priority command."

High Priority Command Start and Size Register (0230)

This 30-bit register is identical to the free start and size register; just replace "free" with "normal priority command.

Normal and High Priority Command Head Register (0214)

This 22-bit register holds the contents of both the normal priority command head register and high priority command head register. This is to allow transfers of the command head registers in one 1-word transfer. This register is a "phantom" register which points to the two "real" registers which actually holds the information.

Normal and High Priority Command Tail Register (0214)

This 22-bit register holds the contents of both the normal priority command tail register and high priority command tail register. This is to allow transfers of the command tail registers in one 1-word transfer. This register is a "phantom" register which points to the two "real" registers which actually holds the information.

2.c. Receive List Registers

The receive list registers are similar to the command list registers. Hardware writes the receive list entries to the location pointed to by the receive tail register. The receive list register's head register is not needed because software will never give hardware enough receive list entries for the tail to over-run the head. The receive list tail register must have a higher resolution than the other list tail registers since there will no longer be requirement of the 16 word transfers.

Normal Priority Receive Tail Register (023C)

This is an 11-bit register which holds a portion of the address of a pointer in the normal priority receive list. The top 15 bits of the 32 bit address are not needed since they will be the same as the normal priority start register. The bottom 3 bits are not needed since they will always be 0 since the descriptors to the receive buffers will always be sent in 2 word increments. This register will wrap around back to 0 when it has exceeded the size of the list.

Normal Priority Receive Start and Size Register (0240)

This is a 32-bit register which holds the 22 MSBs of the address of the beginning of the normal priority receive list space (in SDRAM) and 8 bits of size information. A size value of 00000001 will correspond to the minimum normal priority command list size of 256 words, 00000010 corresponds to 512 . . . 10000000 corresponds to the maximum normal priority command list size of 32768 words.

High Priority Receive Tail Register (0248)

This 14-bit register is identical to the normal priority receive tail register; just replace "normal priority" with "high priority."

High Priority Receive Start and Size Register (024C)

This 30-bit register is identical to the normal priority receive start and size register; just replace "normal priority" with "high priority."

Receive Buffer Size Register (0258)

This 8-bit register (N) holds the information about the size of the receive buffers in the SDRAM. The size of the buffer will be N*64 bytes except when N=0. When N=0 the size of the buffer is 16348 bytes. See Table 5.

TABLE 5

Receive Buffer Size Register Decode

| Encoded Value | Size of Buffer in Bytes |
|---|---|
| 00000001 | 64 |
| 00000010 | 128 |
| 00000011 | 192 |
| 00000100 | 512 |
| ● ● ● | ● ● ● |
| 11111110 | 16256 |
| 11111111 | 16320 |
| 00000000 | 16384 |

3. UART Registers

The uart_register function provides a path for "out-of-band" communication between cards across the bus. This feature requires software driver support (call it a remote monitor function, or whatever). Another card may access registers in the MPC's bus init space. The local processor also has access to this register set, facilitating board-level communication.

4. Pointer Lists and Address Fields

Pointer lists and memories reside within the MPC. Three types of pointer lists exist: the command list, the free list, and the receive list. These lists allow software to communicate to hardware the whereabouts of various buffers within SDRAM.

The SDRAM memories within the MPC, aside from the cached pointer lists, provide a storage area for inbound and outbound data as well as address buffer locations.

Each cell transferred over the bus has an address field. The information within these fields relates to information software supplies to the hardware via the command list.

The pointer lists and memory structures of the MPC as well as information contained in a cell address field are outlined below.

4.a. The Pointer Lists

The Command List

The command list consists of an array of four-word entries stored in SDRAM which contain instructions from the software to the hardware. The instructions may ask hardware to gather, pack, and move data between SDRAM and COX shared memory, source an interrupt or event to the bus, or read/write a word of data to bus I/O or memory space. A portion of the command list will be cached within the MPC. The cache spans two groups of 2×16×32 bits.

The possibility exists for three types of command list entries. One type of command list entry points at data in a message fragment buffer for incorporation into a message transfer. A cell which is part of a message transfer is prepended with a message address field. The second type of command list entry points at data in a non-message fragment buffer for incorporation into a non-message transfer. A non-message transfer cell uses a non-message address field as its prepended cell header. The third type of transfer is a type of non-message transfer except in this case there is no fragment buffer. One word of data is written to the bus memory or I/O space. The word for writing is actually specified within the command list entry. These transfers are called embedded-data transfers. Embedded-data transfers, being a type of non-message transfer, use non-message address fields as their prepended cell header.

Table 6 below shows the first six bits in a command list entry given a particular type of transfer. FIG. 9 gives a short description of each type of transfer. Tables 7 and 8 state the meaning of the Destination and Source Code bits in Table 6. These bits indicate whether data is transferred to/from the I-Bus/system bus and whether the transfer is in memory space or in I/O space. It is intended that CBIO WRITE and CBMEM WRITE (the embedded-data transfers) move only one word at a time onto the bus. Therefore, no source address is needed and the data to be written may be embedded in the command list in place of the source address. This is indicated with a source address code of 2'b00.

Special care must be taken when a command list entry specifies the movement of data With a destination address in local SDRAM. Software needs a reliable method for determining that that type of transfer has actually completed (the data is actually in local SDRAM). To do this, the MPC hardware will automatically block command list processing (not bump the head pointer) until data bound for SDRAM via a non-message transfer has successfully flushed across the ibus. Also, any event associated with this entry (specified by a command list notify bit; see below) will not be sent until the write to SDRAM is completed. This allows the software event handler to read head pointers to determine which entries are actually complete once an event is received (since there could be several entries causing events quite close together, head pointer management is critical).

TABLE 6

Allowed Command List Transfers

| Transfer | Type | C | Dest. Code | Dest. Code | Src. Code | Src. Code | |
|---|---|---|---|---|---|---|---|
| MSG XMIT | 1 | 0 | 1 | 0 | 0 | 1 | msg transfer |
| SMA READ | 1 | 0 | 0 | 1 | 1 | 1 | msg transfer |
| SMEM READ | 0 | 0 | 0 | 1 | 1 | 1 | non-msg trans |
| SMEM WRITE | 0 | 0 | 1 | 1 | 0 | 1 | non-msg trans |
| MEM MOVE | 0 | 0 | 0 | 1 | 0 | 1 | non-msg trans |
| CELL XMIT | 1 | 1 | 1 | 0 | 0 | 1 | msg-transfer |
| CBIO READ | 0 | 0 | 0 | 1 | 1 | 1 | non-msg trans |
| CBIO WRITE | 0 | 0 | 1 | 0 | 0 | 0 | embedded-data trans |
| CBMEM WRITE | 0 | 0 | 1 | 1 | 0 | 0 | embedded-data trans |

TABLE 7

Source Codes

| | Source Code | Source Code |
|---|---|---|
| Word 1=Data | 0 | 0 |
| I-Bus Memory Space | 0 | 1 |
| CB I/O Space | 1 | 0 |
| CB Memory Space | 1 | 1 |

TABLE 8

Destination Codes

| | Destination Code | Destination Code |
|---|---|---|
| Illegal Code | 0 | 0 |
| I-Bus Memory Space | 0 | 1 |
| CB I/O Space | 1 | 0 |
| CB Memory Space | 1 | 1 |

Command List Priorities

Two command list caches exist within the MPC. Servicing priorities between the two lists varies: normal priority (HTQ: high-throughput queue) and high priority (HRQ: high-reliability queue).

Normal Priority Command List (software: HTQ)

The normal priority command list resides in SDRAM. Thirty-two words from this list may be cached in SRAM in the MPC ASIC normal priority command list buffer. Entries written by software to this list receive the lowest priority attention in regards to hardware processing. This list may contain pointers to both message and non-message fragment buffer entries as well as hold embedded-data transfer instructions.

High Priority Command List (software: HRQ)

As with the normal priority command list, the high priority list also resides in SDRAM. Thirty-two words of this list may be cached in SRAM in the MPC ASIC high priority command list buffer. Entries written by software to this list receive a higher priority attention by hardware than entries on the normal priority list. This list may also contain pointers to both message and non-message fragment buffer entries as well as hold embedded-data transfer instructions.

Command List Entries Command List Entry—Message Fragment Buffer

Figure 41:
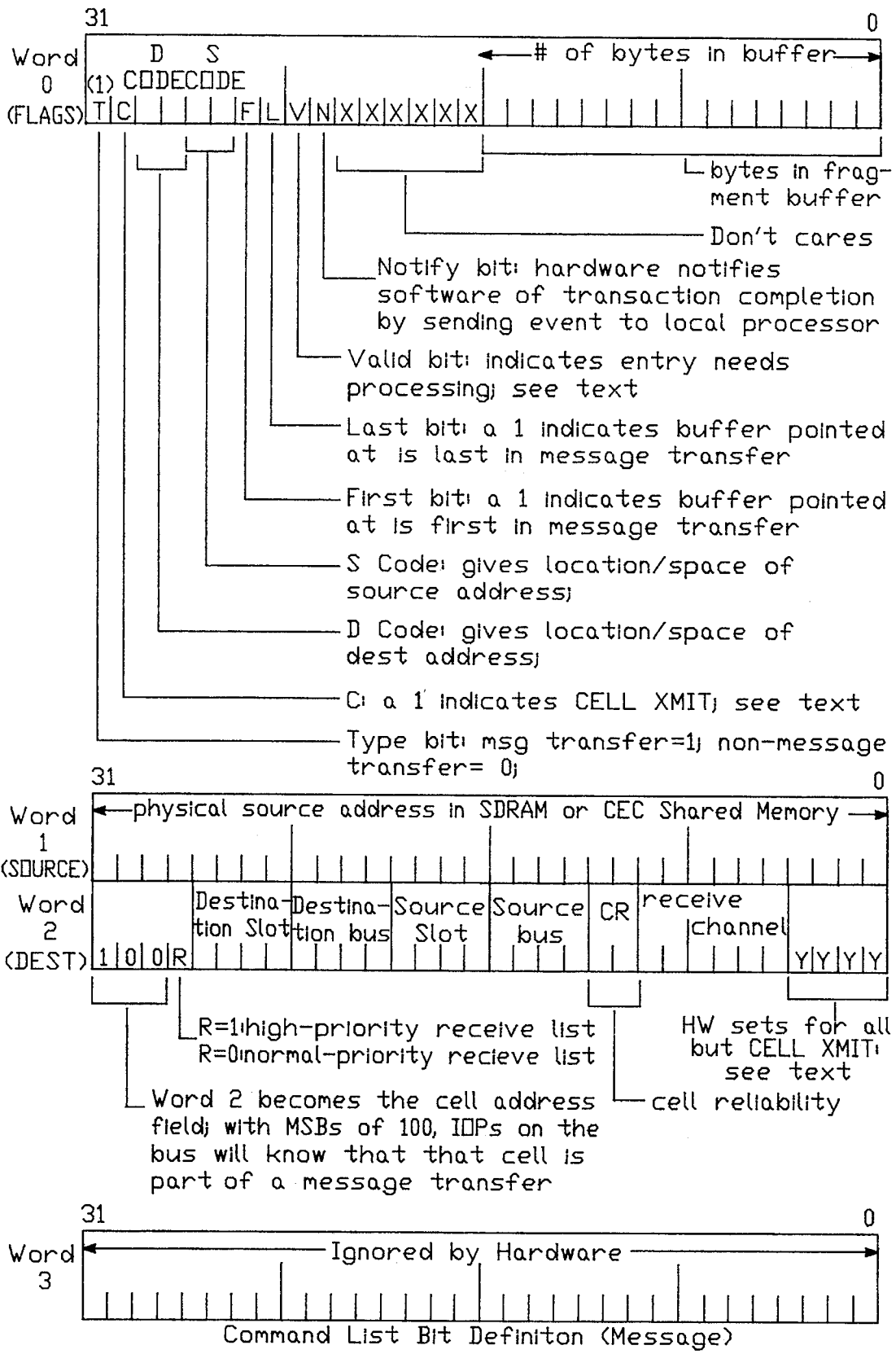
FIG. 41 illustrates the command list bit definition for a message type transfer.

FIG. 41 defines the bits in a command list entry pointing at data which will become part of a message transfer.

A description of the fields found in FIG. 41 follows:

The T in bit 31 of Word 0 stands for Type. If Type is set to a one, the command list entry specifies a message transfer; if type is set to a zero, the command list entry specifies a non-message transfer.

The C in bit 30 of Word 0 indicates to hardware that this particular command list entry specifies a CELL XMIT transfer. Hardware will know not to change the "Y" bits in Word 2 but to copy them directly to the message address field.

The D CODE[29:28] of Word 0 indicate to hardware whether a transfer is destined for the bus of the ibus and whether or not that transfer is in I/O space or memory space. These bits refer to the address in Word 2, the destination address.

The S CODE[27:26] of Word 0 indicates to hardware whether the data transfer is sourced from the system bus or the ibus and whether the address is in I/O space or memory space. In the case of an embedded-data transfer, these two bits will indicate that the data to be written is held in Word 1. These bits, then, refer to the address in Word 1, the Source Address field.

F stands for First in bit 25 of Word 0. If the memory location to which this command list entry points is the first buffer in a series of buffers which will combine to form one data transfer, then F will be set to a one. Otherwise, F will be zero.

Likewise, the L in bit 24 of Word 0 stands for Last. If the buffer to which this command list entry points is the last in a series of buffers which combine to form one data transfer, then L will be set to a one. Otherwise, L will be zero.

The V in bit 23 of Word 0 holds the valid bit. This bit indicates that a command list entry requires hardware processing. (V=1 indicates processing needed; V=0 indicates processing not needed). If a particular command list entry shows a valid bit of V=0, hardware will assume that the remaining command list entries in the same cell are also invalid. Hardware will resume valid-bit checking at the beginning of the next cell of command list entries.

The lower two bytes in Word 0 contain the number of bytes of data in the buffer to which this command list entry points.

Word 1 specifies the physical memory address where the data buffer resides. This address may be either local SDRAM or shared memory on the COX card.

The top 28 bits of Word 2 contain fields which are bit-aligned to those in the message address field. The hardware will append the bottom four bits to this 28-bit field thereby creating the message address for all transfers besides the CELL XMIT. In this case, whatever software specifies in the command list entry will be directly copied into the message address field. The individual fields in Word 2 are described in detail with reference to FIG. 43.

Word 3 will not be processed by the MPC ASIC.

Command List Entry—Non-Message Fragment Transmit Buffer

FIG. 42 defines the bits in a command list entry pointing at data which will become part of a non-message transfer.

The command list entry tier a non-message data transfer resembles that of a message transfer. Note that the Type bit (Word 0, bit 31) will be set to zero for a non-message transfer and Word 2 will be a physical memory location in SDRAM or shared COX memory. The other fields in FIG. 42 remain the same as those of FIG. 41.

Recall that an embedded-data transfer is really a type of non-message transfer (meaning that the Type bit -bit 31, Word 0—is set to 0). An embedded-data transfer may be distinguished from other types of non-message transfers by decoding the S CODE bits which will be set to 2'b00. With this type of transfer, Word 1 will contain the data for writing instead of a physical source address.

Command List Transfers

This section summarizes the types of transfers initiated by command list entries as introduced with reference to FIG. 9 above. The information given below for each type of transfer refers to fields found in the command list entry as described above. Write and read are in relation to the bus, i.e., one writes to the bus or one reads from the bus.

Message Transfers

The following transfers are referred to as message transfers because their destination address is in message format (Word 2 of command list entry). Address decoding maps bus I/O space addresses 0x(8 or 9)XXXXXXX as message addresses. The S CODE bits within the command list flags indicate whether to retrieve the source data from the core bus or from the I-Bus (see Table 16).

MSG XMIT-

A MSG XMIT transfer request on the command list asks for the transfer of data from the SDRAM of the local IOP to the SDRAM of another IOP. The command list entry points to a message fragment transmit buffer.

Word0[31:26]=6'b 101001

Source address (Word 1)=local SDRAM: 0x9XXXXXXX (I-Bus memory space)

Destination address (Word 2)=message address: 0x(8 or 9)XXXXXXX (system bus I/O space)

SMA READ- This type of transfer moves data from shared memory on the COX to local SDRAM on the IOP. Data is massaged by the MPC to resemble a MSG XMIT transfer, i.e., incoming data is prepended with a message address field so hardware will utilize the receive list for notifying software of data entry.

Word0[]31:26]=6'b 100111

Source address (Word 1)=COX shared memory: 0xXXXXXXXX (system bus.memory space; limited by 4 MB of addressable memory on COX)

Destination address (Word 2)=message address: 0x(8 or 9)XXXXXXX (system bus I/O space)

CELL XMIT- A CELL XMIT data transfer is much like a MSG XMIT except software has explicit control over the message destination address and may only transmit up to sixteen words per command list entry (one cell). This implies that hardware will not alter the bottom four bits of Word 2 in the message fragment buffer command list entry when placing them into the message address field. This type of transfer is used for diagnostic purposes only. Note that bit 30 of Word 0 in the command list entry will be set to C=1 as an indication to hardware that the entry is a CELL XMIT entry.

Word0[31:26]=6'b 111001

Source address (Word 1)=local SDRAM: 0x9XXXXXXX (I-Bus memory space)

Destination address (Word 2)=message address: 0x(8 or 9)XXXXXXX (system bus I/O space)

Non-Message Transfers

The following transfers are referred to as non-message transfers because the destination address of each command list entry refers to a physical location in either local SDRAM or COX shared memory.

SMEM WRITE-

This transfer moves data from the SDRAM of the local IOP to shared memory on the COX.

Word0[31:26]=6/b001101

Source address (Word 1)=local SDRAM: 0x9XXXXXXX (I-Bus memory space)

Destination address (Word 2)=shared memory: 0xXXXXXXXX

SMEM READ-

The SMEM READ data transfer moves data from shared memory on the COX to local SDRAM on the IOP. Data bypasses receive list mechanism in the MPC and is written directly to SDRAM.

Word0[31:26]=6'b000111

Source address (Word 1)=COX shared memory: 0xXXXXXXXX

Destination address (Word 2)=local SDRAM: 0x9XXXXXXX (I-Bus memory space)

MEM MOVE-

This type of transfer moves data out of and back into local SDRAM on the IOP. Data transfer, therefore, bypasses the bus.

Word0[31:26]=6'b000101

Source address (Word 1)=local SDRAM: 0x9XXXXXXX (I-Bus memory space)

Destination address (Word 2)=local SDRAM: 0x9XXXXXXX (I-Bus memory space)

CBIO WRITE

This type of non-message transfer is termed an embedded-data transfer since one word of data is written to the bus memory space by placing this data in Word 1 of the command list entry.

Word0[31:26]=6'b001000

Source address (Word 1)=data for writing (unrestricted)

Destination address (Word 2)=bus I/O space: 0xXXXXXXXX

CBMEM WRITE

This type of non-message transfer is termed an embedded-data transfer since one word of data is written to the bus memory space by placing this data in Word 1 of the command list entry.

Word0[31:26]=6'b001100

Source address (Word 1)=data for writing

Destination address (Word 2)=COX shared memory: 0xXXXXXXXX

The Free List

The MPC must place data entering an IOP into the SDRAM. The software communicates to the hardware locations in SDRAM where data may be placed. These locations are called receive buffers. The free list consists of one-word elements which point to the receive buffers. The length of the receive buffers is fixed at N*64 bytes where N∈ (1, 2, . . ., 256). Each receive buffer is 64-byte aligned. The specific length used is latched in a register called receive buffer size.

Thirty-two 26-bit entries reside in the free list in the MPC arranged as two 16×26 bit, dual-ported SRAMs. Entry data are cached from the full free list held in SDRAM.

The Receive List Standard Receive Mode (RXE=1; PXE=0)

After hardware finishes loading incoming data into receive buffers as allocated by the free list, the data becomes ready for processing by software. The hardware informs the software that a receive buffer needs attention by placing a pointer to that receiver buffer, as well as other information, onto one of two receive lists. One receive list indicates data needing normal-priority attention and the other receive list indicates data needing high-priority attention. As with the command list and the free list, the entire receive list resides in SDRAM. The MPC buffers receive-list data in four, dual-ported, 16×32 bit SRAMs. Two of these SRAMs are dedicated to normal-priority entries and two are dedicated to high-priority entries.

The following describes the entries shown in the receive list bit definition:

If the start bit (Word 0, bit 31) equals one, then the particular buffer pointed to by this receive list entry is the first buffer in a series of buffers which form a message.

Likewise, if the end bit (Word 0, bit 30) equals one, then the particular buffer pointed to by this receive list entry is the last buffer in a series of buffers which form a message. Note that this implies that if neither bit 31 or bit 30 is set to one, then the buffer pointed to by the receive list entry is a middle buffer. If both bits 31 and 30 are set to one, then the message is one buffer in length.

Bits 16 through 23 contain the count field indicating how many cells are stored in a particular receive buffer.

Bits 10 through 15 determine the channel over which the IOP received the message. Each incoming message is granted a channel number unique during its transmission time.

Bits 6 through 9 relate to error checking. Bit 0 will be set to one by hardware if any type of error occurs during the transmission of the message. Bit 1, labeled seq, equals one if the error which occurred during transmission is a cell sequence error, i.e., cells were lost, duplicated, or rearranged. Likewise, bit 2 corresponds to a parity error and bit 3 is currently reserved for a future error status indicator.

Word 1 points to the location in SDRAM corresponding to the first byte of the receive buffer. Note that since all receive buffers in SDRAM are 64-byte aligned, only 26 bits are required to specify the receive buffer address.

Promiscuous Receive Mode (RXE=X; PXE=1)

During promiscuous receive mode all bus cycles are captured by the MPC. Via the receive list, hardware will convey to software the bus address, the bus byte count, the MEM/IO bit, an error bit, and the location of the receive buffer in SDRAM.

The bits in this entry are defined as follows:

Word 0 holds the address read off the bus during the address phase of the bus cycle.

Word 1 [31:6] holds the top twenty-six bits of the receive buffer location in SDRAM where the data associated with this bus cycle has been written. Note that receive buffers are 64-byte aligned in SDRAM therefore the bottom six bits of the address are zero.

Word 1 [5:3] indicates the byte count read off the bus.

Bit 2 of Word 1 is the memory bit from the bus indicating whether data transtar is in either bus memory space; (mere=1) or bus 1/0 space (mem=0).

Bit 0 of Word 1 will be set to one if an error occurs during the bus cycle.

4.b. The Cell Address Field

Since the command list dictates the formation of cells traversing the bus, the address field associated with each cell is intimately related to information bund on the command list. The address field on a cell destined for the bus varies with the type of data transfer. MSG XMIT, SMA READ, and CELL XMIT use message address fields. SMEM WRITE, SMEM READ, MEM MOVE, CBIO READ, CBIO WRITE, and CBMEM WRITE use non-message address fields.

The Message Address Field

FIG. 43 defines the bits found in the one-word message address field, as explained below.

Any cell which has the upper nibble of its header set to 8 (1000) or 9 (1001) will be identified as a cell which is part of a message.

The R in bit 28 indicates to which receive list the cell should be directed. A value of "1" indicates the high-priority receive list (HRQ) and a "0" indicates the low-priority receive list (HTQ).

Bits 24 through 27 define the destination slot. The cell routes to this physical slot in the chassis.

Bits 20 through 23 indicate the bus over which the message will be routed.

Bits 16 through 19 define the source slot. The cell originates from this physical slot in the chassis.

Bits 12 through 15 indicate the bus over which the message originated.

Bits 10 and 11 show cell reliability. The cell reliability bits work against two watermark registers, implementing three levels of reliability for bus messaging as shown in Table 9.

TABLE 9

| MSG address cell_reliability bit definition | | |
|---|---|---|
| cell reliability[1:0] | reliability | loss condition |
| 00 | hi | no free buffers |
| 01 | medium | free buffers less than watermark 0 |
| 10 | low | free buffers less than watermark 1 |
| 11 | rsvd | no receive activity |

Bits 4 through 9 determine the channel over which an IOP is receiving a message. Each incoming message is granted a channel number unique during its transmission time.

A one in bit 3 indicates that this is the first cell in a message.

A one in bit 2 indicates that this is the last cell in a message.

Bits 0 and 1 allow room for a sequence number applied to each cell in a message. Cell sequencing takes place modulo 4.

The Non-Message Address Field

Cells which combine to form a non-message data transfer use physical memory locations in SDRAM or COX shared memory for their address fields.

CONCLUSION

The present invention, therefore, provides a system architecture which handles a large amount of input/output data with high throughput and high reliability. The architecture is particularly suited to high volume network routing systems which interconnect a plurality of high speed local area networks. The architecture supports distributed routing software, in combination with high data throughputs and high flexibility to meet the needs of ever-increasing data rates of local area network systems.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An apparatus for transferring large amounts of input/output data among a plurality of processors having respective local memories, comprising:

a bus interconnecting the plurality of processors;

a plurality of bus interface devices, coupled to the bus and to corresponding processors in the plurality of processors, a first bus interface device in the plurality of bus interface devices which originates a transfer without first obtaining permission to transfer to a destination device including a command list storing a list of commands which characterize transfers of data from local memory across the bus, a bus data buffer which buffers data subject of a command being executed between local memory and the bus, and a second bus interface device in the plurality of bus interface devices which receives a transfer including a free buffer list storing pointers to free buffers in local memory into which data may be loaded from the bus, a receive list storing pointers to buffers in local memory loaded with data from the bus, and an inbound data buffer which buffers data subject of a transfer addressed to the second bus interface between the bus and free buffers in local memory.

2. The apparatus of claim 1, wherein the command list includes a first high priority command list and a second lower priority command list for managing latency of higher priority commands.

3. The apparatus of claim 1, wherein the first bus interface device includes control logic which manages data transfer into and out of the bus data buffer for messages, including data, identified by commands in the command list, to pack data to compose message transfer cells for messages, the message transfer cells including a portion of the data of the message, and to drive the message transfer cells on the bus in burst mode.

4. The apparatus of claim 3, wherein the second bus interface device includes control logic which manages data transfer into and out of the inbound buffer, including receiving burst transfers of message transfer cells from the bus, loading free buffers in local memory from the inbound buffer with message transfer cells, and updating the receive list.

5. The apparatus of claim 4, wherein the receive list includes a first higher priority receive list and a second lower priority receive list for managing reliability and throughput of transfers.

6. The apparatus of claim 4, including logic which monitors the free list, a watermark parameter which indicates an amount of free buffer resources, and watermark logic which causes lower priority messages to be dropped when the free list indicates that free buffer resources in local memory fall below the watermark parameter.

7. The apparatus of claim 6, including a second watermark parameter indicating a smaller amount of free buffer resources, and second watermark logic which cause higher priority messages to be dropped when the free list indicates that free buffer resources in local memory fall below the second watermark parameter, to prevent overflow of the free buffer resources.

8. The apparatus of claim 3, wherein the plurality of processors have respective slot numbers on the bus, and the commands indicate a destination of a message using the slot number.

9. The apparatus of claim 8, wherein the second bus interface device includes control logic with a plurality of channels which manages data transfer into and out of the inbound buffer, including receiving burst transfers of message transfer cells having the slot number of the local processor from the bus, assigning a message transfer cell to a channel for the message, loading free buffers in local memory from the inbound buffer with message transfer cells, and updating the receive list.

10. The apparatus of claim 8, including at least a second bus interconnecting the plurality of processors, and the commands indicate a destination using a bus identifier and a slot number.

11. The apparatus of claim 1, wherein said bus comprises a high speed parallel bus.

12. The apparatus of claim 3, wherein the second bus interface device includes control logic with a plurality of channels which manages data transfer into and out of the inbound buffer, including receiving burst transfers of message transfer cells having an identifier which maps to a channel number, and assigning message transfer cells to a channel in response to the identifier.

13. The apparatus of claim 12, wherein the first bus interface device supplies a single identifier to all message transfer cells which it transfers.

14. The apparatus of claim 13, wherein the plurality of processors have respective slot numbers on the bus, and the identifier comprises the slot number of the transferring device.

15. A bus interface which provides access to a bus for a local processor having local memory, comprising:

a command list storing a list of commands which characterize transfers of data from local memory across the bus, a bus data buffer which buffers data subject of a command being executed between local memory and the bus, a free buffer list storing pointers to free buffers in local memory into which data may be loaded from the bus, an inbound data buffer which buffers data subject of a transfer addressed to the local processor between the bus and free buffers in local memory, and a receive list storing pointers to buffers in local memory loaded with data from the bus.

16. The bus interface of claim 15, wherein the command list includes a first high priority command list and a second lower priority command list for managing latency of higher priority commands.

17. The bus interface of claim 15, including control logic which manages data transfer into and out of the bus data buffer for messages identified by commands in the command list to composes message transfer cells for messages, and drives the message transfer cells on the bus in burst mode without first obtaining permission to send to a destination on the bus.

18. The bus interface of claim 17, including control logic which manages data transfer into and out of the inbound buffer, including receiving burst transfers of message transfer cells from the bus, loading free buffers in local memory from the inbound buffer with message transfer cells, and updating the receive list.

19. The bus interface of claim 18, wherein the receive list includes a first higher priority receive list and a second lower priority receive list for managing reliability and throughput of transfers.

20. The bus interface of claim 19, including logic which monitors the free list, a watermark parameter which indicates an amount of free buffer resources, and watermark logic which causes lower priority messages to be dropped when the free list indicates that free buffer resources in local memory fall below the watermark parameter.

21. The bus interface of claim 20, including a second watermark parameter indicating a smaller amount of free buffer resources, and second watermark logic which causes higher priority messages to be dropped when the free list indicates that free buffer resources in local memory fall below the second watermark parameter, to prevent overflow of the free buffer resources.

22. The bus interface of claim 17, wherein the second bus interface device includes control logic with a plurality of channels which manages data transfer into and out of the inbound buffer, including receiving burst transfers of message transfer cells having an identifier which maps to a channel number, and assigning message transtar cells to a channel in response to the identifier.

23. The bus interface of claim 22, wherein the first bus interface device supplies a single identifier to all message transfer cells which it transfers.

24. The bus interface of claim 23, wherein the plurality of processors have respective slot numbers on the bus, and the identifier comprises the slot number of the transferring device.

25. The bus interface of claim 15, wherein users of the bus have respective slot numbers on the bus, and the commands indicate a destination of a message using the slot number.

26. The bus interface of claim 25, including control logic with a plurality of channels which manages data transfer into and out of the inbound buffer, including receiving burst transfers of message transfer cells having the slot number of the local processor from the bus, assigning a message transfer cell to a channel for the message, loading free buffers in local memory from the inbound buffer with message transfer cells, and updating the receive list.

27. The bus interface of claim 15, wherein said bus comprises a high speed parallel bus.

28. The bus interface of claim 15, wherein the command list includes a first high priority command list and a second lower priority command list for managing latency of higher priority commands, and the receive list includes a first higher priority receive list and a second lower priority receive list for managing reliability and throughput of transfers, and further including:

transfer control logic which manages data transfer into and out of the bus data buffer for messages identified by commands in the command list to composes message transfer cells for messages, and drives the message transfer cells on the bus in burst mode without first obtaining permission to send to a destination on the bus; and receive control logic which manages data transfer into and out of the inbound buffer, including receiving burst transfers of message transfer cells from the bus, loading free buffers in local memory from the inbound buffer with message transfer cells, and updating the receive list.

29. An apparatus for transferring large amounts of input/output data among a plurality of processors having respective local memories, comprising:

a bus interconnecting the plurality of processors;

a plurality of bus interface devices, coupled to the bus and to corresponding processors in the plurality of processors, including a first bus interface device in the plurality of bus interface devices which originates a transfer; and a second bus interface device in the plurality of bus interface devices which receives a transfer, the second bus interface device, including a free buffer list storing pointers to free buffers in local memory into which data may be loaded from the bus, a receive list storing pointers to buffers in local memory loaded with data from the bus, including a first high priority receive list and a second lower priority receive list, and logic which monitors the free buffer list which causes lower priority messages to be dropped to prevent overflow of the free buffer resources.

30. The apparatus of claim 29, wherein the logic which monitors the free list includes a watermark parameter which indicates an amount of free buffer resources, and watermark logic which causes lower priority messages to be dropped when the free list indicates that free buffer resources in local memory, fall below the watermark parameter.

31. The apparatus of claim 30, including a second watermark parameter indicating a smaller amount of free buffer resources, and second watermark logic which causes higher priority messages to be dropped when the free list indicates that free buffer resources in local memory fall below the second watermark parameter, to prevent overflow of the free buffer resources.

32. The apparatus of claim 29, wherein the second bus interface includes:

an inbound data buffer which buffers data subject of a transfer addressed to the its local processor between the bus and free buffers in local memory.

33. The apparatus of claim 29, wherein the plurality of processors have respective slot numbers on the bus, and the second bus interface receives transfers on the bus carrying the slot number of the local processor.

34. The apparatus of claim 29, wherein the second bus interface device includes control logic with a plurality of channels which manages data transfer into and out of the inbound buffer, including receiving burst transfers of cells having an identifier which maps to a channel, assigning a cell to a channel in response to the identifier, loading free buffers in local memory from the inbound buffer with cells, and updating the receive list.

35. The apparatus of claim 29, wherein said bus comprises a high speed parallel bus.

36. A network traffic management system, comprising:

a bus:

a plurality of processors, each including local memory, at least one network interface, a bus interface coupled to the bus, and resources for managing the at least one network interface and the bus interface; the bus interface including a command list storing a list of commands which characterize transfers of data from local memory across the bus, a bus data buffer which buffers data subject of a command being executed between local memory and the bus, a free buffer list storing pointers to free buffers in local memory into which data may be loaded from the bus, an inbound data buffer which buffers data subject of a transfer addressed to the second processor between the bus and free buffers in local memory, and a receive list storing pointers to buffers in local memory loaded with data from the bus.

37. The network traffic management system of claim 36, wherein the command list includes a first high priority command list and a second lower priority command list for managing latency of higher priority commands.

38. The network traffic management system of claim 36, including control logic which manages data transfer into and out of the bus data buffer for messages identified by commands in the command list to composes message transfer cells for messages, and drives the message transfer cells on the bus in burst mode without first obtaining permission to transfer to a destination on the bus.

39. The network traffic management system of claim 38, including control logic which manages data transfer into and out of the inbound buffer, including receiving burst transfers of message transfer cells from the bus, loading free buffers in local memory from the inbound buffer with message transfer cells, and updating the receive list.

40. The network traffic management system of claim 39, wherein the receive list includes a first higher priority receive list and a second lower priority receive list for managing reliability and throughput of transfers.

41. The network traffic management system of claim 39, including logic which monitors the free list, a watermark parameter which indicates an amount of free buffer resources, and watermark logic which causes lower priority messages to be dropped when the flee list indicates that free buffer resources in local memory fall below the watermark parameter.

42. The network traffic management system of claim 41, including a second watermark parameter indicating a smaller amount of free buffer resources, and second watermark logic which causes higher priority messages to be dropped when the free list indicates that free buffer resources in local memory fall below the second watermark parameter, to prevent overflow of the free buffer resources.

43. The network traffic management system of claim 38, wherein users of the bus have respective slot numbers on the bus, and the commands indicate a destination of a message using the slot number.

44. The network traffic management system of claim 43, including control logic with a plurality of channels which manages data transfer into and out of the inbound buffer, including receiving burst transfers of message transfer cells having the slot number of the local processor from the bus, assigning a message transfer cell to a channel for the message, loading free buffers in local memory from the inbound buffer with message transfer cells, and updating the receive list.

45. The network traffic management system of claim 43, including at least a second bus interconnecting the plurality of processors, and the commands indicate a destination using a bus identifier and a slot number.

46. The network traffic management system of claim 45, wherein said bus and said second bus comprise a high speed parallel buses.

47. The network traffic management system of claim 36, wherein said bus comprises a high speed parallel bus.

* * * * *

UNITED STATES PATENT AND TRADEMARK OFFICE
CERTIFICATE OF CORRECTION

PATENT NO. : 5,592,622
DATED : January 7, 1997
INVENTOR(S) : Mark S. Isfeld et al.

It is certified that error appears in the above-identified patent and that said Letters Patent is hereby corrected as shown below:

Title page, Item No. 75 (Inventors), please add --Pyda Srisuresh, Milpitas,--.

Signed and Sealed this

Fourteenth Day of September, 1999

Attest:

Q. TODD DICKINSON

*Attesting Officer*  *Acting Commissioner of Patents and Trademarks*